(12) United States Patent
Clark et al.

(10) Patent No.: US 12,049,592 B2
(45) Date of Patent: Jul. 30, 2024

(54) PREDICTIVE CONTROL SYSTEMS AND METHODS WITH HYDROCRACKER CONVERSION OPTIMIZATION

(71) Applicant: Imubit Israel Ltd., Modiin (IL)

(72) Inventors: Corrie Clark, Houston, TX (US);
Matthew Stephens, Houston, TX (US);
Janelle Jagnanan, Houston, TX (US);
Nadav Cohen, Yavne (IL); Gilad Cohen, Houston, TX (US)

(73) Assignee: Imubit Israel Ltd., Modiin (IL)

( * ) Notice: Subject to any disclaimer, the term of this patent is extended or adjusted under 35 U.S.C. 154(b) by 480 days.

(21) Appl. No.: 17/384,660

(22) Filed: Jul. 23, 2021

(65) Prior Publication Data
US 2021/0348066 A1 Nov. 11, 2021

Related U.S. Application Data

(63) Continuation-in-part of application No. 17/308,474, filed on May 5, 2021, which is a continuation-in-part
(Continued)

(51) Int. Cl.
*C10G 11/18* (2006.01)
*B01J 8/00* (2006.01)
(Continued)

(52) U.S. Cl.
CPC ........... *C10G 11/187* (2013.01); *B01J 8/0025* (2013.01); *B01J 8/0035* (2013.01); *B01J 8/1809* (2013.01);
(Continued)

(58) Field of Classification Search
CPC ..... C10G 11/187; B01J 8/0025; B01J 8/0035; B01J 8/1809; B01J 8/1836; B01J 8/24; G06N 3/04; G06N 3/08
(Continued)

(56) References Cited

U.S. PATENT DOCUMENTS

| | | | |
|---|---|---|---|
| 4,176,052 A | 11/1979 | Bruce et al. | |
| 4,374,021 A | 2/1983 | Bartholic | |

(Continued)

FOREIGN PATENT DOCUMENTS

| | | | |
|---|---|---|---|
| SU | 844626 A1 | 7/1981 | |
| WO | WO-2021/025841 A1 | 2/2021 | |

OTHER PUBLICATIONS

International Search Report and Written Opinion on PCT/IB2021/057421 dated Nov. 4, 2021.
(Continued)

*Primary Examiner* — Allen C Wong
(74) *Attorney, Agent, or Firm* — Foley & Lardner LLP

(57) ABSTRACT

A control system for automatic operation of a hydrocracking unit is shown. The control system includes a control device operable to affect at least one of a yield or a product quality of one or more output oil products provided as outputs of the hydrocracking unit. The control system further includes a controller configured to obtain an objective function that quantifies a value of operating the hydrocracking unit as a function of at least one of the yield or the product quality of the one or more output oil products, use a neural network model to generate a target control device setpoint predicted to optimize the objective function when the hydrocracking unit operates at the target control device setpoint, and operate the control device using the target control device setpoint to modulate at least one of the yield or the product quality of the one or more output oil products.

25 Claims, 16 Drawing Sheets

Related U.S. Application Data of application No. 16/950,643, filed on Nov. 17, 2020, and a continuation-in-part of application No. 16/888,128, filed on May 29, 2020, now Pat. No. 11,494,651, which is a continuation-in-part of application No. 15/883,114, filed on Jan. 30, 2018, now Pat. No. 11,200,489, said application No. 16/950,643 is a continuation-in-part of application No. 15/883,114, filed on Jan. 30, 2018, now Pat. No. 11,200,489.

(51) Int. Cl.
| | |
|---|---|
| B01J 8/18 | (2006.01) |
| B01J 8/24 | (2006.01) |
| G06N 3/04 | (2023.01) |
| G06N 3/08 | (2023.01) |

(52) U.S. Cl.
CPC .............. *B01J 8/1836* (2013.01); *B01J 8/24* (2013.01); *G06N 3/04* (2013.01); *G06N 3/08* (2013.01)

(58) Field of Classification Search
USPC .......................................................... 208/113
See application file for complete search history.

(56) References Cited

U.S. PATENT DOCUMENTS

| | | | |
|---|---|---|---|
| 5,311,421 A | 5/1994 | Nomura et al. | |
| 5,825,646 A | 10/1998 | Keeler et al. | |
| 6,246,972 B1 | 6/2001 | Klimasauskas | |
| 7,720,641 B2 | 5/2010 | Alagappan et al. | |
| 9,690,312 B2 | 6/2017 | Steven et al. | |
| 2002/0059202 A1 | 5/2002 | Hadzikadic et al. | |
| 2003/0108244 A1 | 6/2003 | Li et al. | |
| 2006/0178762 A1 | 8/2006 | Wroblewski et al. | |
| 2007/0156288 A1 | 7/2007 | Wroblewski et al. | |
| 2007/0168328 A1 | 7/2007 | Peralta et al. | |
| 2010/0050025 A1 | 2/2010 | Grichnik et al. | |
| 2012/0053762 A1 | 3/2012 | Stiefenhofer et al. | |
| 2015/0094201 A1* | 4/2015 | Janssen .................. B01J 38/30 502/38 |
| 2015/0185717 A1 | 7/2015 | Sayyar-Rodsari et al. | |
| 2015/0379429 A1 | 12/2015 | Lee et al. | |
| 2016/0048113 A1 | 2/2016 | Pandurangan et al. | |
| 2016/0258361 A1 | 9/2016 | Tiwari et al. | |
| 2017/0061249 A1* | 3/2017 | Estrada ................ G06V 10/454 |
| 2017/0139423 A1 | 5/2017 | El Ferik et al. | |
| 2017/0183573 A1 | 6/2017 | Arora et al. | |
| 2018/0016503 A1* | 1/2018 | Prasad ................... C10G 9/005 |
| 2018/0275692 A1* | 9/2018 | Lattanzio ................. G01K 3/14 |
| 2019/0236447 A1 | 8/2019 | Cohen et al. | |
| 2020/0074486 A1 | 3/2020 | Motohashi et al. | |
| 2020/0311547 A1 | 10/2020 | Mukund et al. | |
| 2020/0355391 A1 | 11/2020 | Wenzel et al. | |
| 2021/0096518 A1 | 4/2021 | Ilani et al. | |
| 2021/0253956 A1 | 8/2021 | Jagnanan et al. | |
| 2021/0348066 A1 | 11/2021 | Clark et al. | |

OTHER PUBLICATIONS

International Search Report and Written Opinion issued on PCT/US2021/030723 dated Jul. 28, 2021.

Lawrynczuk,"Predictive Control of a Distillation col. Using a Control-Oriented Neural Model," ICANNGA, 2011, part 1, pp. 230-239.

Lawrynczuk, "Neural Dynamic Matrix Control Algorithm with Disturbance Compensation," IEA/AIE, 2010, part 3, pp. 52-61.

Nguyen et al., "Multiple neural networks for a long term time series forecast", Neural Computing & Applic (2004) 13:90-98 (Year: 2004).

International Search Report and Written Opinion on PCT/US23/22036 dated Aug. 4, 2023.

International Search Report and Written Opinion issued in PCT/US2022/015474 dated May 12, 2022.

Chang A I et al: "Advanced control project stabilizes delayed coker, increases throughput", Oil and Gas Journal, Pennwell, Houston, TX, US vol. 99, No. 34 Aug. 20, 2001 (Aug. 20, 2001), pp. 52-56.

Extended European Search Report issued in EP application No. 21813354.4 dated Nov. 20, 2023.

Yu, et al., "Implementation of neural network predictive control to a multivariable chemical reactor", Control Engineering Practice 11 92003) 1315-1323 (Year: 2003).

Zahedi Gholamreza et al: A Neural Network Approach for Identification and Modeling of Delayed Coking Plant:, International Journal of Chemical Reactor Engineering, [Online] vol. 7, No. 1, May 6, 2009.

International Search Report and Written Opinion issued in PCT/US2022/024645 dated Jul. 1, 2022.

* cited by examiner

PREDICTIVE CONTROL SYSTEMS AND METHODS WITH HYDROCRACKER CONVERSION OPTIMIZATION

CROSS-REFERENCE TO RELATED PATENT APPLICATIONS

This application is a continuation-in-part of U.S. patent application Ser. No. 17/308,474 filed May 5, 2021, which is a continuation-in-part of U.S. patent application Ser. No. 16/888,128 filed May 29, 2020, which is a continuation-in-part of U.S. patent application Ser. No. 15/883,114 filed Jan. 30, 2018. U.S. patent application Ser. No. 17/308,474 is also a continuation-in-part of U.S. patent application Ser. No. 16/950,643 filed Nov. 17, 2020, which is a continuation-in-part of U.S. patent application Ser. No. 15/883,114 filed Jan. 30, 2018. The entire disclosures of each of these patent applications are incorporated by reference herein.

BACKGROUND

The present disclosure relates generally to systems and methods for controlling oil refinery processes and more particularly to systems and methods for controlling hydrocracking and/or hydrotreating oil refinery processes. Hydrocracking and hydrotreating are valuable oil refinery processes that convert low-value feedstocks (e.g., residue oil, vacuum gasoils, heating oil, distillates, etc.) into a variety of higher-value and lower-density products such as naphtha, kerosene, diesel, and gasoline. Hydrocracking reactions typically occur over a catalyst within a hydrocracking unit (HCU) in the presence of hydrogen. Specifically, longer-chain hydrocarbon molecules are broken down into shorter molecules in the presence of hydrogen and the catalyst.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a control system for automatic operation of a hydrocracking unit in an oil refining system. The control system includes a control device operable to affect at least one of a yield or a product quality of one or more output oil products provided as outputs of the hydrocracking unit. The control system further includes a controller including a processing circuit configured to obtain an objective function that quantifies a value of operating the hydrocracking unit as a function of at least one of the yield or the product quality of the one or more output oil products. The processing circuit is further configured to use a neural network model to generate a target control device setpoint predicted to optimize the objective function when the hydrocracking unit operates at the target control device setpoint. The processing circuit is further configured to operate the control device using the target control device setpoint to modulate at least one of the yield or the product quality of the one or more output oil products.

In some embodiments, the control device is a feed control assembly configured to adjust a feed rate of an input oil feed entering the hydrocracking unit, and the target control device setpoint is a feed rate setpoint for the feed control assembly. In some embodiments, the control device is a reactor severity control device configured to modulate a temperature within the hydrocracking unit, and the target control device setpoint is a reactor severity setpoint for the reactor severity control device. In some embodiments, the control device is a combination of the feed control assembly and the reactor severity control device, and the target control device setpoint is a combination of the feed rate setpoint and the reactor severity setpoint.

In some embodiments, the hydrocracking unit includes a reactor within which the input oil feed is converted into the one or more output oil products. In some embodiments, the reactor severity control device is configured to modulate the temperature affecting the at least one the yield or the product quality of the one or more output oil products by controlling a catalyst reaction within the reactor and the temperature affecting the at least one of the yield or the product quality of the one or more output oil products within the hydrocracking unit is a reactor temperature within the reactor.

In some embodiments, the hydrocracking unit is configured to use hydrogen introduced into the hydrocracking unit to hydrogenate the input oil feed provided to the hydrocracking unit. In some embodiments, the control device is configured to modulate a rate at which the hydrogen is introduced into the hydrocracking unit.

In some embodiments, the processing circuit is configured to use the neural network model to predict at least one of the yield or the product quality of each output oil product of the one or more output oil products predicted to result from the target control device setpoint and calculate a value of the objective function based on the at least one of the yield or the product quality of each output oil product predicted to result from the target control device setpoint.

In some embodiments, the processing circuit is configured to obtain a price corresponding to each output oil product of the one or more output oil products, calculate a value of each output oil product predicted to result from the target control device setpoint using the neural network model and the price corresponding to each output oil product, calculate a value of the objective function based on the value of each output oil product.

In some embodiments, the objective function further includes a penalty separate from the function of at least one of the yield or the product quality of the one or more output oil products, the penalty defined as a function of a constrained variable affected by the control system relative to a threshold value of a constraint that applies to the constrained variable. In some embodiments, the processing circuit is configured to use the neural network model to predict a value of the constrained variable predicted to result from the target control device setpoint and calculate a value of the penalty as a function of the value of the constrained variable.

In some embodiments, the processing circuit is configured to train the neural network model during an offline training period using historical plant data including at least one of one or more manipulated variables provided as inputs to controllable equipment of the hydrocracking unit, one or more controlled variables affected by operating the controllable equipment of the hydrocracking unit, or one or more disturbance variables that affect the one or more controlled variables but are not directly controlled.

In some embodiments, the neural network model includes a predictor neural network model and the processing circuit is configured to train the predictor neural network model by initializing the predictor neural network model with an initial set of weights, using the predictor neural network model to predict the yield of the one or more output oil products at a historical time step based on historical plant data for one or more previous time steps occurring prior to the historical time step, determining an error between predicted values of the yield of the one or more output oil products predicted by the predictor neural network model and actual values of an amount of the one or more output oil products defined by the historical plant data, and adjusting the weights of the predictor neural network model to reduce the error.

In some embodiments, the neural network model includes a predictor neural network model and a controller neural network model, and the processing circuit is configured to train the controller neural network model by initializing the controller neural network model with an initial set of weights, generating a time series of predicted values of an amount of the one or more output oil products using the predictor neural network model and the controller neural network model, calculating a value of the objective function based on the time series of predicted values of the amount of the one or more output oil products, and adjusting the weights of the controller neural network model to optimize the objective function.

Another implementation of the present disclosure is a method for operating a hydrocracking unit in an oil refining system. The method includes obtaining an objective function that quantifies a value of operating the hydrocracking unit as a function of at least one of a yield or a product quality of one or more output oil products provided as outputs of the hydrocracking unit, using a neural network model to generate a target control device setpoint predicted to optimize the objective function when the hydrocracking unit operates at the target control device setpoint, and operating a control device using the target control device setpoint to modulate at least one of the yield or the product quality of the one or more output oil products.

In some embodiments, the control device is a feed control assembly configured to adjust a feed rate of an input oil feed entering the hydrocracking unit, and the target control device setpoint is a feed rate setpoint for the feed control assembly. In some embodiments, the control device is a reactor severity control device configured to module a temperature within the hydrocracking unit, and the target control device setpoint is a reactor severity setpoint for the reactor severity control device. In some embodiments, the control device is a combination of the feed control assembly and the reactor severity control device, and the target control device setpoint is a combination of the feed rate setpoint and the reactor severity setpoint.

In some embodiments, the method further includes using the neural network model to predict a yield or a product quality of each output oil product of the one or more output oil products predicted to result from the target control device setpoint and calculating a value of the objective function based on the yield of each output oil product predicted to result from the target control device setpoint.

In some embodiments, the method further includes obtaining a price corresponding to each output oil product of the one or more output oil products, calculating a value of each output oil product predicted to result from the target control device setpoint using the neural network model and the price corresponding to each output oil product, and calculating a value of the objective function based on the value of each output oil product.

In some embodiments, obtaining the objective function comprises obtaining the objective function including a penalty separate from the function of at least one of the yield or the product quality of the one or more output oil products, the penalty defined as a function of a constrained variable affected by a control system relative to a threshold value of a constraint that applies to the constrained variable, and using the neural network model to predict a value of the constrained variable predicted to result from the target control device setpoint and calculate a value of the penalty as a function of the value of the constrained variable.

In some embodiments, the method further includes training a predictor neural network model by initializing the predictor neural network model with an initial set of weights, using the predictor neural network model to predict the yield of the one or more output oil products at a historical time step based on historical plant data for one or more previous time steps occurring prior to the historical time step, determining an error between predicted values of at least one of the yield or the product quality of the one or more output oil products predicted by the predictor neural network model and actual values of an amount of the one or more output oil products defined by the historical plant data, and adjusting the weights of the predictor neural network model to reduce the error.

In some embodiments, the method further includes training a controller neural network model by initializing the controller neural network model with an initial set of weights, generating a time series of predicted values of an amount of the one or more output oil products using a predictor neural network model and the controller neural network model, calculating a value of the objective function based on the time series of predicted values of the amount of the one or more output oil products, and adjusting the weights of the controller neural network model to optimize the objective function.

Another implementation of the present disclosure is a control system for automatic operation of a hydrocracking unit in an oil refining system. The control system includes a control device operable to affect at least one of a yield or a product quality of one or more output oil products provided as outputs of the hydrocracking unit and a controller. The controller including a processing circuit configured to obtain an objective function that quantifies a value of operating the hydrocracking unit as a function of at least one of the yield or the product quality of the one or more output oil products, use a predictive model to generate a target control device setpoint predicted to optimize the objective function when the hydrocracking unit operates at the target control device setpoint, and operate the control device using the target control device setpoint to modulate at least one of the yield or the product quality of the one or more output oil products.

In some embodiments, the control device is a feed control assembly configured to adjust a feed rate of an input oil feed entering the hydrocracking unit, and the target control device setpoint is a feed rate setpoint for the feed control assembly. In some embodiments, the control device is a reactor severity control device configured to modulate a temperature within the hydrocracking unit, and the target control device setpoint is a reactor severity setpoint for the reactor severity control device. In some embodiments, the control device is a combination of the feed control assembly and the reactor severity control device, and the target control device setpoint is a combination of the feed rate setpoint and the reactor severity setpoint.

In some embodiments, the hydrocracking unit includes a reactor within which the input oil feed is converted into the one or more output oil products, the reactor severity control device is configured to modulate the temperature affecting the yield of the one or more output oil products by controlling a catalyst reaction within the reactor, and the temperature affecting the yield of the one or more output oil products within the hydrocracking unit is a reactor temperature within the reactor.

In some embodiments, the hydrocracking unit is configured to use hydrogen introduced into the hydrocracking unit to hydrogenate the input oil feed provided to the hydrocracking unit. In some embodiments, the reactor severity control device is configured to modulate a rate at which the hydrogen is introduced into the hydrocracking unit.

In some embodiments, the processing circuit is further configured to use the predictive model to predict a yield or a product quality of each output oil product of the one or more output oil products predicted to result from the target control device setpoint and calculate a value of the objective function based on the yield of each output oil product predicted to result from the target control device setpoint.

In some embodiments, the processing circuit is configured to obtain a price corresponding to each output oil product of the one or more output oil products, calculate a value of each output oil product predicted to result from the target control device setpoint using the predictive model and the price corresponding to each output oil product, and calculate a value of the objective function based on the value of each output oil product.

In some embodiments, using the predictive model to generate the target control device setpoint comprises using an inferential to determine a value of a variable affecting at least one of the yield or the product quality of the one or more output oil products, the inferential comprising an inference that infers the value of the variable affecting at least one of the yield or the product quality based on an inferential functionality performed by the predictive model.

In some embodiments, the one or more output oil products comprises at least one of liquefied petroleum gas (LPG), gasoline, diesel, kerosene, butane, propane, or jet fuel.

DETAILED DESCRIPTION

Overview

General Overview

Figure 1:
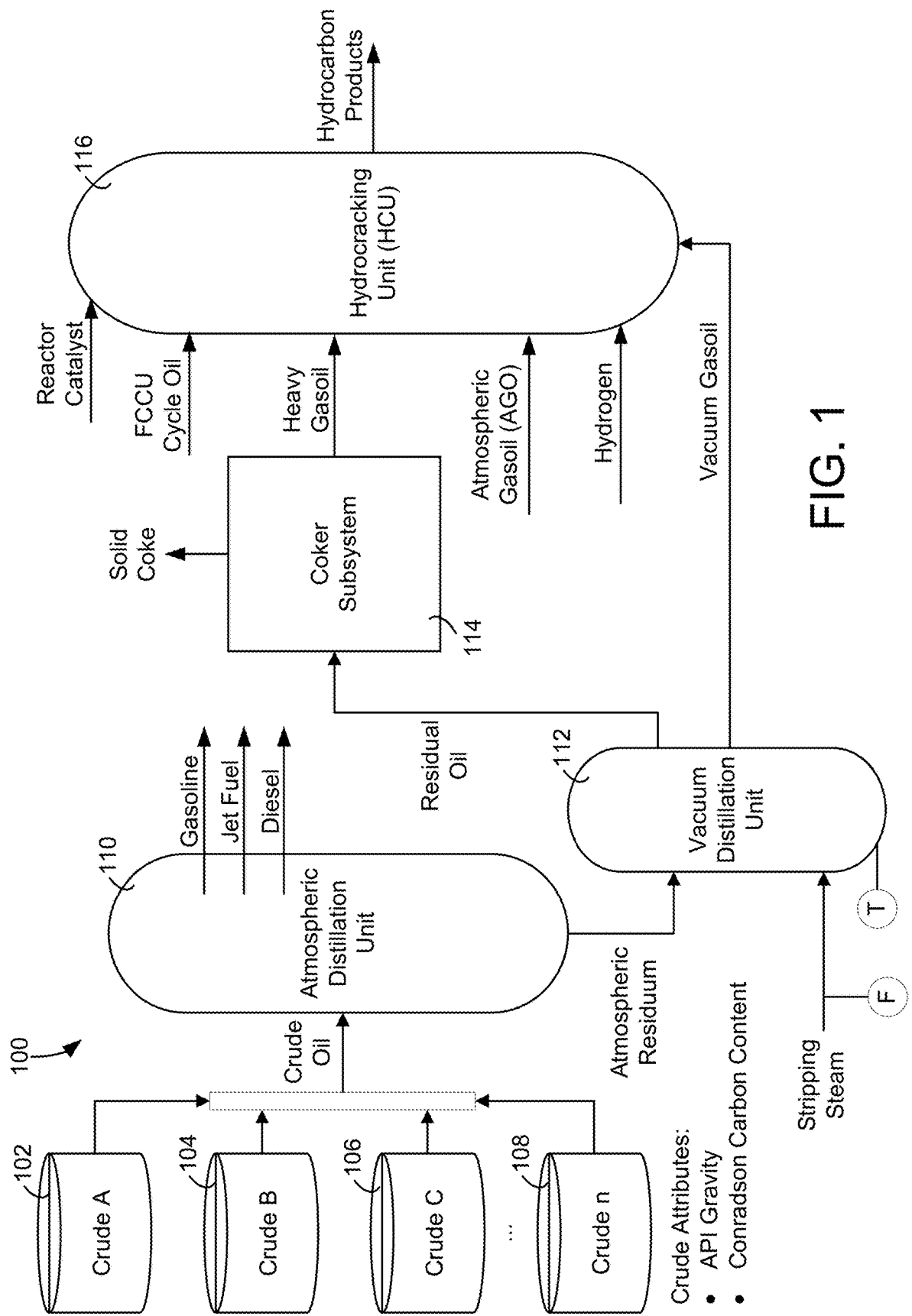
FIG. 1 is a diagram of a petroleum refinery system, according to some embodiments.

Referring generally to the FIGURES, systems and methods for controlling and optimizing hydrocracking and hydrotreating oil refinery processes are shown, according to exemplary embodiments. Hydrocracking and hydrotreating are valuable oil refinery processes that convert low-value feedstocks (e.g., residue oil, vacuum gasoils, etc.) into a variety of higher-value and lower-density products including but not limited to naphtha, kerosene, diesel, and gasoline. Hydrocracking reactions may occur over a catalyst within a hydrocracking unit (HU) in the presence of hydrogen. Specifically, longer-chain hydrocarbon molecules may be broken down into shorter molecules in the presence of hydrogen and the catalyst. This process results in a relatively heavier (i.e., higher density) input hydrocarbon feed being converted (i.e., broken down) into one or more lighter (i.e., lower density) hydrocarbon outputs.

In some embodiments, the goal of hydrocracking processes may be to maximize the value of the yield (i.e., output, production, generation, etc.) of the hydrocarbon outputs, reach a certain product quality of the hydrocarbon outputs (e.g., chemical and/or physical properties, or a combination thereof. However, it can be difficult and challenging to accomplish this goal due to the highly nonlinear nature of hydrocracking reactions. For example, in some cases, the temperature within a reactor bed of the HCU (e.g., weighted average bed temperature (WABT), reactor severity, bed(s) temperature, a combination thereof, etc.) can be correlated positively to conversion of heavy hydrocarbon feed to light hydrocarbon outputs. However, too high of reactor WABT's, for example, may lead to over-cracking of diesel and/or naphtha molecules into much lighter hydrocarbons, such as LPG and off-gas. The temperature at which this can occur can vary, and can be dependent on several factors (e.g., catalyst age, catalyst feed rate, hydrogen feed rate, gas oil feed rate, feed quality, etc.). The present disclosure provides various control systems and methods for improving the desired yield and/or the product quality of one or more hydrocarbon products produced from hydrocracking units based on one or more nonlinear factors (e.g., reactor severity, feed quality, feed rate, catalyst quality, etc.).

The control systems and methods described herein can be used to predictively model the hydrocracking conversion process and control oil refinery systems to generate the most valuable total volume and/or most valuable volume and/or most valuable product qualities of one or more hydrocarbon products from hydrocracking unit(s). This may be performed by assigning a value or price to one or more of the fractions (i.e., output oil products) produced by a hydrocracking unit—such as diesel or jet fuel—and optimizing the total expected value of the hydrocracking process by minimizing or maximizing an objective function that takes into account the values or prices assigned to each of the hydrocracking unit fractions, as well as predicted yield rates of the individual fractions (i.e., the hydrocarbon products produced by the hydrocracking unit after hydrotreating and hydrocracking the received feedstock). These predicted yield rates may be determining using various predictive control techniques, such model predictive control, neural network control, or a combination thereof.

As described herein, product qualities can refer to a specific chemical or physical property of a product stream. This may be considered different from its yield, as the quality of the actual stream is different than the volume or amount of the stream. As described herein, the product streams can refer to any and all of the output oil streams from HCU 116, any input streams into HCU 116, or a combination thereof.

Adjusting unit feed rate or reactor severity can alter both the yield of a product, and/or the chemical and/or physical properties of the product. In some embodiments, could be considered by a control technique (e.g., predictive control, model predictive control, an objective function, etc.). For example, a control technique that uses an objective function may modify the price of a stream to account for the value of the cetane number (CN) in diesel, as typically the higher the CN in a diesel stream, the more valuable the diesel stream is. The objective function could therefore be modified to include an upgrade to the price (e.g., monetary price, weight of the variable associated with the diesel stream, etc.) based on the value of the CN in the diesel stream. Alternatively, the objective function could be structured to not consider product qualities of one or more of the output streams. Instead, there could be additional CVs (e.g., a CV that represented diesel_cetane_number, etc.) which would have associated with it an upper/lower bound and/or a constant goal. In some embodiments, these properties are represented by inferentials. Details regarding product qualities and the control thereof is described in greater detail below.

As described herein, the term oil products is not limited to hydrocarbon products from HCU's that include oil, but can be or include any type of production stream produced by within system 100 (e.g., by HCU 116), such as liquefied petroleum gas (LPG) products, gasoline, diesel, kerosene, jet fuel, fuel oil, or a combination thereof. In some embodiments, oil product includes some or all of the products produced by HCU 116. These can include individual hydrocarbon products or a combination of hydrocarbons.

As described herein, the control systems and methods can be used to predict total volume (e.g., largest total amount of volume achievable by HCU 116), of HCU 116, the highest valued total volume (e.g., highest valued amount of total volume), total volume of one or more hydrocarbon products (e.g., total volume of naphtha, etc.), highest valued volume of one or more hydrocarbon products (e.g., highest value of jet fuel volume, etc.), or any combination thereof. As described herein, the volume of the one or more hydrocarbon products can refer to the amount (e.g., the actual volume, the mass, the flow rate, a combination thereof, etc.) of the output oil products produced by HCU 116 and/or their value (e.g., economic value, using custom weights, etc.).

Hydrocracking Overview

Oil refiners that wish to optimize volume production may implement systems and methods for "cracking" certain hydrocarbons. In some embodiments, there is less demand for the longer-chain, high molecular weight hydrocarbons, when compared to lighter hydrocarbons (e.g., gasoline, diesel, etc.). At a high level, this method of cracking hydrocarbons may generally refer to heating the heavier hydrocarbons (e.g., along with additional methods) until the hydrocarbon molecular chains break, producing lightweight, valuable oil products. Several methods for performing cracking may be implemented, such as catalytic cracking, thermal cracking, steam cracking, and hydrocracking.

In some embodiments, different methods for cracking heavy hydrocarbons can be used to yield different amounts (i.e., yields) of lower-weight hydrocarbon products. For example, a hydrocracker my "upgrade" a vacuum gasoil (VGO) feed by injecting hydrogen, resulting in a higher volume of high-quality diesel and kerosene. In contrast, if the same feed were input into a fluid catalytic cracking unit (FCCU) at the same refinery, the FCCU may yield a higher volume of high-quality gasoline (i.e., compared to diesel and kerosene).

As noted above, hydrocracking and hydrotreating are valuable processes in oil refineries that convert low-value feedstocks (e.g., residue oil, vacuum gasoils, etc.) into a variety of higher-value products, including, but not limited to, naphtha, kerosene, diesel, and gasoline. Hydrocracking reactions may occur over a catalyst within a hydrocracking unit (HU) in the presence of hydrogen. HCUs may typically be divided into several reactor stages, each with different operating objectives and physical configurations.

For example, in the first stage of an HCU, an input oil feed (e.g., a feedstock, a collection of oil compounds entering into the HCU, etc.) is processed to remove organic sulfur and organic nitrogen, which can poison downstream catalysts. The organic nitrogen and sulfur are converted to ammonia and hydrogen sulfide, respectively. The reactor effluent from the first stage (e.g., the hydrotreating stage) can then be processed in a series of liquid/vapor separation vessels, where the nitrogen and sulfur—now in the gaseous state—can be readily removed.

In the hydrocracking section (e.g., the second stage), longer-chain hydrocarbon molecules are broken down into shorter molecules in the presence of hydrogen and the received catalyst. The carbon-carbon (C—C) bonds within the longer chain molecules are replaced with carbon-hydrogen (C—H) bonds through an exothermic reaction. As such, hydrocracking may consume large volumes of hydrogen, with hydrogen atoms readily bonding to the carbon atoms. The inclusion of additional hydrogen into the hydrocarbon molecules, as well as the breaking of larger molecules into smaller molecules, can result in decreasing the density of the product stream.

In some embodiments, hydrocracking increases each of the volumes of the combined products streams relative to the volume of the feed (as a result of the introduction of hydrogen into the process) while also the decreasing the density of the products. This can result in more volume being produced compared to the volume received in the feed, which can be referred to as volume swell.

Reactor effluent from the second stage is then processed in additional liquid/vapor separation vessels before being combined with the effluent from the first stage, and then fractionated into product streams in a multi-stage distillation column. Typical products from this column include liquid petroleum gas (LPG), naphtha, kerosene, jet fuel, diesel and unconverted cycle oil (UCO). A portion of the UCO stream can be recycled back through the second stage for further processing (or cracking). Refiners may also withdraw some of the UCO as a product from the hydrocracking unit.

In some embodiments, both the first and second stages can be split over multiple reactors, either in series or parallel. In addition, a single reactor can contain both hydrotreating and hydrocracking catalyst beds, with the hydrotreating sections at the top of the reactor, and the hydrocracking reactions at the bottom. Hydrocracking is a highly non-linear process, as such, previous optimization technologies (e.g., traditional advanced process control (APC) linear models, etc.) cannot model the complex dynamic and nonlinear relationships between reactor severity and one or more product yields (e.g., conversion and selectivity) and/or product qualities. Additionally, ever-changing feed rates and compositions, as well as catalyst degradation, can make real-time optimization of hydrocracking units a challenge, since these factors impact where on the reactor severity curves reactors should operate to optimize product yields.

Traditional hydrocracking optimization may attempt to maximize conversion to some limit determined by weekly linear programming (LP) models. Conversion is generally defined as:

$$\text{Conversion}=(1-\text{UCO/Feed})*100\%$$

Where UCO is unconverted cycle oil (i.e., the volumetric flow rate of purged oil that leaves the unit without being converted into lighter products). In some embodiments, this is zero for some units with lighter feed.

In some embodiments, reactor temperatures are described using Weighted-Average Bed Temperatures (WABTs) which can account for the different catalyst volumes in each reactor bed when averaging the reactor bed temperatures. An exemplary WABT calculation is shown below:

$$\text{WABT}=\Sigma(x_i(T_{IN,i}+\tfrac{2}{3}[\Delta T_{OUT,i}]))$$

Where WABT is the weighted average bed temperature, $x_i$ is a fraction of catalyst in a given bed (i) or reactor, $T_{IN}$ is the inlet temperature to the given bed (i) or reactor, and $T_{OUT}$ is the outlet temperature to the given bed (i) or reactor.

In some embodiments, conversion trends positively with reactor temperature. In such embodiments, to maximize conversion, refiners will run their hydrocracking reactors as hot as possible while considering catalyst life. In fixed bed reactors, the catalyst can be changed at fixed intervals (e.g., several years apart, etc.). Therefore, maintaining sufficient catalyst activity between fresh catalyst loads is one of the main driving factors of hydrocracking operation. At higher temperatures, more coke is deposited on the catalyst, blocking reaction sites and reducing catalyst activity. As such, hydrocrackers are typically operated at maximum allowable temperatures, where the maximum allowable temperature will increase gradually throughout the catalyst lifecycle to some final limit.

Maximizing conversion is not always the optimal economic solution, however, as increasing reactor WABTs can lead to over-cracking of valuable diesel molecules into naphtha and LPG. In addition, the temperature at which over-cracking begins to occur is highly variable and depends on unit conditions, catalyst age, feed rates, and feed qualities. Linear modeling techniques are not adequate to truly understand, control, and optimize the variables that affect hydrocracker product yields.

Additionally, the saturation of polyaromatics present in the feed to the hydrotreater can be a considerable source of volume gain within the unit. Saturation of polyaromatics is reversible, and at high temperatures, the reverse reaction will begin to occur, negatively affecting unit volume gain and profitability. The temperature at which the reverse reaction can become favorable is highly dynamic and can be affected by multiple factors including catalyst age, feed rate, hydrogen partial pressure, and feed quality. The relationship between first-stage WABT and organic nitrogen/sulfur conversion may also be highly nonlinear. Factors that affect this relationship include but are not limited to, feed quality and rate, hydrogen partial pressure in the reactor, and catalyst age. Controlling the concentration of nitrogen leaving the first stage using a linear model is, therefore, highly inaccurate.

Advantageously, the systems and methods described herein improve upon previous control systems for oil refinery processes by using neural networks to predict, control, and optimize hydrocracking and hydrotreating processes. Neural networks are a type of artificial intelligence that are generally inspired by biological neural networks. Neural networks can include a collection of connected nodes, wherein the connections of the nodes are modeled as weights. The inputs to a neural network may be modified by these weights and summed, producing an output layer that indicates a particular prediction or determination. Adjustment of the weights effects the output layer of the neural network, thus affecting its learning process.

Neural network-based control systems can be used to monitor and control a wide variety of systems and processes including, for example, a petroleum refinery system, a natural gas processing plant, a liquefied natural gas (LNG) production facility, an olefin manufacturing plant, a commodity chemical manufacturing plant, a polymer production system, a renewable fuel production facility, an ammonia complex processing system, and many other types industrial, production, or processing systems. Training a neural network typically includes applying a set of training data that represents the behavior of the system to the neural network and tuning the neural network to predict the system behavior reflected by the training data. However, it can be challenging to properly train and apply a neural network to a dynamic system that behaves differently at different points in time.

Oil Refinery System

Referring now to FIG. 1, a system 100 for refining petroleum to transform crude oil (or other crude petroleum products) into more useful products (e.g., gasoline, petrol, kerosene, jet fuel, etc.) is shown, according to exemplary embodiments. FIG. 1 depicts one example of a system 100 for refining crude oil, but it should be understood that the systems and methods described herein are not limited to any particular configuration of system 100. For example, other embodiments of system 100 may include other refinery tools (e.g., a de-salter for the crude oil, hydrocrackers, hydrotreaters, etc.), different arrangements or configurations of system 100 that include the same components, more or fewer drums and/or storage containers, and other modifications to system 100. System 100 is shown to include crude oil storage tanks (e.g., "oil tanks") 102-108, atmospheric distillation unit (ADU) 110, vacuum distillation unit (VDU) 112, coker subsystem 114, and fluid catalytic cracker unit (FCCU) 116. In some embodiments, system 100 is configured to generate light hydrocarbon products from residue and other heavy hydrocarbons using, at least in part, hydrocracking unit (HU) 116. System 100 may include a control system configured to optimize the volume gain (e.g., the volume of light hydrocarbons produced, etc.), the total volume produced by one or more hydrocarbon products, or the most valuable amount of hydrocarbon products individually and/or as a whole.

Before describing the components of system 100 in detail, it is noted that although system 100 is described primarily as refining oil, it should be understood that the systems and methods described herein can be used to refine or produce any of a variety of petroleum products. For example, system 100 can be operated to produce butane, methane, diesel fuel, fuel oil, gasoline, kerosene, liquefied natural gas, liquefied petroleum gas, propane, microcrystalline wax, napalm, naphtha, naphthalene, paraffin wax, petroleum jelly, petroleum wax, refined asphalt, refined bitumen, refined petroleum gas, slack wax, sulfur, petroleum coke, petrochemicals, or any other type of petroleum product. In general, system 100 may be configured to convert one or more input petroleum products into one or more output or derived petroleum products.

Oil tanks 102-108 may represent the mechanical components and/or methods for storing and providing petroleum into system 100. As disclosed herein, the terms "petroleum" and "crude oil" may be used interchangeably when referring to the mixture of hydrocarbons received prior to oil refining. In some embodiments, the oil stored in oil tanks 102-108 has an American Petroleum Institute (API) gravity of 15-45 degrees, wherein a high API indicates a lower density crude oil and a low API indicates a higher density crude oil. In some embodiments, the oil stored in oil tanks 102-108 has a lower or higher API gravity. In some embodiments, the level of concarbon content (CCR) (e.g., Conradson carbon residue, etc.) is measured to provide an indication of the coke-forming tendencies of the crude oil, prior to providing crude oil to system 100 via oil tanks 102-108. The crude oil stored in oil tanks 102-108 may be recovered through various forms of oil drilling and/or natural petroleum springs. A pumping system may then transfer the received crude oil to store in oil tanks 102-108 and provide the crude oil into atmospheric distillation unit 110.

ADU 110 may be configured to superheat the received crude oil to temperatures that separate the crude oil into its various naturally-occurring components, such as gasoline, kerosene, diesel, fuel oil, and residual oil. While FIG. 1 shows a single atmospheric distillation unit, system 100 may include any number of atmospheric and/or vacuum distillation units for refining the crude oil. Additionally, the crude oil may be preheated (e.g., by a furnace, by one or more tube-still heaters, etc.) such that the crude oil enters ADU 110 at a temperature where some or most of the crude oil is already vaporized. For example, crude oil may be preheated to a temperature of 250-260° C. The oil then enters a tube-still heater to reach a temperature of 350-360° C., where it is then fed into ADU 110. Upon entering ADU 110, the crude oil is further heated to increase vaporization of the crude oil. The vapor rises within ADU 110 and separates to fractions (e.g., subcomponents, layers, levels, etc.). These fractions may be determined by the temperature at which the vapor phase changes back into a liquid. As such, once the vapor reaches an appropriate fraction layer, the vapor changes back into a liquid and is successfully separated into a distillate of the crude oil.

Various distillates may be produced via ADU 110, including light distillates (e.g., liquid petroleum gasoline (LPG), gasoline, naphtha, etc.), middle distillates (e.g., kerosene, jet fuel, diesel, etc.), heavy distillates (e.g., fuel oil, etc.), and residuum (e.g., heavy fuel oil, lubricating oils, vax, asphalt, etc.). In a general embodiment, light distillates may have a boiling point around 150-200° C., middle distillates may have a boiling point around 250-300° C., heavy distillates may have a boiling point around 300-350° C., and residuum may have a boiling point around 350° C. and above. The processes performed by ADU 110 may be referred to a fractional distillation or fractionation. ADU 110 is shown providing the distilled residuum to VDU 112 for further distillation.

VDU 112 may provide another vessel for distilling petroleum products in a heated container. As shown in FIG. 1, the crude oil residuum is provided to VDU 112 for further distillation. System 100 further shows stripping steam entering VDU 112, which may be included in the distillation process. The stripping steam may be controlled based on flow measurements taken by flow sensors, prior the stripping steam entering VDU 112. VDU 112 may perform vacuum distillation, a process similar to ADU 110, but in a vacuum or close to a vacuum (e.g., 10 mmHg, 20 mmHg, etc.). This process for distilling crude oils may help to produce petroleum products from heavier oils left over from atmospheric distillation, as the low pressure in the vacuum decreases the boiling point for the petroleum products in the crude oil. VDU 112 may produce similar distillates as ADU 110 and decrease the overall residuum left over after distillation. However, residuum from the vacuum distillation of VDU 112 may still be present, and is sent to coker subsystem 114 for further processing.

Coker subsystem 114 may be configured to act as a coking system and may convert the residual oil from VDU 112 into more distillates, such as hydrocarbon gases, naphtha, gas oils, and coke. The solid coke may be dumped into a coke hauler to be transported away from system 100. The excess gasoils that were not transformed into solid coke may be provided to HCU 116 for further processing. In some embodiments, the excess gasoil can be further broken down into lighter hydrocarbons via catalytic cracking, which may occur in HCU 116. Coker subsystem 114 may be similar to ADU 110 in that it separates an input feed (e.g., residual oil) into various distillates using heat. As disclosed herein, coke may refer to any raw petroleum coke (e.g., green coke) produced in a coker (e.g., a delayed coker, a non-delayed coker, etc.). The coke may include any combination of components including carbon, hydrogen, nitrogen, sulfur, and ash. Additionally, the coke may include any combination of metals, including aluminum, boron, calcium, chromium, cobalt, iron, manganese, magnesium, molybdenum, nickel, potassium, silicon, sodium, titanium, and vanadium. In a general embodiment, the coke is mostly carbon byproducts from the heavy distillates produced in ADU 110.

HCU 116 may be configured to convert low-value feedstock (e.g., vacuum gasoils, heavy gasoil, etc.) into a variety of higher-value products (e.g., diesel, jet fuel, naphtha, etc.). In some embodiments, HCU 116 includes several stages for converting the feedstock, such as a treating stage (e.g., hydrotreating stage, hydrotreating reactor stage, etc.) and a hydrocracking stage. Of course, any number of stages can be included in various embodiments and the processes performed therein can be contemplated in series or in parallel, depending on the arrangement of the reactor stages. A treating stage in HCU 116 may remove organic sulfur and/or organic nitrogen from the feed to reduce the potential poisoning of downstream catalysts, which may be converted to ammonia and hydrogen sulfide. The feed may then be processes in a series of liquid/vapor separation vessels. A hydrocracking stage may then break down the longer-chain hydrocarbon molecules of the treated feed into shorter molecules, creating lighter hydrocarbon products. A more detailed description of the reactor stages within HCU 116 is provided with reference to FIG. 3.

In some embodiments, HCU 116 uses a metal catalyst (e.g., zeolite, etc.) combined with hydrogen to break up longer hydrocarbon chains for heavy crude oil fractions. This may produce different results than hydrocarbon cracking via catalytic cracking (e.g., within a fluid catalytic cracking unit, etc.). In such embodiments, an acidic catalyst may be used to reject carbon from the feed to break up the longer hydrocarbon chains. When cracking the heaviest of hydrocarbon products (e.g., heavy vacuum gas oil, vacuum distillation residue, etc.) using catalytic cracking, potential problems—resulting from coke deposits on the catalyst—inside of catalytic cracking units can occur. As such, the hydrocracking processes performed by HCU 116 can be configured to processes a wider array of feedstock, such as the heavy vacuum gas oil and vacuum distillation residue, the may not otherwise be cracked by typical catalytic cracking methods. Systems and methods for hydrocracking and/or hydrotreating are described in greater detail below with reference to FIG. 2.

In some embodiments, the hydrocracking process of HCU 116 cracks the high-boiling, high molecular weight hydrocarbons into lower-boiling, lower molecular weight olefinic and aromatic hydrocarbons and hydrogenates them. Any sulfur and nitrogen present in the hydrocracking feedstock may also be hydrogenated and form gaseous hydrogen sulfide (H2S) and ammonia (NH3) which can be subsequently removed. In some embodiments, this results in the hydrocracking products essentially free of sulfur and nitrogen impurities and are consisting mostly of paraffinic hydrocarbons.

Additionally, hydrocracking may produce one or more products that differ from products using catalytic cracking processes. In some embodiments, catalytic cracking can result in breaking the heavy fractions of the incoming feed into paraffins, iso-paraffins, aromatics, naphehenes, and olefins, with a particular focus on producing high-octane gasoline. Hydrocracking processing may, in contrast, emphasize a greater output of diesel fuel production and/or liquid yield, rather than gas (e.g., high-octane gasoline, etc.) and coke. In some embodiments, the differences between hydrocracking and hydrotreating include time which the feedstock remains at reaction temperature. As such, the lower limit of hydrocracking conditions may overlap with the upper limits of hydrotreating. Where the reaction conditions overlap, feedstock to be hydrocracked may generally be exposed to the reactor temperature for longer periods.

As discussed above, HCU 116 can receive several different types of feed and the feed into HCU 116 is not limited to the embodiments described herein. For example, HCU 116 can also include atmospheric gasoil (AGO) from ADU 110, cycle oil from a fluid catalytic cracking unit, vacuum gasoil from VDU 112, heavy gasoil from coker subsystem 114, other heavy hydrocarbons, and any combination thereof.

Hydrocracking Unit

Figure 2:
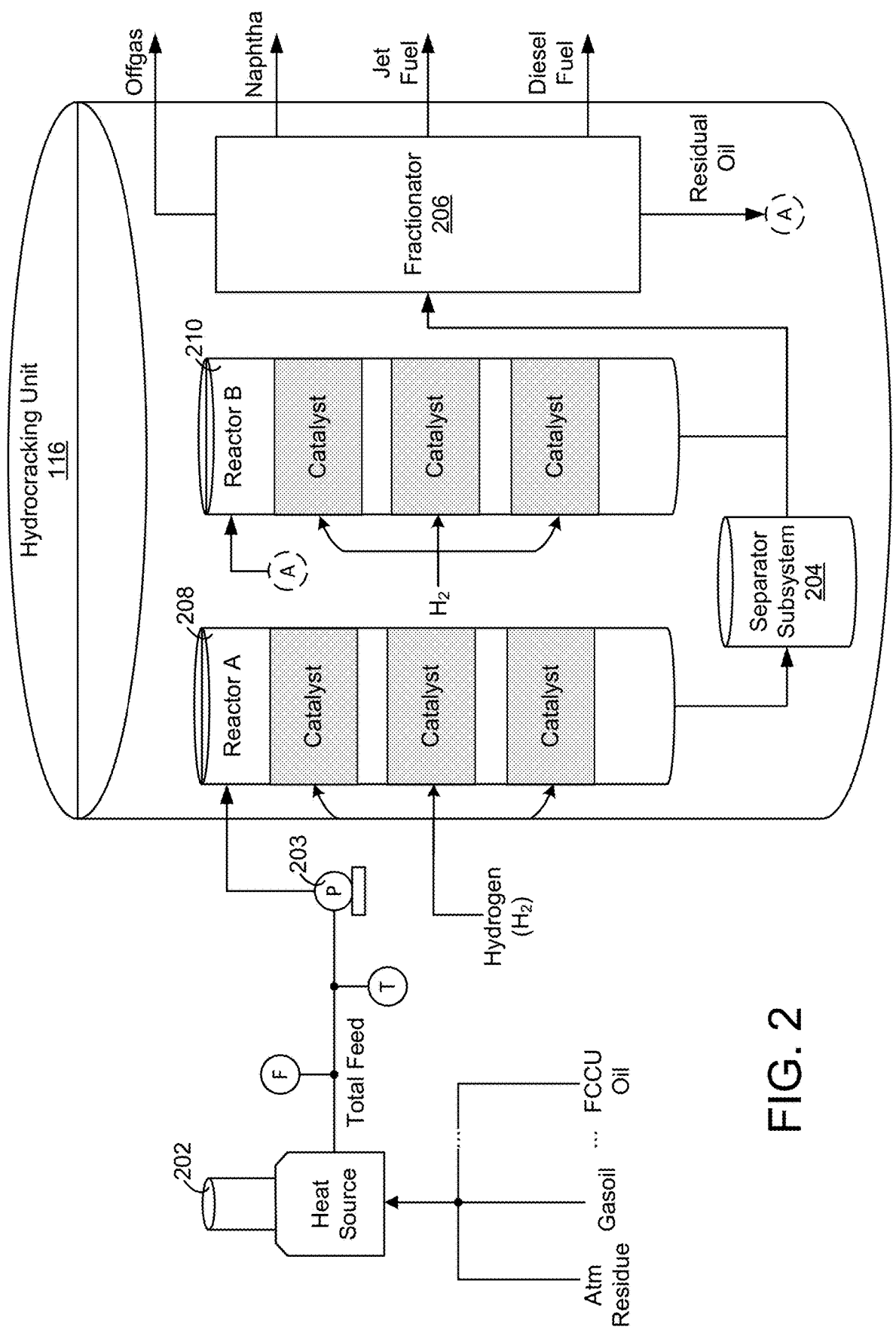
FIG. 2 is a diagram of a hydrocracking unit which can be implemented in the petroleum refinery system of FIG. 1, according to some embodiments.

Referring now to FIG. 2, a detailed block diagram of HCU 116 is shown, according to some embodiments. In the embodiment shown in FIG. 2, HCU 116 is shown to include several processes that relate to the overall production of light hydrocarbons using hydrogen, a catalyst, and a feed. However, it is contemplated that one or more of these processes can be performed outside of HCU 116 (e.g., by other components of system 100) in other embodiments. For example, the fractionation processes performed by fractionator 206 may be performed in a unit separate from HCU 116. HCU 116 is shown to include reactor separator subsystem 204, fractionator 206, reactor 208 and reactor 210.

HCU 116 is shown in FIG. 2 as a two stage hydrocracker configuration. This configuration may use two reactors (i.e. reactor 208 and reactor 210) and recycle the residual hydrocarbon oil from the bottom of fractionator 206 back into reactor 210 for further cracking. In some embodiments, the first stage reactor feed is virtually free of some or all of organic sulfur, organic nitrogen ammonia, hydrogen sulfide, or any combination thereof. This allows reactor 210 to use a higher performance catalyst (e.g., palladium catalyst, platinum catalyst, other noble metal catalysts, etc.) that otherwise would may be desired when used with sulfuric or nitrogen compounds.

It should be noted that HCU 116 being implemented as a two-stage hydrocracker as shown in FIG. 2 is only an exemplary embodiment, and other configurations can be considered as well. For example, HCU 116 may alternatively be configured as a single stage once-through hydrocracker, which utilizes only a single reactor and any uncracked residual oil from the bottom of fractionator 206 is not recycled for further cracking. In another example, HCU 116 is configured to be a single stage hydrocracker with recycling capabilities. In such an example, the uncracked residual hydrocarbon oil from the bottom of reaction product fractionation tower is recycled back into the single reactor for further cracking. For embodiments in which HCU 116 is implemented using a single reactor, the feedstock may need to be hydrotreated first to remove some or all of organic sulfur, organic nitrogen ammonia, hydrogen sulfide, or any combination thereof, or the catalyst used in the reactor would need to be capable both of hydrotreating and hydrocracking processes.

HCU 116 may receive a feedstock from several different units and processes upstream of system 100, which can include atmospheric gas oil from atmospheric crude oil distillation units, vacuum gas oil from VDU 112, coking gas oil from coker subsystem 114 (e.g., coker units within coker subsystem 114, etc.), slurry oil, or any combination thereof. In a general embodiment, the total feed entering HCU 116 may be referred to herein as gas oil, gas oil feed, and/or total feed.

The feed may be initially heated by heat source 202 and then pumped into reactor 208 via pump 203 (e.g., or vice versa, etc.). This feed may be mixed with streams of high-pressure hydrogen and enter the first stage reactor (i.e., reactor 208). Inside of reactor 208, several beds of catalysts are placed that, when exposed to the hydrogen and feed, hydrogenates the feed. Upon leaving the reactor 208, the feed may be provided to separator subsystem 204.

Some or all parts of the stream prior to heat source 202 and directly into HCU 116 via pump 203 may be considered the feed entering HCU 116. In some embodiments, a control device (e.g., actuator and valve assembly, etc.) may be implemented within system 100 to adjust the feed rate entering into HCU 116. This can include adjusting the actual rate of volume entering into HCU 116, adjusting the amount of each amount component entering into the feed that enters into HCU 116, or a combination thereof.

While the systems and methods described herein generally refer to reactor severity being the MV adjusted to improve and/or optimize the CV, the input feed rate to HCU 116 may also be considered. Both the input feed rate and the reactor severity, either alone or in combination, can affect the production of the output oil products and/or the quality of the output oil products.

Separator subsystem 204 may be configured to inject the feed with wash water (not shown), partially condense the feed in a water-cooled condenser and route the feed into a high-pressure vapor-liquid separator for separation into three phases (e.g., hydrogen-rich gas, hydrocarbon liquid and water). This may be done as sulfur and nitrogen compounds in the feed are converted into gaseous hydrogen sulfide and ammonia by the hydrogenation that takes place in the first stage reactor. Additionally, the wash water may be added to dissolve some of the hydrogen sulfide and ammonia gases present in the first stage reaction product stream. The resulting aqueous solution of "sour water" (e.g., ammonium hydrosulfide (NH4HS)) may be routed to a sour water stripper (not shown) wherein the hydrogen sulfide is removed from the sour water and that hydrogen sulfide is subsequently converted to an end product of elemental sulfur.

Still referring to separator subsystem 204, the hydrogen-rich gas from the high-pressure separator may be routed through a scrubber where it is contacted with a solution to absorb and remove residual hydrogen sulfide in the gas. The rich solution (e.g., containing the absorbed hydrogen sulfide) may then be routed to a central gas treating unit elsewhere in the system (e.g., elsewhere in the refinery, etc.). The hydrocarbon liquid phase from the high-pressure separator may flow through a pressure letdown (e.g., pressure reduction) valve and into a low-pressure separator. The reduction in pressure can partially vaporize the liquid. The resulting vapor (i.e., offgas) can be routed to a central gas treating unit elsewhere in the system. Finally, the hydrocracked end products of the hydrocarbon liquid phase from the low-pressure separator can be heated again in a separate heater (not shown) and fed into fractionator 206.

Fractionator 206 may act as a distillation tower that separates cracked hydrocarbon streams into several different lighter hydrocarbon products, such as naphtha, jet fuel, and diesel oil. As HCU 116 is shown as a two-stage hydrocracker, some or all feed that is not cracked (e.g., feed that includes unconverted hydrocarbons from reactor 208) may be mixed with high pressure hydrogen (again) and recycled as feed into reactor 208. The outgoing feed from reactor 210 may feed back into fractionator 206.

Figure 3:
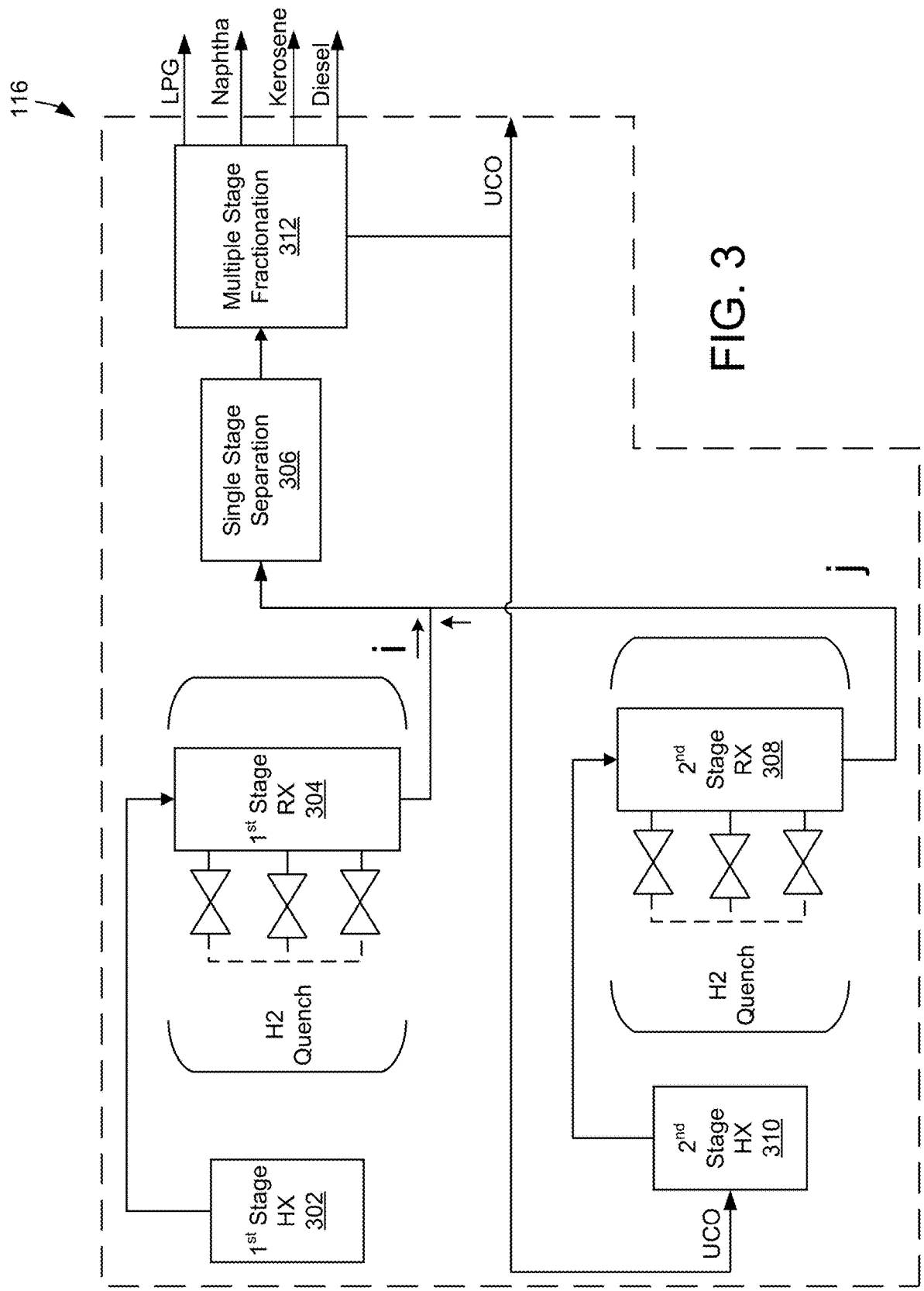
FIG. 3 is a block diagram of hydrocracker reactor stages which can be implemented in the hydrocracking unit of FIG. 2, according to some embodiments.

Referring now to FIG. 3, a block diagram illustrating an arrangement of the first stage(s) and second stage(s) of HCU 116 is shown, according to some embodiments. HCU 116 may include any number of stages which may be arranged in series, in parallel, or in any combination thereof. Each stage of HCU 116 may include hydrotreating, hydrocracking, or a combination of both. In the embodiment shown in FIG. 3, HCU 116 is shown to include a first hydrotreating sub-stage 302, a first hydrocracking sub-stage 304, a second hydrotreating sub-stage 310, a second hydrocracking sub-stage 308, a single stage separation process 306, and a multiple stage fractionation process 312.

In some embodiments, first hydrotreating sub-stage 302 removes organic sulfur and/or organic nitrogen from the incoming feed. The processed feed can then be provided to first hydrocracking sub-stage 304, whereupon the large hydro-carbon molecules in the feed are broken down into shorter molecules in the presence of the hydrogen and catalyst. In some embodiments, first hydrotreating sub-stage 302 and first hydrocracking sub-stage 304 may be part of a single process. In various embodiments, one or more instances of first hydrocracking sub-stage 304 be present, as denoted by the subscript "i" and the brackets surrounding first hydrocracking sub-stage 304. The one or more instances of first hydrocracking sub-stage 304 may be arranged in series with each other, in parallel with each other, or in any combination thereof. In some embodiments, first hydrotreating sub-stage 302 may also be duplicated one or more times.

After the feed has been hydrogenated within first hydrocracking sub-stage 304, the feed is provided to single-stage separation process 306, where the feed is separated into several different feed sections based on the phase of the feed: hydrogen-rich gas, hydrocarbon liquid and water. Finally, the hydrocarbon liquid is provided to multiple stage fractionation process 312. In some embodiments, multiple stage fractionation process 312 includes some or all of the processes performed by fractionator 206 described above with reference to FIG. 2. The now-processed and hydrotreated feed is cracked into smaller hydrocarbon chains to produce several different fractions, including LPG, naphtha, kerosene, and diesel.

In some embodiments, some of the feed that is not converted into fractions (i.e., unconverted cycle oil (UCO)) is routed back to a reactor (e.g., second hydrotreating sub-stage 310) for further processing. This may be performed in a hydrocracking unit equipped with multiple rectors (e.g., two-stage hydrocracker) that allows for further refining/processing or UCO. For example, some or all of the UCO from multiple stage fractionation process 312 can be provided to second hydrocracking sub-stage 310, whereupon the large hydro-carbon molecules in the feed are broken down into shorter molecules in the presence of the hydrogen and catalyst. In some embodiments, second hydrotreating sub-stage 310 and second hydrocracking sub-stage 308 may be part of a single process. In various embodiments, one or more instances of second hydrocracking sub-stage 308 be present, as denoted by the subscript "j" and the brackets surrounding second hydrocracking sub-stage 308. The one or more instances of second hydrocracking sub-stage 308 may be arranged in series with each other, in parallel with each other, or in any combination thereof. In some embodiments, second hydrotreating sub-stage 310 may also be duplicated one or more times.

Figure 4:
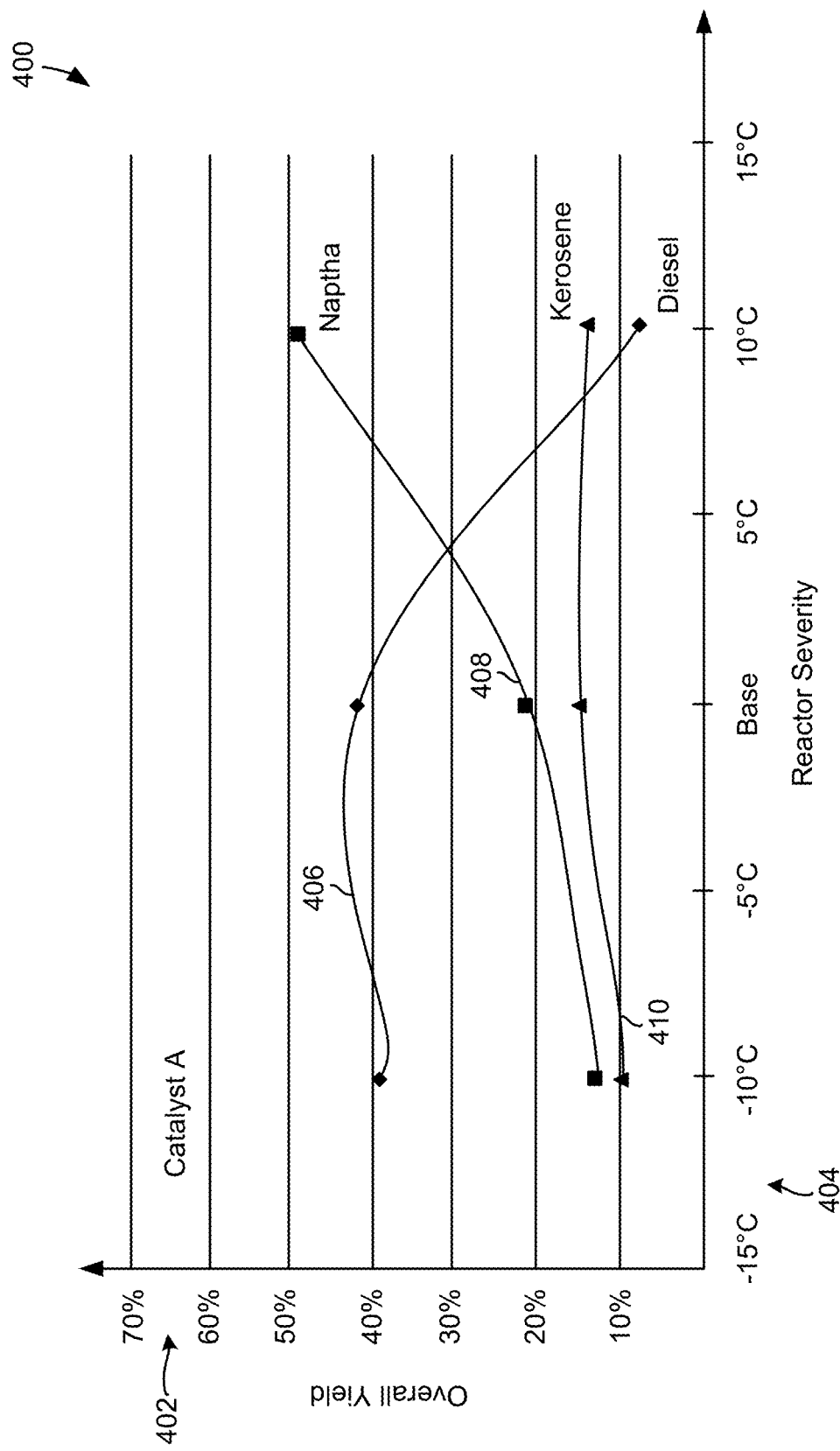
FIG. 4 is a graph of overall yield of a hydrocracking unit over a range of reactor severity, according to some embodiments.
Figure 5:
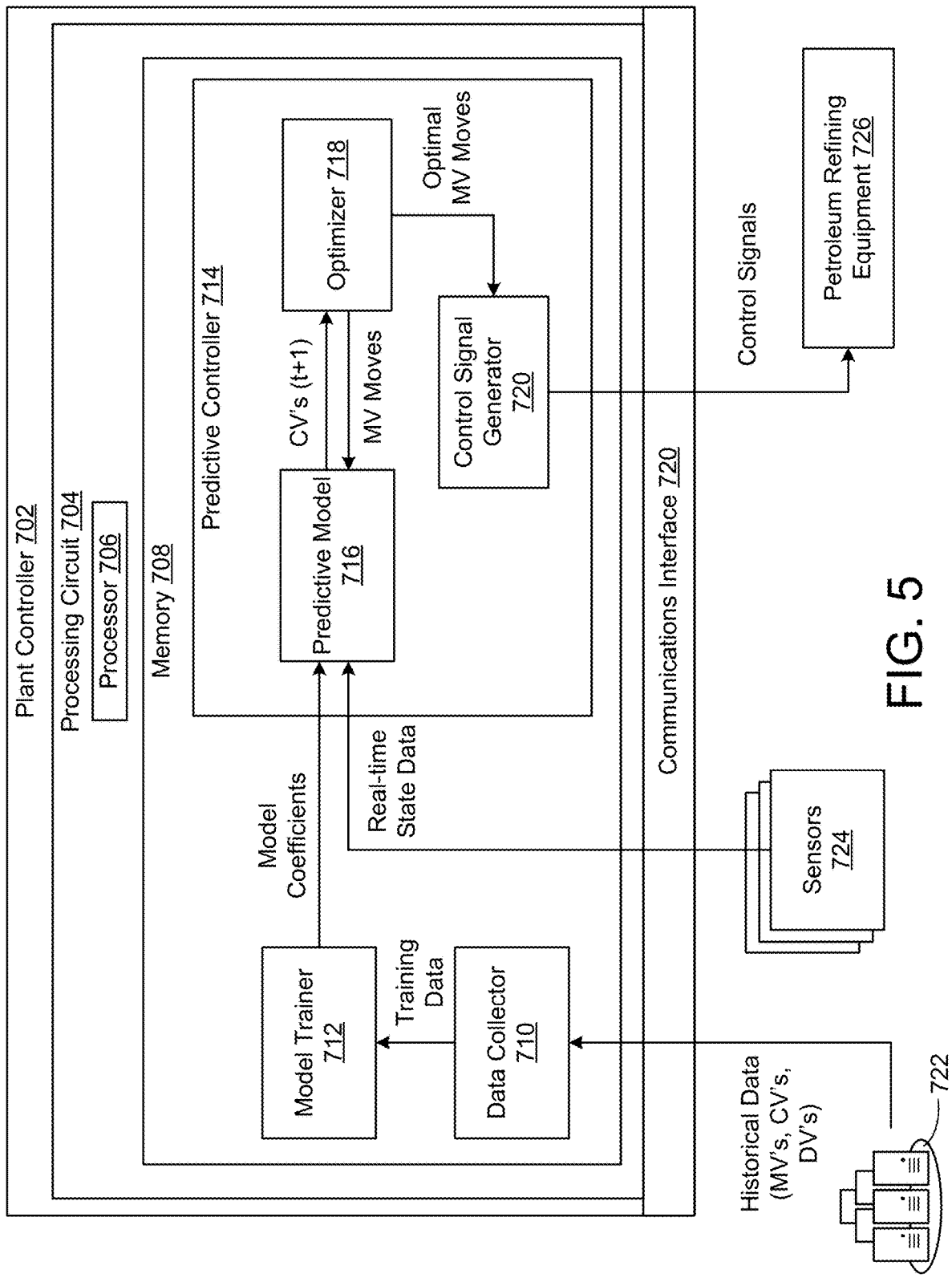
FIG. 5 is a block diagram of a plant controller with model predictive control functionality, which can be implemented in the petroleum refinery system of FIG. 1, according to some embodiments.
Figure 6:
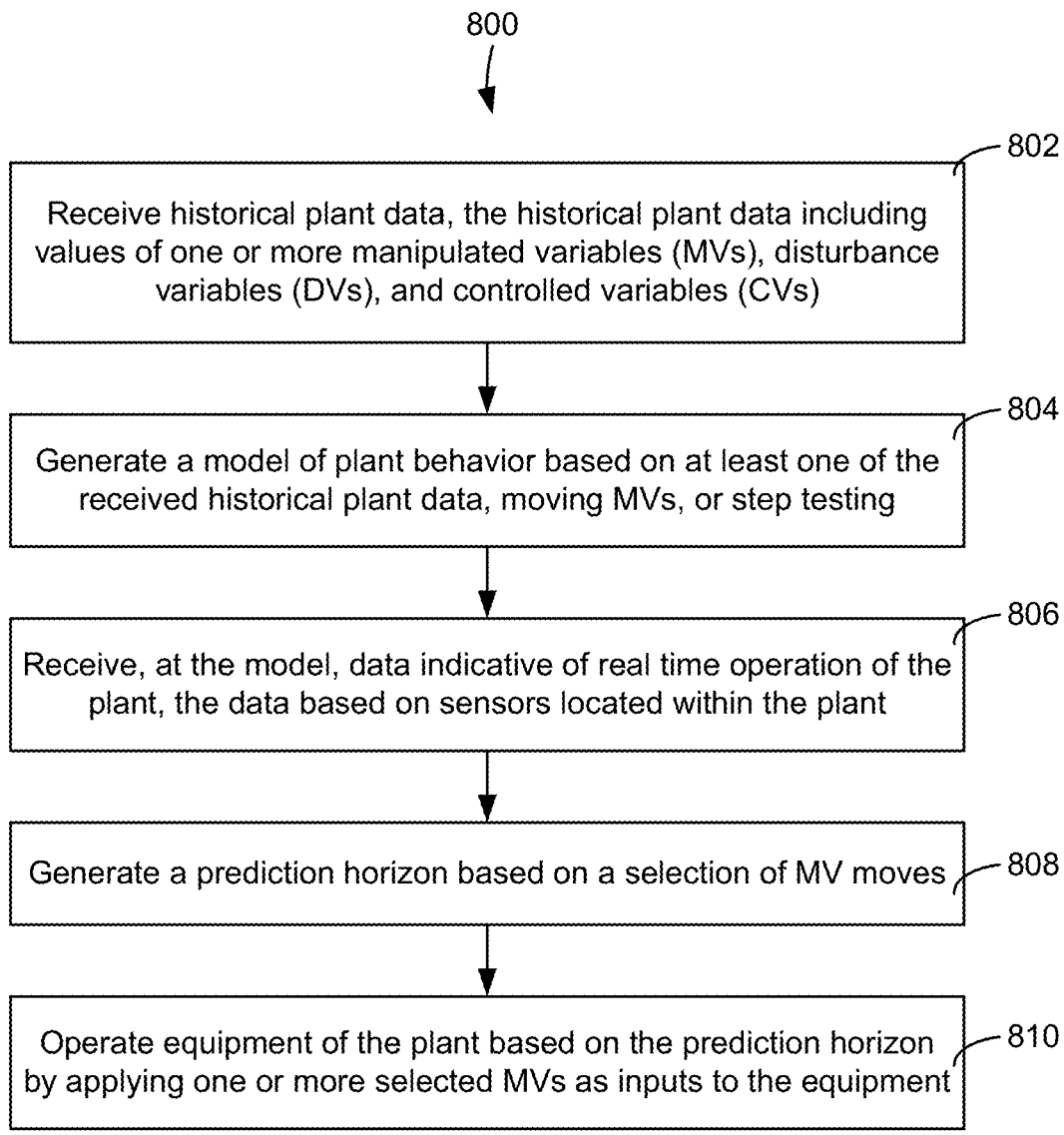
FIG. 6 is a flow diagram of a process for performing model predictive control of a plant, which can be performed by the controller of FIG. 5, according to some embodiments.

Referring now to FIGS. 4-6, graph 400 shows the overall yield of HCU 116 (Y-axis) vs. reactor severity inside of HCU 116 (X-axis), according to some embodiments. Graph 400 shows several of the output products created during the hydrotreating, hydrocracking, and fractionation processes in HCU 116 produce different yields when exposed to different reactor severities. For example, the overall yield of naphtha will be greater than kerosene and diesel when reactor 208 operates at a high reactor severity (e.g., +25° C., etc.).

As referred to herein, reactor severity may be a measure of the energy required to break the molecular bonds in the less-valuable heavy gasoil feedstock to produce the lighter, more valuable molecules. In some embodiments, reactor severity is proportional to reactor temperature or a function of reactor temperature (e.g., positively correlated with reactor temperature). The reactor severity can be controlled or adjusted using any type of heating device (e.g., a heat exchanger, a fuel burner, a resistive heater, an exothermic chemical reaction, etc.) that affects the temperature of input oil feeds entering into the HU. The reactor severity can also be controlled or adjusted by modulating the amount of hydrogen introduced into HCU 116 (i.e., the "H2 Quench" shown in FIG. 3). For example, increasing the amount of hydrogen introduced into HCU 116 may quench the reaction within HCU 116 and reduce temperature and reactor severity, whereas decreasing the amount of hydrogen introduced into HCU 116 may result in increased temperature and reactor severity. The flow of hydrogen into HCU 116 can be controlled by operating actuators or electronic valves located along hydrogen inlet line feeding into HCU 116. In various embodiments, reactor severity can be measured or quantified at any location within or proximate to HCU 116. For example, the reactor severity can be or include reactor temperature, reactor outlet temperature, riser temperature, and pre-heat temperature, exothermic heat from the catalyst reaction, or any combination thereof.

In some embodiments, reactor severity includes one or more bed temperatures of the catalyst beds located within the reactor. For example, reactor severity, as referred to herein, can include:

$$WABT = \Sigma(x_i(T_{IN,i} + \tfrac{2}{3}[\Delta T_{OUT,i}]))$$

Where WABT is the weighted average bed temperature, $x_i$ is a fraction of catalyst in a given bed (i) or reactor, $T_{IN}$ is the inlet temperature to the given bed (i) or reactor, and $T_{OUT}$ is the outlet temperature to the given bed (i) or reactor.

For a given amount or rate of input oil feed into HCU 116, the reactor severity can be controlled to adjust the yield, a product quality of one or more of the output products, or a combination thereof of one or more of the output products, or drive the yield and/or the product quality of the one or more output products to desired values (e.g., target values, setpoints, etc.). As an example, if the reactor severity is too high, a greater amount of naphtha may be produced than is desired, resulting in less diesel/jet fuel being produced from the feed. Similarly, too little naphtha can be produced than desired if the reactor severity in the reactor (or multiple reactors) is too low. Overall, in some embodiments, the relationship between the varying product yields of the hydrocracking unit and the reactor severity of the one or more reactors is non-linear.

As mentioned above, product quality can be improved and/or optimized (e.g., either exclusively or in combination with optimizing a valuable product yield, etc.). This may be performed by implementing the product quality as a CV, and using one or more control techniques (e.g., predictive control, model predictive control, neural network-based control, etc.) to optimize the CV (e.g., optimize the total amount of the product quality in one or more output streams, optimize the total value of the one or more output streams based on the product quality, etc.). Other properties that could be controlled using this process include LPG distillation curve (Initial boiling point through to End Point), LPG Reed Vapor Pressure, Naphtha distillation curve (Initial boiling point through to End Point), Naphtha octane, Diesel distillation curve (Initial boiling point through to End Point), Diesel Flash Point, Diesel Freeze Point, Diesel Cloud Point, Diesel Cetane Number, and UCO color.

Furthermore, the non-linearity can be affected by several factors within HCU 116, such as the lifespan of the catalyst, the feed rate into HCU 116 or into specific reactors inside of HCU 116, the catalyst composition, and the composition of the feed (e.g., mostly slurry oil, no atmospheric residue, mostly gas oil, etc.). As described in detail below, one or more processing devices (e.g., one or more controllers, processors, neural networks, machine learning modules, a combination thereof, etc.) can be configured to implement a control technique (e.g., optimize an objective function) to produce the desired amount of hydrocarbon products.

Hydrocracking Unit Control

Model Predictive Control

Referring now to FIG. 5, a detailed block diagram of plant controller 702 for performing control of system 100 using predictive control (e.g., Model Predictive Control (MPC), etc.) is shown, according to some embodiments. System 700 includes a plant controller 702, database 722, sensors 724, and petroleum refining equipment 726. In some embodiments, plant controller 702 uses predictive modeling to make control decisions, as shown in FIG. 5. In other embodiments, plant controller 702 uses one or more neural networks (e.g., a predictor neural network, a controller neural network, etc.) to make control decisions for some or all parts of system 100, which is described in greater detail below. As shown in FIG. 5, plant controller 702 receives historical data from database 722 and input data from sensors 724 and uses model predictive control to generate control signals for petroleum refining equipment 726. Plant controller 702 may be configured to control an oil refinery process as a whole (e.g., control system 100) or a portion or subsystem of system 100, such as system 200.

In some embodiments, plant controller 702 is configured to improve and/or optimize the most valuable total yield of HCU 116, optimize the total volume gain of HCU 116 (e.g., the most amount of product being products regardless of the value of each respective fraction, etc.), or a combination thereof, using a model-based feedback control technique such as MPC or other types of feedback control techniques (e.g., proportional control, proportional-integral (PI) control, proportional-integral-derivative (PID) control, etc.). For example, plant controller 702 may generate the most valuable amount of total product yield output by HCU 116, by operating reactor 208 at a reactor severity such that the amount of more valuable hydrocarbon products (e.g., diesel fuel, etc.) is increased and the amount of less valuable products (e.g., naphtha, etc.) are decreased. In other embodiments, the feed into HCU 116 can be controlled to vary the rate of incoming feed into HCU 116 to adjust the total yield.

In some embodiments, plant controller 702 is configured to improve and/or optimize the most valuable total product quality in a single output product of HCU 116. For example, plant controller 702 may generate the most valuable amount of total product quality output by HCU 116, by operating reactor 208 at a reactor severity such that the amount of more valuable hydrocarbon products (e.g., diesel fuel, etc.) is increased and the amount of less valuable products (e.g., naphtha, etc.) are decreased. In other embodiments, plant controller 702 may operate a feed control assembly that adjusts the rate of feed into HCU 116.

In some embodiments, plant controller 702 is configured to improve and/or optimize the most valuable total product quality of several or all of the output products of HCU 116. For example, when multiple different output oil products of HCU 116 are produced, one or more output oil products could have a cetane number (CN) indicating the combustion speed of the diesel compounds and the compression required for ignition of the diesel compounds. The hydrocracking processes within HCU 116 can produce distillates with different CN's and/or different rates of CN's. From this, plant controller 702 may be configured to optimize the most amount of CN produced by all of the output products. Of course, only a single distillate (e.g., diesel) could be improved and/or optimized for product quality (e.g., CN, etc.) as well.

In some embodiments, plant controller 702 is configured to improve and/or optimize a combination of the most valuable total yield of HCU 116 and the most valuable total product quality of HCU 116. In some embodiments, any and all combinations of adjusting reactor severity and/or input feed rate, to control total product yield, most valuable product yield, and product quality, can be considered.

Plant controller 702 is shown to include communications interface 720 and processing circuit 704 including processor 706 and memory 708. Processing circuit 704 can be communicably connected to communications interface 720 such that processing circuit 704 and the various components thereof can send and receive data via communications interface 720. Processor 706 can be implemented as a general purpose processor, an application specific integrated circuit (ASIC), one or more field programmable gate arrays (FPGAs), a group of processing components, or other suitable electronic processing components.

Communications interface 720 can be or include wired or wireless communications interfaces (e.g., jacks, antennas, transmitters, receivers, transceivers, wire terminals, etc.) for conducting data communications. In various embodiments, communications via communications interface 720 can be direct (e.g., local wired or wireless communications) or via a communications network (e.g., a WAN, the Internet, a cellular network, etc.). For example, communications interface can include an Ethernet card and port for sending and receiving data via an Ethernet-based communications link or network. In another example, communications interface 720 can include a Wi-Fi transceiver for communicating via a wireless communications network. In another example, communications interface 720 can include cellular or mobile phone communications transceivers.

Memory 708 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present disclosure. Memory 708 can be or include volatile memory or non-volatile memory. Memory 708 can include database components, object code components, script components, or any other type of information structure for supporting the various activities and information structures described in the present disclosure. According to an example embodiment, memory 708 is communicably connected to processor 706 via processing circuit 704 and includes computer code for executing (e.g., by processing circuit 704 and/or processor 706) one or more processes described herein.

In some embodiments, plant controller 702 is implemented within a single computer (e.g., one server, one housing, etc.). In various other embodiments plant controller 702 can be distributed across multiple servers or computers (e.g., that can exist in distributed locations). Further, while FIG. 5 shows database 722 outside of plant controller 702, in some embodiments database 722 can be hosted within plant controller 702 (e.g., within memory 708). Memory 708 is shown to include data collector 710, model trainer 712, and predictive controller 714.

Data collector 710 may be configured to collect or receive one or more data sets for controlling some or all components of systems 100-600. Data collector 710 may receive manipulated variables (MV's), controlled variables (CV's), and disturbance variables (DV's). MV's may be variables that can be adjusted to keep CV's at their intended set points. MV's may include control signals that are provided as inputs to equipment, setpoints that are provided as inputs to controllers, or other variables that can be directly manipulated (i.e., adjusted, set, modulated, etc.) by plant controller 702. Examples of MV's for system 100 can include reactor severity, reactor WABT's, feed rate, or any combination thereof.

CV's may quantify the performance or quality of one or more variables affected by the controlled system or process. Examples of CV's may include measured values (e.g., temperature, pressure, energy consumption, etc.), calculated values (e.g., efficiency, coefficient of performance (COP), etc.), or any other values that characterize the performance or state of a controllable system or process. Some CV's may be quantities that are not capable of being directly manipulated by plant controller 702 (e.g., highest value volume gain, etc.), but rather can be affected by manipulating corresponding MV's that affect the CV's (e.g., increasing the reactor severity of HCU 116, etc.). Examples of CV's can include organic sulfur and/or nitrogen concentrations in the reactor effluent (e.g., feed being processed by HCU 116, etc.), naphtha product distillation boiling points, naphtha product sulfur concentration, naphtha product flash point, diesel product cloud point, diesel product distillation boiling points, diesel product flash point, diesel product sulfur concentration, UCO distillation boiling points, product stream flows, conversion ratios, conversion levels, hydraulic constraints, any product stream or intermediate flow, or any combination thereof. CVs may include the volumes, flow rates, mass, or other variables that quantify the amount of the various output oil products produced by the HU.

DV's or "load variables" may represent disturbances that can cause CV's to deviate from their respective set points. Examples of DV's include measurable or unmeasurable disturbances to the system such as outside air temperature, outside air humidity, uncontrolled sources of heat transfer, etc. DV's are typically not controllable, but may be measurable or unmeasurable depending on the type of disturbance. Any of the variables described as MV's may be DV's in some embodiments in which the system cannot control those variables. Similarly, any of the variables described as DV's may be MV's in some embodiments in which the system can control those variables. Data collector 710 is configured to provide the training data to model trainer 712. Examples of DV's can include feed rate, feed composition, hydrogen flow rate, reactor pressure, catalyst age, separation and/or fractionation section temperatures and pressures, reactor temperature differentials, intermediate flow rates, upstream unit process operating conditions, or any combination thereof.

Data collector 710 may be configured to separate the collected data into one or more episodes. In some embodiments, the historical data represents a variety of different control situations over different periods of time. The full set of historical data may represent the non-linear behavior of the system over a relatively long time period (e.g., days, months, years, etc.). Each sample of the historical data may include values for all of the MV's, CV's DV's, and potentially other variables at an instantaneous time or over a time step having a predetermined duration (e.g., 1 second, 1 minute, 15 minutes, 1 hour, etc.). Each sample of the historical data may include a time stamp indicating a time at which the sample was collected and defines a corresponding "state" of the system at the time the sample was collected. In some embodiments, the samples of historical data are separated into "episodes" which include the historical data for a window of time. These episodes may be predetermined prior to being received at plant controller 702 (e.g., the start times, end times, and/or duration of each episode may be predefined) or can be automatically determined within plant controller 702 based on attributes of the historical data and/or an operating condition of system 100 at a time when the historical data were collected.

In some embodiments, data collector 710 groups the time steps into "episodes" for modeling purposes. Each episode may encompass a period of time large enough to include multiple samples of the historical data (e.g., multiple time steps, etc.), but may encompass a period of time small enough such that the behavior of the system is substantially linear within a given episode. In other words, each episode may include a portion of the historical data that, when viewed in isolation, indicates substantially linear system behavior within the episode. In an exemplary embodiment, plant controller 702 is used to provide control instructions to system 100, which operates in a non-linear environment as indicated by the received historical data, when modeled holistically. However, the relationship between the MV's and CV's and/or the DV's and CV's can be modeled as a set of localized linear relationships when broken up into multiple episodes.

In some embodiments, data collector 710 is configured to generate representative values of the MV's, CV's, and DV's for each of the episodes of the historical data. In some embodiments, the representative values may be average, median, mean, or other type of aggregated values of the MV's, DV's, and CV's over the corresponding episode. For example, the representative value of a particular MV over the episode may be the average of all of the values of that particular MV indicated by the samples of the historical data within the episode.

In some embodiments, the historical data include not only multiple samples of the variables that affect the plant equipment (e.g., DV's, MV's, etc.) but also multiple samples of the variables that are affected by operating the plant equipment (e.g., CV's), which are the indicators of the final control product. As control systems for plants can be non-linear, the historical data is separated into episodes that allow the data to be modeled in a linear fashion. The relationships between the MV's and the CV's maintain a linear or generally linear relationship within each episode. In some embodiments, the samples within each episode are then averaged to create a single representative value of each of the variables for the episode, which are then used to train a neural network.

Model trainer 712 may be configured to generate a model of the plant (e.g., system 100) based on the historical data. In some embodiments, the training data also includes data relating to moving MV's and/or step testing. Model trainer 712 may be configured to determine one or more coefficients of a model that represents the dynamic and sometimes nonlinear behavior of the plant. For embodiments in which plant controller 702 performs model predictive control, the coefficients of the model may include values of one or more matrices (e.g., elements of the matrices) that characterize the dynamic behavior of the plant. Model trainer 712 may be configured to provide the model coefficients to predictive controller 714, which is shown to include predictive model 716, optimizer 718, and control signal generator 719.

Predictive model 716 may receive the model coefficients from model trainer 712, resulting in predictive model 716 becoming a trained or identified model. Predictive model 716 may be configured to predict values of the CV's at the next time step t+1 as a function of the real-time state data at time step t as well as a set of potential values for the MV's at time step t. Specifically, the predictive model can relate the reactor severity MV to the amounts of the various output products CVs. The set of values for the MV's may be treated as decision variables and adjusted by optimizer 718 while performing an optimization process, described in greater detail below. During operation, predictive controller 714 may provide real-time state data as an input to predictive model 716 and use predictive model 716 to generate a trajectory of predicted values of the CV's over a time horizon that extends from time t to a future time step t+T (i.e., t, t+T).

Optimizer 718 may be configured to perform an optimization process using predictive model 716. In some embodiments, the optimization process includes optimizing an objective function or cost function to determine optimal values of the MV's or optimal MV moves. In some embodiments, the objective function may consider both an established price of each hydrocarbon product and the flow rate of each hydrocarbon product, as well as the cost of feed and the flow rate of the feed. An exemplary objective function is shown below:

$$Obj.Function\left(\frac{flow}{time}\right) = [\text{unconverted product } (UCO) * UCO \text{ price} +$$
$$\text{diesel flow} * \text{diesel price} + naphtha \text{ flow} * naphtha \text{ price} +$$
$$\text{kerosene flow} * \text{kerosene price} +$$
$$LPG \text{ flow} * LPG \text{ price}] - [\text{flow rate} * \text{feed price}]$$

The prices can be used within the objective function can be updated while the model is running closed-loop and controlling the process. Changes in prices can cause the model to manipulate the operating conditions of HCU 116 to yield the most profitable product mix for that pricing environment. This can allow the same model to be used throughout different economic operating regimes without the need for separate modes (e.g., gasoline mode, diesel mode, etc.) or additional robustness testing. In some embodiments, the prices can be changed with little or no downtime.

In some embodiments, the objective function can be configured to maximize the total volume of one or more of the total hydrocarbon products rather than optimizing the maximum value of the one or more hydrocarbon products. For example, the objective function could include:

$$Obj.Function\left(\frac{vol}{time}\right) = [\text{unconverted product } (UCO) + \text{diesel flow} +$$
$$naphtha \text{ flow} + \text{kerosene flow} + LPG \text{ flow}] - [\text{feed flow rate}]$$

without including the pricing of the one or more hydrocarbon products. In various embodiments, the pricing of the one or more hydrocarbon products can be included in the objective function for some hydrocarbon products and not others. In some embodiments, the objective function could be or include the sum of the output flow rates divided by the input flow rate, such that the objective function can quantify the volume gain (e.g., the ratio of output volume to input volume).

In some embodiments, the objective function can be configured to maximize the total product quality of one or more of the output oil products. In some embodiments, a product quality considered valuable is the cetane number of diesel fuel. As such, the objective function could apply an upgraded price for the price of diesel fuel based on the cetane number found in the fuel. In some embodiment, the CN of the diesel can be tested via a sample of the diesel external from system 100 (e.g., within a lab, etc.) and provided back to plant controller 702 for processing. In some embodiments, system 100 includes measuring instruments capable of measuring the CN of the diesel stream (e.g., in real-time, at certain intervals, etc.) and providing the CN data back to plant controller 702.

Using the above example, the objective function could include:

$$Obj.Function\left(\frac{flow}{time}\right) = [[\{diesel\ flow\} * \{diesel\ price\} +$$
$$\{cetane\ upgrade\ value\} *$$
$$\{cetane\ number\ in\ diesel\ stream - base\ cetane\ number\}] +$$
$$unconverted\ product\ (UCO) * UCO\ price +$$
$$naphtha\ flow * naphtha\ price + kerosene\ flow * kerosene\ price +$$
$$LPG\ flow * LPG\ price] - [flow\ rate * feed\ price]$$

The above objective function provides an upgraded price for the product quality of CN, based on the difference between the actual CN in the diesel stream (e.g., the output oil product, etc.) and the base cetane number. "Cetane Upgrade Value" in the above equation may refer to a constant value that associates the CN quantity with an appropriate price upgrade when accounting for the price of the diesel stream.

In some embodiments, the objective function can include any number of weights in the objective function such that the various hydrocarbon products are weighted differently when attempting to maximize the objective function. The prices in the first embodiment of the objective function shown above act as weights on the flow rate terms. However, it is contemplated that different weights can be applied to the flow rate terms other than their prices. For example, if maximizing the volume of naphtha produced by HCU 116 is desired, while maximizing the volume of jet fuel is less desired, then the variable representing naphtha volume may be weighted higher than the variable representing jet fuel volume, regardless of the prices of the naphtha and jet fuel. In some embodiments, multiple weights may be applied to each of the flow rate terms and may combine to form an overall weight for each flow rate term such that the overall weight applied to a flow rate term is a combination (e.g., a sum or product) of a price-based weight and a price-independent weight. Of course, any number of weights and prices, either alone or in combination, can be used to prioritize certain hydrocarbon products over others.

In some embodiments, the objective function may include one or more terms that quantify the error between the current or predicted values of the CV's and target or setpoint values for the CV's. In some embodiments, the objective function may include one or more terms that quantify the amount of input resources (e.g., input oil feeds) consumed by system 100 or a cost of the input resources consumed. Optimizer 718 may be configured to iteratively adjust the values of the MV's and use predictive model 716 to predict the resulting values of the CV's that will result from each set of MV's. Optimizer 718 may continue adjusting the MV's while performing the optimization process until an optimal result is reached (e.g., minimum value of the objective function). Once the optimal result is reached, the values of the MV's that resulted in the optimal result may be designated as optimal values of the MV's or optimal MV moves. The objective function in this embodiment may be the same as or similar to any of the objective functions described with reference to FIG. 5.

These optimal MV moves may be provided to control signal generator 719, such that control signal generator 719 can provide control signals to petroleum refining equipment to satisfy the optimal MV moves. In some embodiments, only the first step of the control strategy (e.g., the modeled predictions of CV's over the time horizon determined by predictive model 716) is implemented. Then, process repeats itself, and the calculations are repeated starting from the new current state, yielding a new control scheme and new predicted state path for both the MV's and CV's.

Petroleum refining equipment 726 may be configured to receive control signals from plant controller 702 and affect the manipulated variables of the system 100. In some embodiments, petroleum refining equipment 726 includes a valving system to affect the flow of feed into HCU 116 and/or a valving system to affect the flow of hydrogen into HCU 116. In some embodiments, petroleum refining equipment 726 includes equipment capable of adjusting the reactor severity within HCU 116. Sensors 724 may be configured to provide measurements of environmental data to plant controller 702 as inputs for making control decisions. In some embodiments, the information from sensors 724 acts as CV's, MV's, DV's, TVs or any combination thereof for historical data or real-time data of system 100.

Referring now to FIG. 6 a flow diagram of a process 800 for performing model predictive control is shown, according some embodiments. Process 800 may be performed by any of the processing circuitry described herein, such as plant controller 702. In some embodiments, process 800 is at least partially performed by predictive controller 714 as described above with reference to FIG. 5.

Process 800 is shown to include receiving historical plant data, the historical plant data including values of one or more manipulated variables (MV's), disturbance variables (DV's), and controlled variables (CV's) (step 802). Data collector 710 may be configured to receive the historical plant data from database 722. In some embodiments, the data includes MV's, DV's, and/or CV's for one or more historical time periods (e.g., historical states) of the plant (e.g., operation of system 100). For example, at the time step t (e.g., Friday @ 10:15 AM, etc.) the historical data may indicate that the temperature of the feed entering reactor 208 after being pre-heated is 460° C. (MV), the feed prior to entering heat source 202 to be pre-heated is 400° C. (DV), the temperature within reactor 208 (i.e., the temperature relating to the reactor severity, etc.) is 535° C. (MV), and the intended volume gain of HCU 116 is 2,000 m³ (TV) to maximize the most valuable amount of total hydrocarbon products (CV)—the CV potentially being based on any number of factors, such as a ratio of the total amount of light hydrocarbons per the total incoming feed (e.g., 0.6, 0.7, etc.), the monetary value associated with each light hydrocarbon product, the production efficiency of each hydrocarbon product compared to one another, the production efficiency at a given reactor severity, or any combination thereof.

Other CV's, DV's, MV's, and TVs can also be considered. For example, the CV may also incorporate the price of the different lighter hydrocarbons being produced by HCU 116 as a factor of the optimization problem. In such embodiments, weights may be accorded to the different light hydrocarbon product yields such that those that have less monetary value are weighted lower than those with higher monetary value. In another example, the quality of the feed acts as a manipulated variable, and the plant has control over selectively mixing the different feed components to achieve a certain feed quality.

Process 800 is shown to include generating a model of plant behavior based on at least one of the received historical plant data, moving MV's, or step testing. In some embodiments, the model is generated by model trainer 712. The model can include a predictive model (e.g., a set of matrices used in MPC), multi-variable algorithms, cost functions, objective functions, optimization constraints, initial values of the model (e.g., initial values of states tracked by the model), and/or other criteria for determining a predictive model.

Process 800 is shown to include receiving, at the model, data indicative of real-time operation of the plant, the data based on sensors located within the plant (step 806) and generating a prediction horizon based on a selection of MV moves (step 808). The model coefficients can be provided to predictive model 716, wherein the predictive model is configured to generate CV predictions over a time horizon. The time horizon may be relatively short, as only the first move predicted throughout the time horizon may be implemented during model predictive control.

Process 800 is shown to include operating equipment of the plant based on the prediction horizon by applying one or more selected MV's as inputs to the equipment (step 810). Control signals may be provided to petroleum refining equipment 726 to satisfy optimal MV setpoints that, based on the predictions made by predictive model 716, will achieve the predicted CV's. In some embodiments of implementing process 800 as described above, the chosen MV moves may typically be those for which horizon provides optimal performance in terms of an objective function (e.g., as described below with reference to process 1200, etc.).

In some embodiments, one or more reactor severity control mechanisms (e.g., modules, components, etc.) are located proximate to HCU 116 or upstream/downstream of HCU 116 to adjust the reactor severity within reactor 208. For example, one reactor severity control mechanism that can adjust the reactor severity within HCU 116 at least in part can be a valving system that adjusts the flow of catalyst into riser 204. In some embodiments, another reactor severity control mechanism can include a valving system controlling the amount of feed entering HCU 116. In some embodiments, another reactor severity control mechanism is a heat source 202 that pre-heats the incoming feed. In some embodiments, another reactor severity control mechanism can include a valving system controlling the amount of hydrogen entering HCU 116. In some embodiments, another reactor severity control mechanism can be a mechanism for adjusting the amount of catalyst placed within reactors 208, 210 in HCU 116. The reactor severity control mechanisms may be part of petroleum refining equipment 726 described below, and may be configured to receive control signals from plant controller 702 to adjust one or more MV's of the plant (e.g., to increase the volume of valuable hydrocarbon products produced by HCU 116, etc.).

Offline Trained Predictor Neural Network and Controller Neural Network

Figure 7:
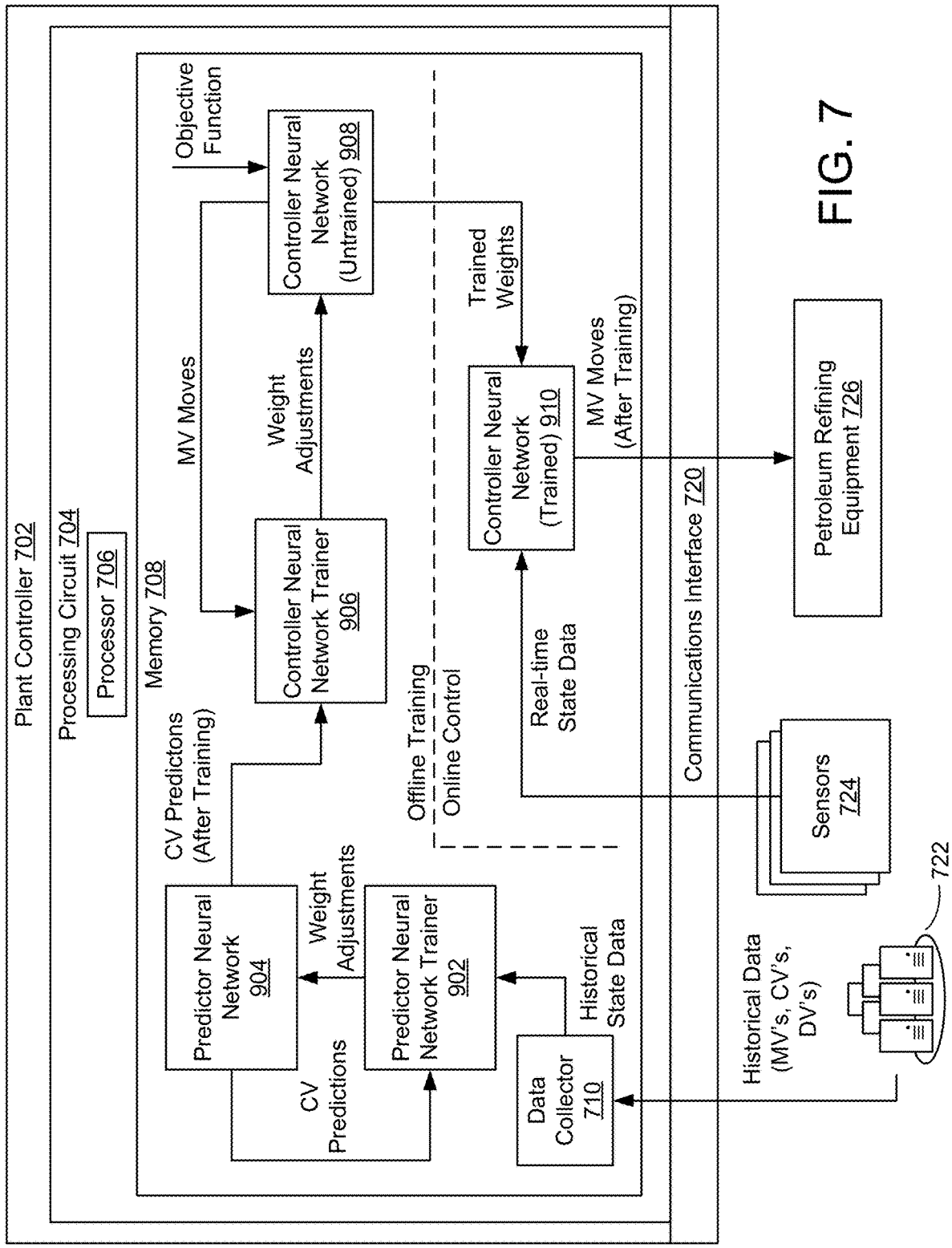
FIG. 7 is a block diagram of a plant controller using offline-trained neural networks to determine MV moves, which can be implemented in the petroleum refinery system of FIG. 1, according to some embodiments.

Referring now to FIG. 7, a block diagram of plant controller 702 is shown, according to some embodiments. In some embodiments, plant controller 702 as shown in FIG. 7 may be configured to perform control of the plant using one or more neural networks. In some embodiments, a first neural network (e.g., predictor neural network 904) is trained offline to make CV predictions. These CV predictions can be provided to a second neural network (e.g., controller neural network 908) for training. Once trained, the second neural network may provide MV moves that can be used to control petroleum refining equipment 726. In the embodiment shown in FIG. 7, memory 708 is shown to include data collector 710, predictor neural network trainer 902, predictor neural network 904, controller neural network trainer 906, controller neural network (untrained) 908, and controller neural network (trained) 910. Any components in FIG. 7 having the same reference numbers as components previously described (e.g., data collector 710) may operate in the same or similar manner in the embodiment shown in FIG. 7.

Predictor neural network trainer 902 may be configured to receive the historical data from data collector 710 and train predictor neural network 904 by adjusting the weights of predictor neural network 904. Predictor neural network trainer 902 may also be configured to receive the CV predictions of the predictor neural network 904 to facilitate training and determine how the weights need to be adjusted. For example, predictor neural network trainer 902 may adjust or tune the weights of predictor neural network 904 such that the CV predictions generated by predictor neural network 904 comply or align with the values of the CV's in the historical data. An example of a process which can be performed by predictor neural network trainer 902 to train predictor neural network 904 is described in greater detail with reference to FIG. 15.

Once trained, predictor neural network 904 may be configured to provide CV predictions as a function of a given state of the plant (e.g., a set of values of the CV's, MV's, DV's, etc.) which may be provided as an input to predictor neural network 904. In some embodiments, predictor neural network 904 is configured to predict the CV's of historical time steps using the set of historical data as an input to predictor neural network 904. In other embodiments, after training, the predictor neural network 904 is configured to predict the CV's for future time periods (e.g., future states of the plant). The CV predictions generated by predictor neural network 904 may be provided to controller neural network trainer 906 and used to train controller neural network (untrained) 908.

In some embodiments, predictor neural network trainer 902 is configured to determine an error between the predicted values of the CV's at historical time step t and actual values of the CV's at historical time step t in the historical training data. This may be performed by implementing a certain error threshold (e.g., 5% 20%, etc.) such that if the predicted CV is within that error threshold, the prediction is considered accurate, and if the predicted CV is outside of that error threshold, the prediction is considered inaccurate. Predictor neural network 904 may require a certain subset of CV predictions to be "accurate" prior to determining that the training of predictor neural network 904 is complete. Other methods for determining the error may be considered, such as determining if the answer is within a predetermined range of values or allowing supervised learning from a technician/ engineer.

In some embodiments, predictor neural network 904 is instructed to process a certain number of states, generate a certain number of accurate predictions, or a combination thereof. If this threshold has not been met predictor neural network 902 continues to train until efficient training inputs have been tested. Once this threshold is met, predictor neural network 904 may be considered trained.

In the above example, determining the error may be performed in a manner similar to the training of predictor neural network 904, but instead of adjusting the weights of predictor neural network 904 in response to the comparison of the output vector y and the desired output values vector y', an average error equal to the difference between the vectors y, y' is calculated over one or more time points and the average is displayed to a human user and/or is compared to a threshold. If the average difference is smaller than the threshold, predictor neural network 904 is considered ready for operation. Otherwise, one or more parameters of predictor neural network 904 may be adjusted, such as the weights between nodes of predictor neural network 904, number of layers, the selected inputs to predictor neural network 904 (e.g., specific controlled, manipulated and/or disturbance variables used), the size of the intermediary vectors h1, h2, h3, . . . hn and/or the duration T of the time period used to form the input vector x. The training of predictor neural network 904 may then be repeated MV's.

Instead of the training based on each time point on its own, in some embodiments, the training of predictor neural network 904 is performed on sequences of time points together. For each sequence of time points, t1, t2, . . . tn, the forming of the vectors and applying of predictor neural network 904 in order to receive the values of the controlled variables, are performed for the first time point of the sequence t1. Then, instead of immediately adjusting the weights of predictor neural network 904 according to a comparison to a desired output values vector y', an input vector for the second time point t2 is created using the outputs of the predictor instead of the stored values from database 722, for the values of the controlled variables at time t1. This process is repeated until predicted values are calculated for time tn. Then, the predicted values for times t1, t2, . . . tn are compared to the stored values using a given metric and the neural network is adjusted accordingly.

In some embodiments, rather than predicting explicit values of CV's, predictor neural network 904 is trained, using any suitable method known in the art, to produce a distribution over different possibilities. For example, predictor neural network 904 may output at time point t the mean and covariance of a Gaussian distribution which reflects estimated posterior probabilities of controlled variable values in time point t+1. This allows modeling uncertainty in the behavior of the plant, to optionally be taken into account by plant controller 702.

In some embodiments, an aggregate prediction error is determined during training of predictor neural network 904, which can be an error determination that takes into account several predictions made by predictor neural network 904. The aggregate prediction error could be an average of the errors resulting from each training input, an aggregate error, or any other metric. In some embodiments, the aggregate prediction error weights certain CV predictions over others based on user instruction. For example, it may be more important to accurately predict the most valuable volume gain for one or more hydrocarbon products (a CV in one embodiment) than the flow rate to reactor 208 (another CV in the embodiment) during training of predictor neural network 904. Other methods for comparing the aggregate prediction error to a threshold may be considered, such as determining if the error is within a predetermined range of value, determining if the error is off by a predetermined percentage or allowing supervised learning from a technician/engineer to make the decision.

Controller neural network (untrained) 908 may be configured to determine the appropriate MV moves while also satisfying one or more constraints or objective functions. The objective function in this embodiment may be the same as or similar to any of the objective functions described with reference to FIG. 5 and/or FIG. 7. In some embodiments, the objective function(s) considered by controller neural network (untrained) 908 can include representations of the value of each of the one or more hydrocarbon products such that maximizing the objective function maximizes the monetary value of the output oil products from HCU 116. In some embodiments, the objective function(s) considered by controller neural network (untrained) 908 includes one or more penalties associated with the light hydrocarbon products attempting to be optimized. For example, diesel-like products generated via HCU 116 may be more valuable than naphtha-like products generated via HCU 116. As such, the objective function may include weights associated with the variables for each of the hydrocarbon products based on their value, such that increasing the product yield of diesel-like products has a more optimizing effect on the objective function than increasing the product yield of naphtha-like products. This can allow the objective function to not only maximize the total volume gain for one or more hydrocarbons individually and/or as a whole, but maximize the most valuable volume gain for one or more hydrocarbons individually and/or as a whole to produce the most valuable products given the incoming feed. While monetary value is used in the above example as the reason for differentiating objective function weights, other factors can be considered, such as current amount of products, product efficiency at a given reactor severity, customer demands, etc.

In some embodiments, controller neural network (untrained) 908 is configured to output one or more MV's that will satisfy one or more predicted CV's and/or TVs from a training input. In some embodiments, this is performed by attempting to optimize an objective function (i.e., a function that calculates the error between actual and desired CV values). The objective function(s) may also consider the monetary cost of operating the system in terms of energy consumption, material consumption, or other costs associated with operating the equipment. Objective functions can be augmented with various terms to consider other optimization objectives as well such as penalties for certain types of actions (e.g., switching equipment on/off too rapidly, changing the control signal too rapidly, etc.), penalties for variables exceeding certain limits. These types of penalties can be incorporated into the objective function if they are permitted, or implemented as hard constraints if they are unacceptable and absolutely need to be avoided. Generally, controller neural network (untrained) 908 may act as a training mechanism for receiving the state information from predictor neural network 904 and outputting MV moves (e.g., trajectories, etc.) designated to meet the pre-specified constrains and objectives.

Controller neural network trainer 906 may be configured to adjust the weights of controller neural network (untrained) 908 such that the values of the MV's or MV moves output by controller neural network (untrained) 908 optimize the objective function. In some embodiments, controller neural network trainer 906 uses predictor neural network 904 to predict the values of the CV's that will result from a given set of MV's output by controller neural network (untrained) 908 and uses the predicted values of the CV's to evaluate the objective function. Controller neural network trainer 906 may continue adjusting the weights of controller neural network (untrained) 908 until the MV's output by controller neural network (untrained) 908 result in values of the CV's that optimize the objective function over a given time period. This training may resemble the training described above with reference to predictor neural network 904, with the exception that controller neural network (untrained) 908 is trained to output MV moves that optimize the objective function, whereas the predictor neural network 904 is trained to predict CV's that align with historical data. Once trained, controller neural network (untrained) 908 may become controller neural network (trained) 910 or the weights from controller neural network (untrained) 908 may be provided to controller neural network (trained) 910 for use in online control.

Controller neural network 910 (trained) is shown receiving real-time state data from sensors 724 and outputting MV moves as a function of the real-time state data. It should be appreciated that the real-time state data need not come from sensors 724 in some embodiments, but may be supplied from any type of data source (e.g., databases, controllers, a combination of sensors 724 and other data sources, etc.) During online control, the current state of the plant may be provided as an input to controller neural network (trained) 910. The MV moves output by controller neural network (trained) 910 may be provided to petroleum refining equipment 726 and/or used to generate control signals that are provided to petroleum refining equipment 726.

Figure 8:
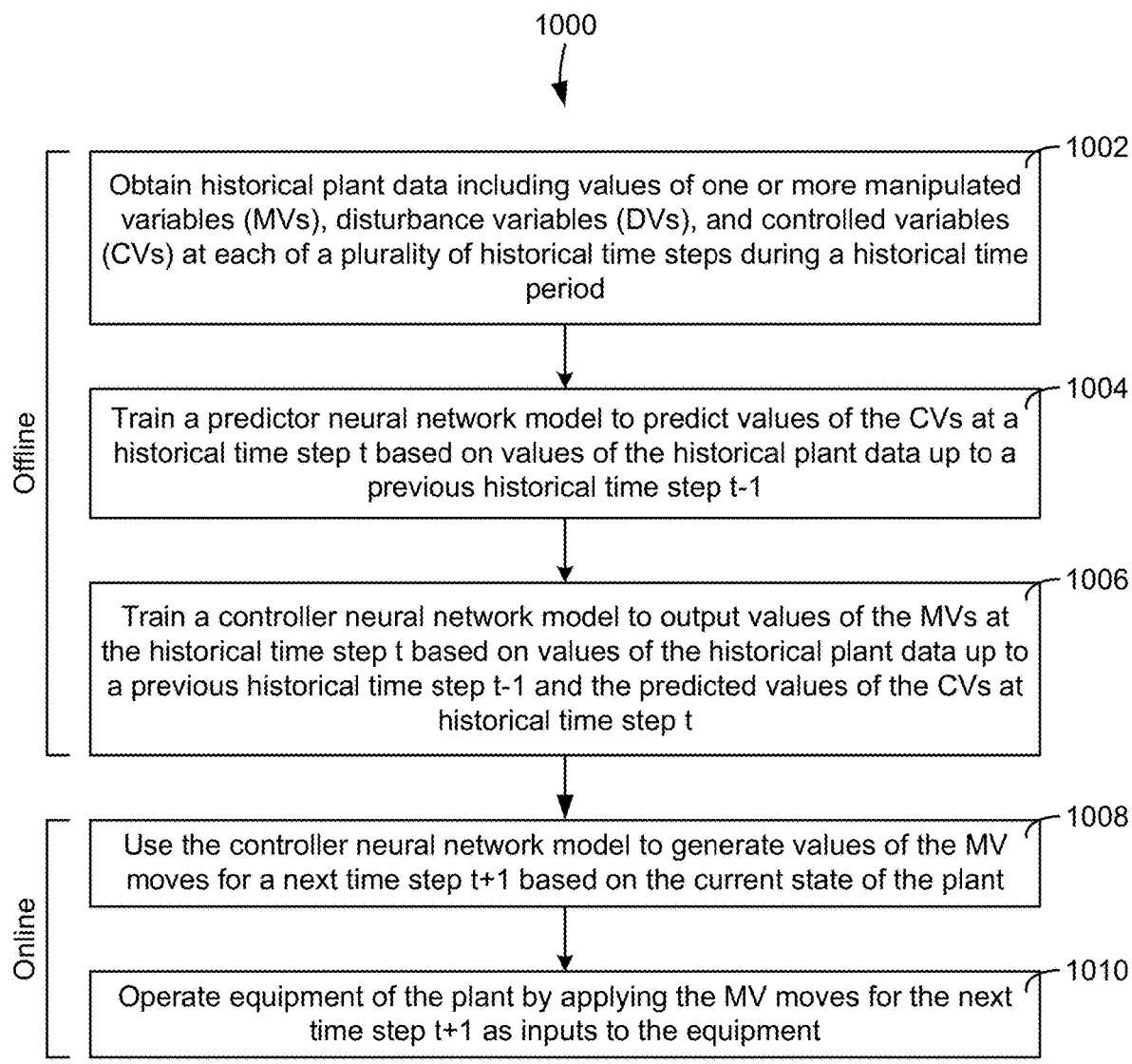
FIG. 8 is a flow diagram of a process for using offline-trained neural networks to determine MV moves, which can be performed by the controller of FIG. 7, according to some embodiments.

Referring now to FIG. 8, a flow diagram of a process 1000 for performing control of the plant using an offline trained predictor neural network and an offline trained controller neural network is shown, according to some embodiments. Process 1000 may be performed by any of the processing circuitry described herein, such as plant controller 702. In some embodiments, process 1000 is at least partially performed by plant controller 702 as described with reference to FIG. 7.

Process 1000 is shown to include obtaining historical plant data, the historical plant data including values of one or more manipulated variables (MV's), disturbance variables (DV's), and controlled variables (CV's) (step 1002). Data collector 710 may be configured to receive the historical plant data from database 722. In some embodiments, the data includes MV's, DV's, and/or CV's for one or more historical time periods (e.g., historical states) of the plant (e.g., operation of system 100).

Process 1000 is shown to include training a predictor neural network model to predict values of the CV's at a historical time step t based on values of the historical plant data up to a previous historical time step t−1 (step 1004). Predictor neural network trainer 902 may receive the historical state data from data collector 710 and begin training predictor neural network 904. The weights of predictor neural network 904 may be updated based on the predicted CV predictions received by predictor neural network trainer 902. Once trained, predictor neural network 904 can provide CV predictions to controller neural network trainer 906 for use in training controller neural network (untrained) 908.

In some embodiments, predictor neural network 904 is trained with the historical plant data. Predictor neural network 904 may receive data over any number of time periods (days, weeks, years, etc.) such that predictor neural network 904 is capable of predicting the CV's of the data set. Plant controller 702 may compare the error to a threshold and determine that further training is required. The weights of predictor neural network 904 may be updated accordingly and the training is repeated until the predictions are within an acceptable error percentage or range. The data input may include a vector of values for each of the MV's, DV's, and CV's (i.e., a time series of each variable including one or more time series values up to time step t−1), which could be provided in the form of a matrix or otherwise. The training period may be based on a certain amount of predictions being made, a certain number of historical data sets/states/episodes being analyzed, data for a certain number of future time steps being predicted, or any combination thereof.

In some embodiments, the weights of predictor neural network 904 and/or bias vectors of predictor neural network 904 are initialized. After initialization, for each of a plurality of time steps, an input vector x is formed of values of CV's, MV's and/or DV's of time points t−T . . . t, and a desired output values vector y' is formed of the values of the controlled variables at time t+1. Predictor neural network 904 is applied to the input vector x and the resultant output vector y is compared to the desired output values vector y'. Based on a difference between the output vector y and the desired output values vector y', the weights of predictor neural network 904 are adjusted in a direction which reduces the difference. The magnitude of the difference is calculated using any suitable difference measure (e.g., absolute value, sum of squares, etc.). The forming of the vectors, applying predictor neural network 904, and adjusting the weights is repeated for many time points, such that predictor neural network 904 reliably models the operation of the system.

Process 1000 is shown to include training a controller neural network model to output values of the MV's at the historical time step t based on values of the historical plant data up to a previous historical time step t−1, and the predicted values of the CV's at the historical time step (step 1006). Controller neural network trainer 906 may train controller neural network (untrained) 908 to output values of the MV's at the historical time step t as a function of the current state of the plant at time step t−1. As described above, the process of training the controller neural network model may include adjusting weights of controller neural network (untrained) 908 until the MV moves are adequate (e.g., based on supervised learning), or until they substantially optimize an objective function. For example, the MV moves output by the controller neural network may be provided as an input to the predictor neural network to predict the values of the CV's that will result from the MV moves. The values of the CV's can then be used to evaluate the objective function as described above. This process of adjusting the weights, generating MV moves, predicting CV values, and evaluating the objective function may be repeated until the performance of the controller neural network is acceptable (e.g., the objective function is sufficiently optimized).

Overall, this allows for a neural network system that can accurately predict appropriate CV's (e.g., most valuable volume gains for one or more hydrocarbon products) based on how the oil refinery has been operating, and then accurately generate moves for how the MV's (e.g., reactor severity, etc.) should be adjusted to accurately reach the predicted CV's. Advantageously, this provides a heighted level of optimization with reduced processing, as the neural networks can be trained offline prior to being implemented.

Process 1000 is shown to include using the controller neural network model to generate values of the MV moves for a next time step t+1 based on the current state of the plant (step 1008). Now that the controller neural network has been trained, controller neural network (trained) 910 can receive real-time state data indication operation of the plant in real time and determine MV moves based on the received real-time state data.

Offline Trained Predictor Neural Network with Model Predictive Control

Figure 9:
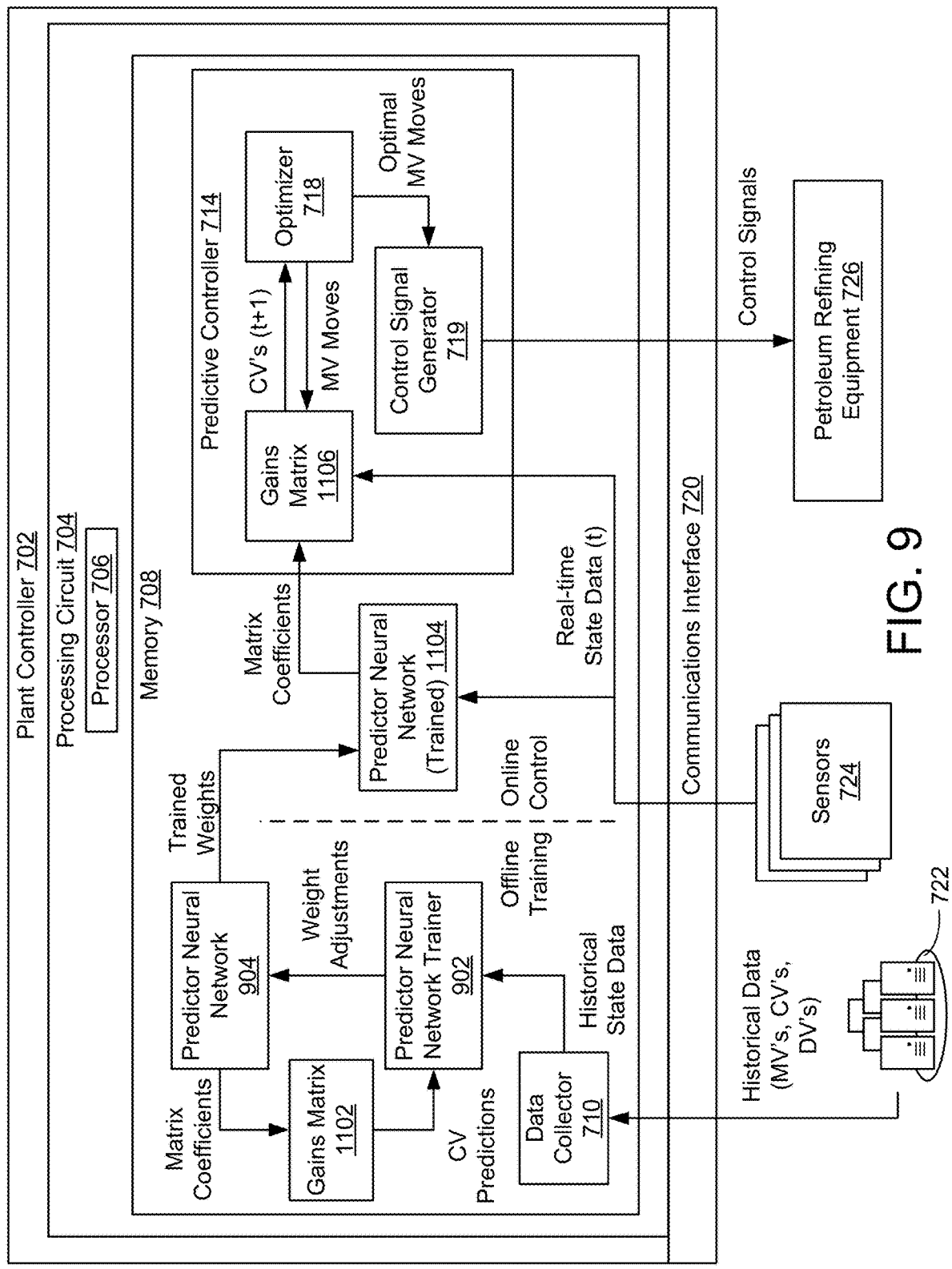
FIG. 9 is a block diagram of a plant controller using an offline-trained neural network to predict CV's for a model predictive controller, which can be implemented in the petroleum refinery system of FIG. 1, according to some embodiments.

Referring now to FIG. 9, a block diagram of plant controller 702 for performing model predictive control of a plant using offline trained neural networks is shown, according to some embodiments. In some embodiments, plant controller 702 as shown in FIG. 9 is configured to train a predictor neural network to generate a gains matrix. The gains matrix may be a matrix including a number of coefficients that provides a linearized representation of plant behavior for a given time period. The gains matrix may be generated based on the historical data for a certain time period, wherein the gains matrix represents the behavior of the plant or parts of the plant at that given time period. The gains matrix can then be used as the model of the plant for model predictive control (e.g., control as described above with reference to FIG. 5, performed by predictive controller 714, etc.). Memory 708 is shown to include data collector 710, predictor neural network trainer 902, predictor neural network 904, controller neural network trainer 906, controller neural network (untrained) 908, and controller neural network (trained) 910. Any components in FIG. 9 having the same reference numbers as components previously described may operate in the same or similar manner in the embodiment shown in FIG. 9, unless different operation is described below.

Predictor neural network trainer 902 may be configured to train predictor neural network 904 to generate matrix coefficients for gains matrix 1102 based on one or more historical data sets. The matrix coefficients may be used to create gains matrix 1102, which can include a linear representation (e.g., model) of the plant for that historical time period (e.g., the time period or episode during which the historical state data was collected). Predictor neural network trainer 902 may be configured to adjust the weights of predictor neural network 904 and evaluate gains matrix 1102 produced by predictor neural network 904 to determine whether gains matrix 1102 is accurate. For example, predictor neural network 902 may apply historical plant data for time step t−1 as an input to an instance of gains matrix 1102 created by predictor neural network 904 to predict the values of the CV's at time step t. Predictor neural network trainer 902 may compare the output of gains matrix 1102 to the actual values of the CV's at time step t in the historical data to determine whether gains matrix 1102 is sufficiently accurate. Once the gains matrix 1102 is being adequately generated (e.g., predictor neural network 904 produces a gains matrix 1102 that results in sufficiently accurate predictions of the CV's based on the historical state data, etc.), predictor neural network 904 may become predictor neural network (trained) 110.

One example of a gains matrix is shown in the following equation:

$$A(\theta)\Delta V_k = \Delta CV_k$$

where $A(\theta)$ is the gains matrix, $\Delta V_k$ is a vector of steps or changes in the MV's, CV's and DV's between time step k−1 and time step k, and $\Delta CV_{k+1}$ is a vector of predicted steps or changes in the CV's between time step k and time step k+1. In this example, the gains matrix $A(\theta)$ is multiplied with the vector $\Delta V_k$ of steps or changes in the MV's, CV's and DV's between time step k−1 and time step k (known from the historical data) to calculate the vector $\Delta CV_{k+1}$ of predicted steps or changes in the CV's between time step k and time step k+1.

In some embodiments, $A(\theta)$, $\Delta V_k$, and $\Delta CV_{k+1}$ have the following form:

$$A(\theta) = \begin{bmatrix} \theta_{1,1} & \cdots & \theta_{1,t} \\ \vdots & \ddots & \vdots \\ \theta_{m,1} & \cdots & \theta_{m,t} \end{bmatrix}, \Delta V_k = \begin{bmatrix} \Delta MV_{1,k} \\ \vdots \\ \Delta MV_{l,k} \\ \Delta CV_{1,k} \\ \vdots \\ \Delta CV_{m,k} \\ \Delta DV_{1,k} \\ \vdots \\ \Delta DV_{n,k} \end{bmatrix}, \Delta CV_{k+1} = \begin{bmatrix} \Delta CV_{1,k+1} \\ \vdots \\ \Delta CV_{m,k+1} \end{bmatrix}$$

where $A(\theta)$ is a m×t matrix having coefficients θ, m is the total number of CV's, t is the total number of MV's, CV's and DV's, $\Delta MV_{1,k} \ldots \Delta MV_{l,k}$ are the actual steps or changes in the MV's (l being the total number of MV's) that occurred between time step k−1 and time step k, $\Delta CV_{1,k} \ldots \Delta CV_{m,k}$ are the actual steps or changes in the CV's that occurred between time step k−1 and time step k, $\Delta DV_{1,k} \ldots \Delta D_{l,k}$ are the actual steps or changes in the DV's (n being the total number of DV's) that occurred between time step k−1 and time step k, and $\Delta CV_{1,k+1} \ldots \Delta CV_{m,k+1}$ are the predicted steps or changes in the CV's between time step k and time step k+1.

Once predictor neural network (trained) 1104 has been generated (e.g., by importing the trained weights from predictor neural network 904), predictor neural network (trained) 1104 can be used for online control. Predictor neural network (trained) 1104 is shown receiving real-time state data from sensors 724 and producing coefficients of a gains matrix 1106 as a function of the real-time state data. Gains matrix 1106 may provide a linearized representation of the dynamic behavior of the plant in real time, localized to the current state of the plant. This can include a live representation (e.g., a single time step), or can include multiple time steps to generate the representation. Gains matrix 1106 can then be used by predictive controller 714 to predict the values of the CV's at the next time step t+1 as a function of the real-time state data at time step t. For example, predictive controller 714 may use gains matrix 1106 as a predictive model (e.g., as predictive model 716), as described with reference to FIG. 5.

Optimizer 716 may operate in the same or similar manner as described with reference to FIG. 5. For example, optimizer 718 may perform an optimization process to determine the optimal MV moves based on the predicted CV's from the gains matrix 1106. Optimizer 718 may use gains matrix 1106 to generate predicted values of the CV's that will result from a given set of MV moves and iteratively adjust the MV moves until optimal values of the CV's are obtained. Control signal generator 719 may receive the optimal MV moves and generate control signals for petroleum refining equipment 726 to satisfy the setpoints for the optimal MV moves.

Optimizer 718 may be configured to perform an optimization process using predictive model 716. In some embodiments, the optimization process includes optimizing an objective function or cost function to determine optimal values of the MV's or optimal MV moves. In some embodiments, the objective function may consider both an established price of each hydrocarbon product and the flow rate of each hydrocarbon product, as well as the flow rate of the feed and the price of the feed. An exemplary objective function is shown below:

$$Obj.Function\left(\frac{vol}{time}\right) = [\text{unconverted product } (UCO) * UCO \text{ price} +$$
$$\text{diesel flow} * \text{diesel price} + naphtha \text{ flow} * naphtha \text{ price} +$$
$$\text{kerosene flow} * \text{kerosene price} +$$
$$LPG \text{ flow} * LPG \text{ price}] - [\text{flow rate} * \text{feed price}]$$

The prices can be used within the objective function can be updated while the model is running closed-loop and controlling the process. Changes in prices can cause the model to manipulate the operating conditions of HCU 116 to yield the most profitable product mix for that pricing environment. This can allow the same model to be used throughout different economic operating regimes without the need for separate modes (e.g., gasoline mode, diesel mode, etc.) or additional robustness testing. In some embodiments, the prices can be changed with little or no downtime.

In some embodiments, the objective function can be configured to maximize the total volume of one or more of the total hydrocarbon products. For example, the objective function could include:

$$Obj.Function\left(\frac{flow}{time}\right) = [\text{unconverted product } (UCO) + \text{diesel flow} +$$
$$naphtha \text{ flow} + \text{kerosene flow} + LPG \text{ flow}] - [\text{feed flow rate}]$$

Without including the pricing of the one or more hydrocarbon products. In various embodiments, the pricing of the one or more hydrocarbon products can be included in the objective function for some hydrocarbon products and not others.

In some embodiments, the objective function can be configured to maximize the total product quality of one or more of the output oil products. In some embodiments, a product quality considered valuable is the cetane number of diesel fuel. As such, the objective function could apply an upgraded price for the price of diesel fuel based on the cetane number found in the fuel. In some embodiment, the CN of the diesel can be tested via a sample of the diesel external from system 100 (e.g., within a lab, etc.) and provided back to plant controller 702 for processing. In some embodiments, system 100 includes measuring instruments capable of measuring the CN of the diesel stream (e.g., in real-time, at certain intervals, etc.) and providing the CN data back to plant controller 702.

Using the above example, the objective function could include:

$$Obj.Function\left(\frac{flow}{time}\right) = [[\{\text{diesel flow}\} * \{\text{diesel price}\} +$$
$$\{\text{cetane upgrade value}\} *$$
$$\{\text{cetane number in diesel stream} - \text{base cetane number}\}] +$$
$$\text{unconverted product } (UCO) * UCO \text{ price} +$$
$$naphtha \text{ flow} * naphtha \text{ price} + \text{kerosene flow} * \text{kerosene price} +$$
$$LPG \text{ flow} * LPG \text{ price}] - [\text{flow rate} * \text{feed price}]$$

The above objective function provides an upgraded price for the product quality of CN, based on the difference between the actual CN in the diesel stream (e.g., the output oil product, etc.) and the base cetane number. "Cetane Upgrade Value" in the above equation may refer to a constant value that associates the CN quantity with an appropriate price upgrade when accounting for the price of the diesel stream.

In some embodiments, the product qualities (e.g., CN as described above) are CVs with upper and lower bound and a control technique attempts to maintain the CV within the bounds and/or attempt to reach a target value within those bounds. In such embodiments, the price of the output streams may not be affected by the product quality, but the control technique still provides control to maintain a certain level of the product quality. This can allow plant controller 702 to generate the most valuable total product yield while maintaining appropriate levels of product quality. Of course, any variation of this, the most valuable product quality is optimized while the total yield for the output streams is maintained within upper and lower bounds and/or attempts to reach a target value, can also be considered.

In some embodiments, the objective function can include any number of weights in the objective function such that the various hydrocarbon products are weighted differently when attempting to maximize the objective function. For example, if maximizing the volume of naphtha produced by HCU 116 is desired, while maximizing the volume of jet fuel is less desired, than the variable representing naphtha volume may be weighted higher than the variable representing jet fuel volume. Of course, any number of weights and prices, either alone or in combination, can be used to prioritize certain hydrocarbon products over others.

In some embodiments, the objective function may include one or more terms that quantify the error between the current or predicted values of the CV's and target or setpoint values for the CV's. In some embodiments, the objective function may include one or more terms that quantify the amount of input resources (e.g., input oil feeds) consumed by system 100 or a cost of the input resources consumed. Optimizer 718 may be configured to iteratively adjust the values of the MV's and use predictive model 716 to predict the resulting values of the CV's that will result from each set of MV's. Optimizer 718 may continue adjusting the MV's while performing the optimization process until an optimal result is reached (e.g., minimum value of the objective function). Once the optimal result is reached, the values of the MV's that resulted in the optimal result may be designated as optimal values of the MV's or optimal MV moves.

Control signal generator 719 can be configured to receive MV/CV trajectories and provide control signals to petroleum refining equipment 726. In some embodiments, control signal generator 719 generates control signals for petroleum refining equipment 726 based on the values of the MV's output by optimizer 718. For example, if the MV value is a temperature, the control signal can be a signal for a heat source 202 to increase or decrease heating to achieve the target temperature value. This can be advantageous for embodiments in which the MV's are essentially setpoints and a local controller is needed to convert the setpoints into control signals for equipment that operate to achieve the setpoints.

Figure 10:
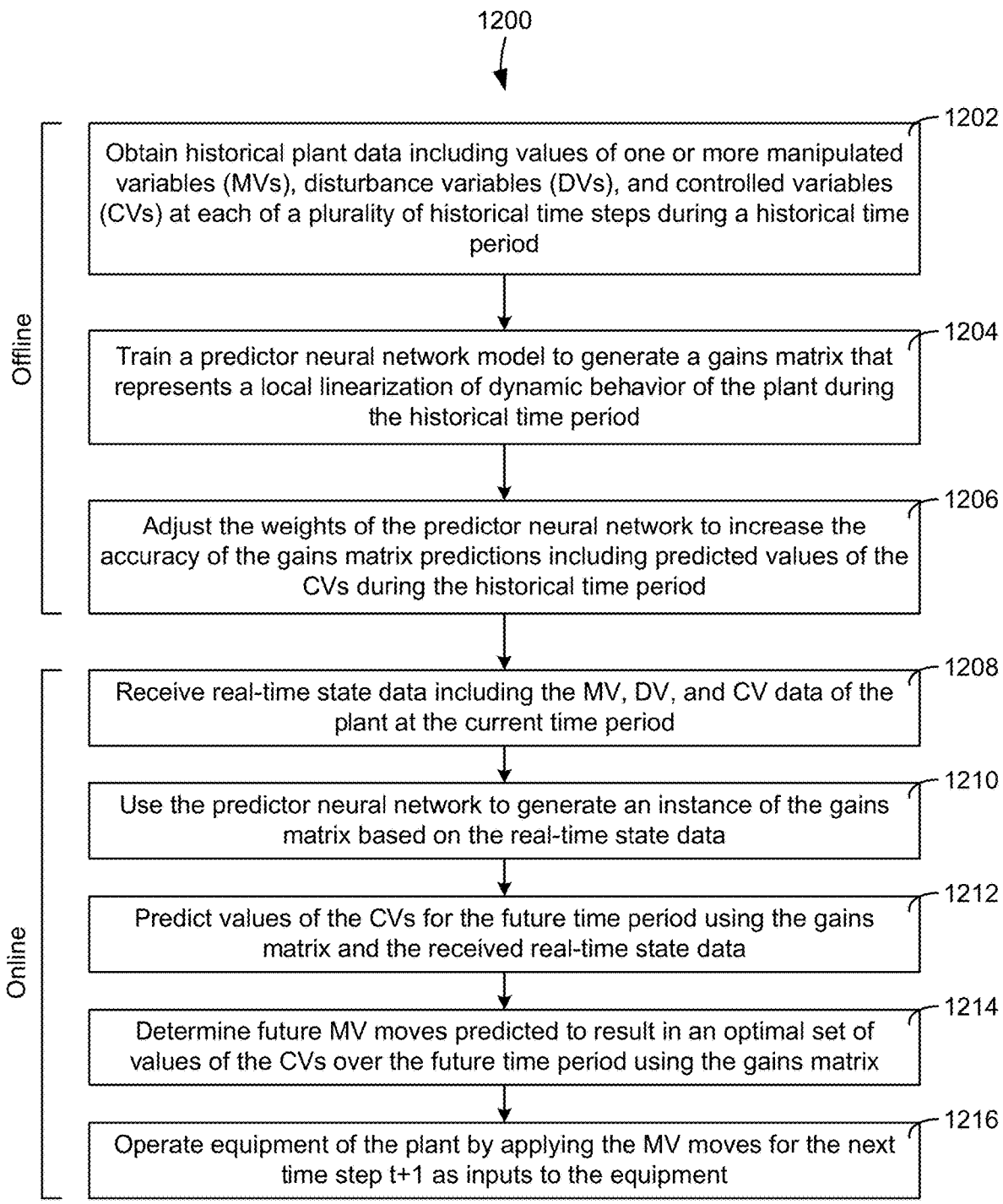
FIG. 10 is a flow diagram of a process for using an offline-trained neural network to predict CV's for a model predictive controller, which can be performed by the controller of FIG. 9, according to some embodiments.

Referring now to FIG. 10, a flow diagram of a process 1200 for performing control of the plant using an offline predictor neural network that generates a gains matrix is shown, according to some embodiments. Process 1200 may be performed by any of the processing circuitry described herein, such as plant controller 702. In some embodiments, process 1200 is at least partially performed by plant controller 702 as described above with reference to FIG. 9.

Process 1200 is shown to include obtaining historical plant data including values of one or more manipulated variables (MV's), disturbance variables (DV's), and controlled variables (CV's) (step 1202). Data collector 710 may be configured to receive the historical plant data from database 722. In some embodiments, the data includes MV's, DV's, and/or CV's for one or more historical time periods (e.g., historical states) of the plant (e.g., operation of system 100).

Plant controller 702 may obtain one or more "states" of the plant operation. As discussed above, the historical data represents a variety of different control situations over different periods of time. The full set of historical data may represent the non-linear behavior of the system over a relatively long time period (e.g., days, months, years, etc.). Each sample of the historical data may include values for all of the MV's, CV's DV's, and potentially other variables at an instantaneous time or over a time step having a predetermined duration (e.g., 1 second, 1 minute, 15 minutes, 1 hour, etc.). Each sample of the historical data may include a time stamp indicating a time at which the sample was collected and defines a corresponding "state" of the system at the time the sample was collected. As such, predictor neural network 904 may use the state data to predict future CV's and provide the predicted CV's to controller neural network 908 for prediction of future MV's.

Process 1200 is shown to include training a predictor neural network model to generate a gains matrix that represents a local linearization of dynamic behavior of the plant during the historical time period (step 1204) and adjusting the weights of the predictor neural network to increase the accuracy of the gains matrix predictions including predicted values of the CV's during the historical time period (step 1206). Predictor neural network trainer 902 may be configured to adjust the weights of predictor neural network 904 to ensure that the gains matrix 1102 generated by predictor neural network 904 accurately predicts values of the CV's in the historical data set.

Process 1200 is shown to include receiving real-time state data including the MV, DV, and CV data of the plant at the current time period (step 1208), using the predictor neural network to generate an instance of the gains matrix based on the real-time state data (step 1210), and predicting values of the CV's for the future time period using the gains matrix and the received real-time state data (step 1212). Once predictor neural network (trained) 1104 is trained, predictor neural network (trained) 1104 can receive real-time state data (e.g., data relating to the operation of the plant) via sensors 724 and generate a gains matrix 1106 based on that data. The gains matrix 1106 (i.e., the linearized representation of the current state) can then be used to predict future CV's (e.g., CV's for t+1, etc.), which can be provided to optimizer 718 during the optimization process.

Process 1200 is shown to include determining future MV moves that result in an optimal set of values of the CV's over the future time period using the gains matrix (step 1214). In some embodiments, the predictive controller 714 can input the real-time state data into the gains matrix to determine one or more CV values in a future time step, as discussed above. Then, predictive controller 714 may determine the MV adjustments required to reach the predicted CV value. The MV adjustments can be based on the model presented in the gains matrix, an attempt to satisfy an objective function received by predictive controller 714, or a combination thereof.

Process 1200 is shown to include operating equipment of the plant by applying the MV moves for the next time step t+1 as inputs to the equipment (step 1216). In some embodiments, petroleum refining equipment 726 can operate a reactor severity control device using the target severity to modulate the MV (e.g., the temperature affecting the volume of one or more hydrocarbon products within HCU 116, etc.).

In some embodiments, one or more reactor severity control mechanisms (e.g., modules, components, etc.) are located proximate to HCU 116 or upstream/downstream of HCU 116 to adjust the reactor severity within reactor 208. For example, one reactor severity control mechanism that can adjust the reactor severity within HCU 116 at least in part can be a valving system that adjusts the flow of catalyst into riser 204. In some embodiments, another reactor severity control mechanism can include a valving system controlling the amount of feed entering HCU 116. In some embodiments, another reactor severity control mechanism is a heat source 202 that pre-heats the incoming feed. The reactor severity control mechanisms may be part of petroleum refining equipment 726 described below, and may be configured to receive control signals from plant controller 702 to adjust one or more MV's of the plant.

Figure 11:
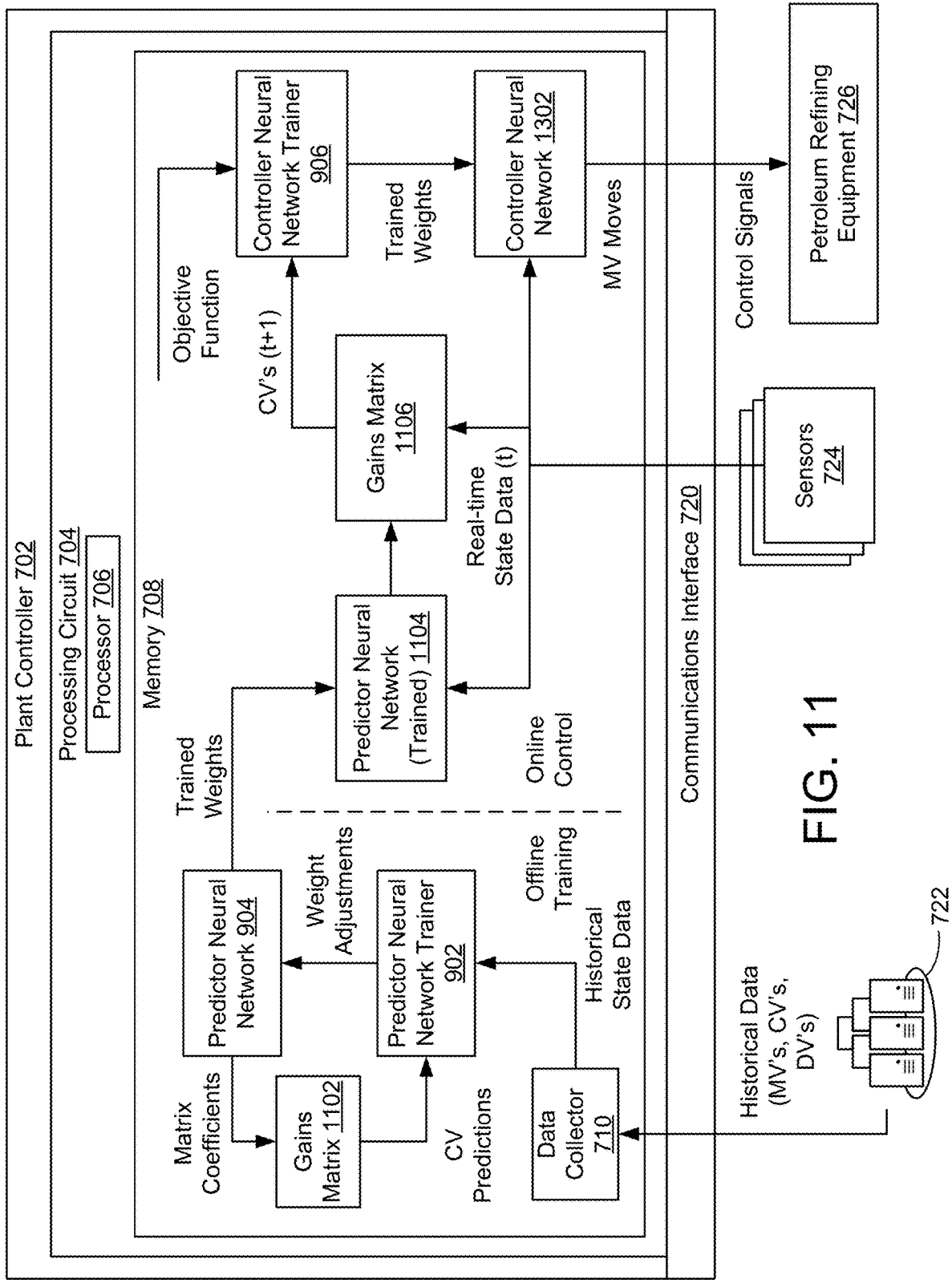
FIG. 11 is a block diagram of a plant controller using a predictor neural network to generate a gains matrix to train a controller neural network to determine MV moves, which can be implemented in the petroleum refinery system of FIG. 1, according to some embodiments.

Offline Trained Predictor Neural Network with Online Controller Neural Network Training Referring now to FIG. 11, a block diagram of another embodiment of plant controller 702 is shown. In the embodiment shown in FIG. 11, plant controller 702 may use predictor neural network 904 to generate gains matrix 1106 as previously described. However, instead of using gains matrix 1106 to perform model predictive control, gains matrix 1106 may be used to train a controller neural network 1302 for use in online control. Any components in FIG. 11 having the same reference numbers as components previously described may operate in the same or similar manner in the embodiment shown in FIG. 11, unless different operation is described below. For example, data collector 710 is shown providing historical data to predictor neural network trainer 902, which operates to train predictor neural network 904 to produce gains matrix 1102. These steps may be performed offline as previously described until predictor neural network 904 is trained sufficiently for online control. Once sufficiently trained, predictor neural network 904 may become predictor neural network (trained) 1104 or may provide the trained weights as an input to predictor neural network (trained) 1104.

During online control, predictor neural network (trained) 1104 may be used to generate gains matrix 1106 as a function of real-time state data. As described above, gains matrix 1106 may be configured to predict the values of the CV's at time step t+1 as a function of the MV's and/or real-time state data at time step t. Gains matrix 1106 may be used by controller neural network trainer 906 to train controller neural network 1302.

Controller neural network trainer 906 may be configured to train controller neural network 1302 by performing a training process similar to the training process described with reference to FIG. 7. For example, controller neural network trainer 906 may be configured to adjust the weights of controller neural network 1302 such that the values of the MV's or MV moves output by controller neural network 1302 optimize an objective function.

For example, controller neural network trainer 906 may be configured to perform an optimization process. In some embodiments, the optimization process includes optimizing an objective function or cost function to determine optimal values of the MV's or optimal MV moves. The objective function may consider both an established price of each hydrocarbon product and the flow rate of each hydrocarbon product, as well as the cost of feed and the price of the feed. An exemplary objective function is shown below:

$$\text{Obj.Function}\left(\frac{vol}{time}\right) = [\text{unconverted product } (UCO) * UCO \text{ price} +$$
$$\text{diesel flow} * \text{diesel price} + \textit{naphtha} \text{ flow} * \textit{naphtha} \text{ price} +$$
$$\text{kerosene flow} * \text{kerosene price} +$$
$$LPG \text{ flow} * LPG \text{ price}] - [\text{flow rate} * \text{feed price}]$$

The prices can be used within the objective function can be updated while the model is running closed-loop and controlling the process. Changes in prices can cause the model to manipulate the operating conditions of HCU 116 to yield the most profitable product mix for that pricing environment. This can allow the same model to be used throughout different economic operating regimes without the need for separate modes (e.g., gasoline mode, diesel mode, etc.) or additional robustness testing. In some embodiments, the prices can be changed with little or no downtime.

In some embodiments, the objective function can be configured to maximize the total volume of one or more of the total hydrocarbon products. For example, the objective function could include:

$$\text{Obj.Function}\left(\frac{flow}{time}\right) = [\text{unconverted product } (UCO) + \text{diesel flow} +$$
$$naphtha \text{ flow} + \text{kerosene flow} + LPG \text{ flow}] - [\text{flow rate}]$$

Without including the pricing of the one or more hydrocarbon products. In various embodiments, the pricing of the one or more hydrocarbon products can be included in the objective function for some hydrocarbon products and not others.

In some embodiments, the objective function can be configured to maximize the total product quality of one or more of the output oil products. In some embodiments, a product quality considered valuable is the cetane number of diesel fuel. As such, the objective function could apply an upgraded price for the price of diesel fuel based on the cetane number found in the fuel. In some embodiment, the CN of the diesel can be tested via a sample of the diesel external from system 100 (e.g., within a lab, etc.) and provided back to plant controller 702 for processing. In some embodiments, system 100 includes measuring instruments capable of measuring the CN of the diesel stream (e.g., in real-time, at certain intervals, etc.) and providing the CN data back to plant controller 702.

Using the above example, the objective function could include:

$$\text{Obj.Function}\left(\frac{flow}{time}\right) = [[\{\text{diesel flow}\} * \{\text{diesel price}\} +$$
$$\{\text{cetane upgrade value}\} *$$
$$\{\text{cetane number in diesel stream} - \text{base cetane number}\}] +$$
$$\text{unconverted product } (UCO) * UCO \text{ price} +$$
$$naphtha \text{ flow} * naphtha \text{ price} + \text{kerosene flow} * \text{kerosene price} +$$
$$LPG \text{ flow} * LPG \text{ price}] - [\text{flow rate} * \text{feed price}]$$

The above objective function provides an upgraded price for the product quality of CN, based on the difference between the actual CN in the diesel stream (e.g., the output oil product, etc.) and the base cetane number. "Cetane Upgrade Value" in the above equation may refer to a constant value that associates the CN quantity with an appropriate price upgrade when accounting for the price of the diesel stream.

In some embodiments, the product qualities (e.g., CN as described above) are CVs with upper and lower bound and a control technique attempts to maintain the CV within the bounds and/or attempt to reach a target value within those bounds. In such embodiments, the price of the output streams may not be affected by the product quality, but the control technique still provides control to maintain a certain level of the product quality. This can allow plant controller 702 to generate the most valuable total product yield while maintaining appropriate levels of product quality. Of course, any variation of this, the most valuable product quality is optimized while the total yield for the output streams is maintained within upper and lower bounds and/or attempts to reach a target value, can also be considered.

In some embodiments, the objective function can include any number of weights in the objective function such that the various hydrocarbon products are weighted differently when attempting to maximize the objective function. For example, if maximizing the volume of naphtha produced by HCU 116 is desired, while maximizing the volume of jet fuel is less desired, than the variable representing naphtha volume may be weighted higher than the variable representing jet fuel volume. Of course, any number of weights and prices, either alone or in combination, can be used to prioritize certain hydrocarbon products over others.

In some embodiments, the objective function may include one or more terms that quantify the error between the current or predicted values of the CV's and target or setpoint values for the CV's. In some embodiments, the objective function may include one or more terms that quantify the amount of input resources (e.g., input oil feeds) consumed by system 100 or a cost of the input resources consumed. Optimizer 718 may be configured to iteratively adjust the values of the MV's and use predictive model 716 to predict the resulting values of the CV's that will result from each set of MV's. Optimizer 718 may continue adjusting the MV's while performing the optimization process until an optimal result is reached (e.g., minimum value of the objective function). Once the optimal result is reached, the values of the MV's that resulted in the optimal result may be designated as optimal values of the MV's or optimal MV moves.

In some embodiments, controller neural network trainer 906 uses gains matrix 1106 to predict the values of the CV's that will result from a given set of MV's output by controller neural network 1302 and uses the predicted values of the CV's to evaluate the objective function. Controller neural network trainer 906 may continue adjusting the weights of controller neural network 1302 until the MV's output by controller neural network 1302 result in values of the CV's that optimize the objective function over a given time period. Once trained, controller neural network 1302 can then be used to generate MV moves for time step t+1 as a function of the real-time state data at time step t.

Figure 12:
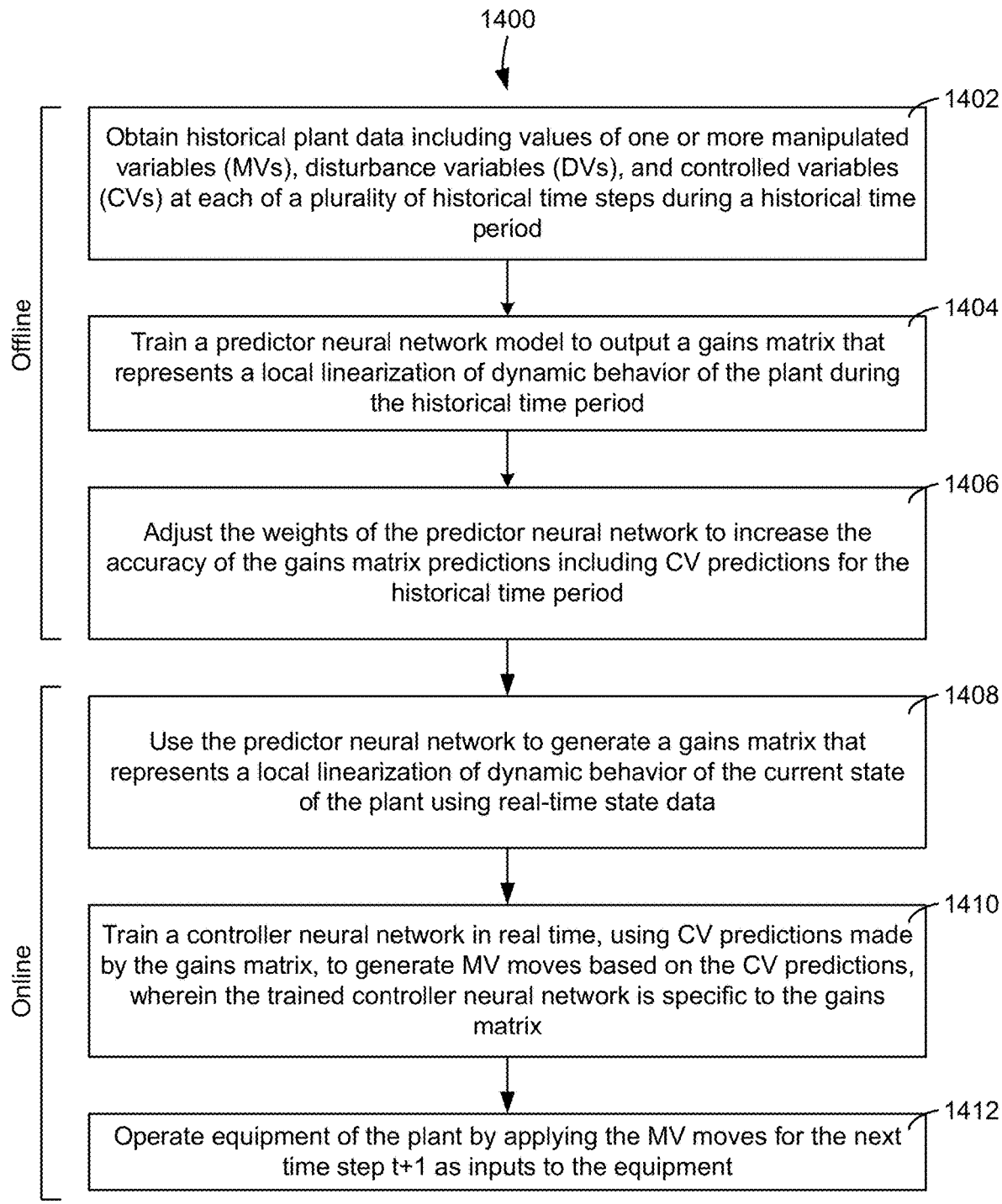
FIG. 12 is a flow diagram of a process for using a predictor neural network to generate a gains matrix to train a controller neural network to determine MV moves, which can be performed by the plant controller of FIG. 11, according to some embodiments.

Referring now to FIG. 12, a flow diagram of a process 1400 for training a controller neural network using a single gains matrix and using the controller neural network to operate equipment is shown, according to some embodiments. Process 1400 may be performed by any of the processing circuitry described herein, such as plant controller 702. In some embodiments, process 1200 is at least partially performed by plant controller 702 as described above with reference to FIG. 11.

Process 1400 is shown to include obtaining historical plant data including values of one or more manipulated variables (MV's), disturbance variables (DV's), and controlled variables (CV's) (step 1402). Data collector 710 may be configured to receive the historical plant data from database 722. In some embodiments, the data includes MV's, DV's, and/or CV's for one or more historical time periods (e.g., historical states) of the plant (e.g., operation of system 100).

In some embodiments, the MV's may include temperature severity of the HCU 116. Temperature severity can include the temperature inside of reactor 208, the temperature of the feed entering reactor 208, the temperature of the feed during the chemical reaction, the temperature of the feed after pre-heating, the temperature of the feed prior to pre-heating, or a combination thereof. In some embodiments, the CV acting as the most valuable volume gain of one or more hydrocarbon products produced by HCU 116 could include individual volume values for each of the outputs of HCU 116 and individual prices for each of the outputs of HCU 116 which could be used to calculate the most valuable volume gain of one or more hydrocarbon products.

Process 1400 is shown to include training a predictor neural network model to output a gains matrix that represents a local linearization of dynamic behavior of the plant during the historical time period (step 1404) and adjusting the weights of the predictor neural network to increase the accuracy of the gains matrix predictions including CV predictions for the historical time period (step 1406). Predictor neural network trainer 902 may be configured to adjust the weights of predictor neural network 904 to ensure the gains matrix 1102 generated by predictor neural network 904 accurately predicts values of the CV's in the historical data set.

Process 1400 is shown to include using the predictor neural network to generate a gains matrix that represents a local linearization of dynamic behavior of the current state of the plant using real-time state data. Once predictor neural network (trained) 1104 is trained, predictor neural network (trained) 1104 can receive real-time state data (e.g., data relating to the operation of the plant) via sensors 724 and generate a gains matrix 1106 based on that data. The linearized representation of the current state can be used to predict future CV's (e.g., CV's for t+1, etc.), which can be provided to optimizer 718.

Process 1400 is shown to include training a controller neural network in real-time, using CV predictions made by the gains matrix, to generate MV moves based on the CV predictions, wherein the trained controller neural network is specific to the gains matrix (step 1410). For example, step 1410 may include adjusting the weights of controller neural network 1302 such that the values of the MV's or MV moves output by controller neural network 1302 optimize an objective function. In some embodiments, controller neural network trainer 906 uses gains matrix 1106 to predict the values of the CV's that will result from a given set of MV's output by controller neural network 1302 and uses the predicted values of the CV's to evaluate the objective function. Controller neural network trainer 906 may continue adjusting the weights of controller neural 1302 until the MV's output by controller neural network 1302 result in values of the CV's that optimize the objective function over a given time period. Once trained, controller neural network 1302 can then be used to generate MV moves for time step t+1 as a function of the real-time state date at time step t.

Process 1400 is shown to include operating equipment of the plant by applying the MV moves for the next time step t+1 as inputs to the equipment (step 1412). Step 1412 may include using the values of the MV's at time step t+1 as inputs to the equipment or using the values of the MV's at time step t+1 to generate control signals for the equipment.

Offline Controller Neural Network Training Based on Multiple Gains Matrices

Figure 13:
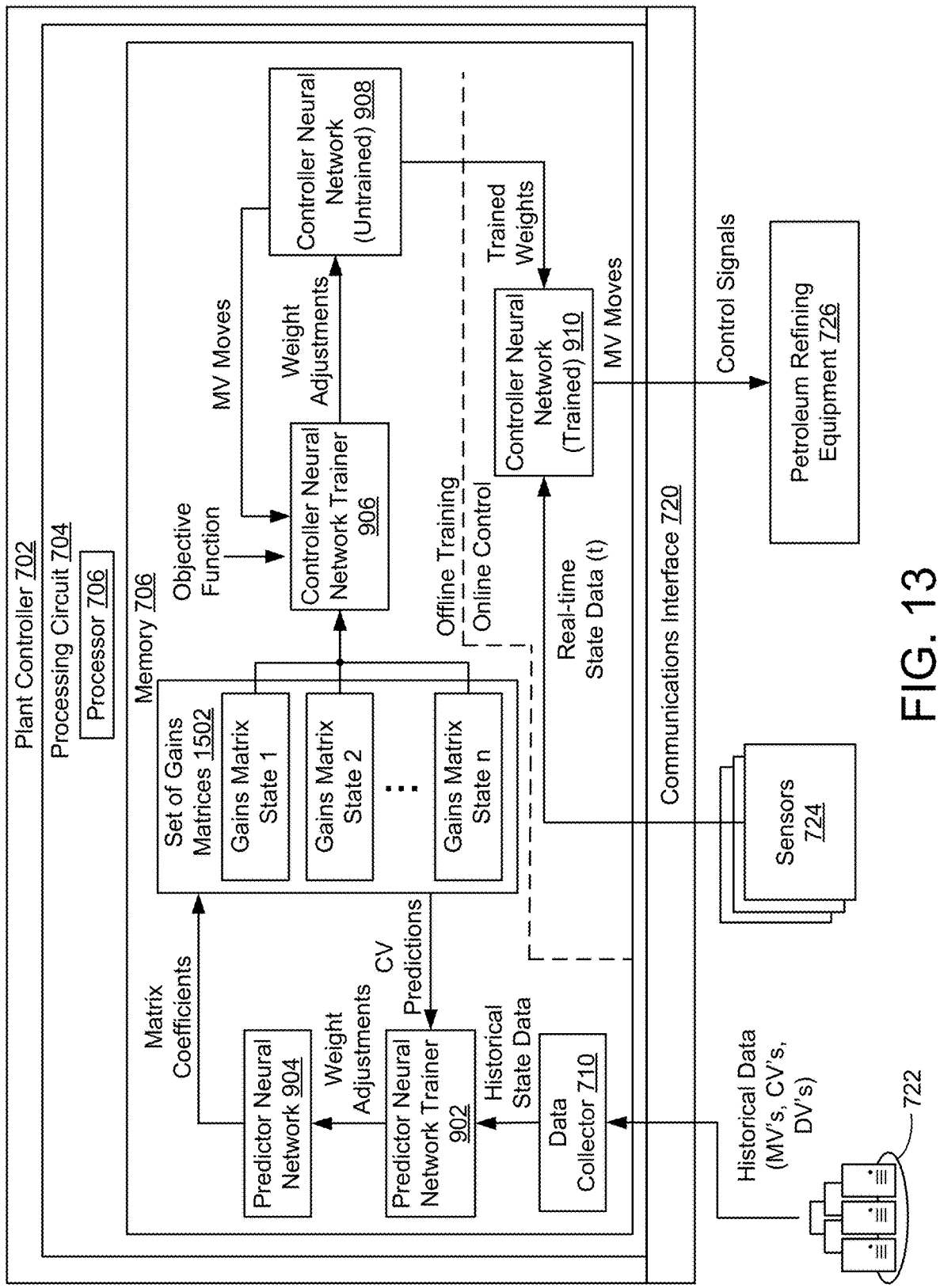
FIG. 13 is a block diagram of a plant controller using multiple gains matrices to train a controller neural network to determine MV moves, which can be implemented in the petroleum refinery system of FIG. 1, according to some embodiments.

Referring now to FIG. 13, a block diagram of a process for performing online control based on multiple gain matrices is shown, according to some embodiments. Memory 708 is shown to include data collector 710, predictor neural network trainer 902, predictor neural network 904, set of gains matrices 1502, controller neural network trainer 906, controller neural network (untrained) 908, controller neural network (trained) 910. Any components in FIG. 13 having the same reference numbers as components previously described may operate in the same or similar manner in the embodiment shown in FIG. 13, unless different operation is described below.

The embodiment illustrated in FIG. 13 may be similar to the embodiment illustrated in FIG. 11, with the exception that controller neural network 908, 910 is trained using multiple different gains matrices instead of a single gains matrix. The steps performed by predictor neural network trainer 902 to train predictor neural network 904 may be the same as previously described. Once trained, predictor neural network 904 can be used to generate a set of gains matrices 1502. Each of the gains matrices 1502 may represent a different linearization of dynamic behavior of the plant (e.g., localized to a particular episode of the historical data) and may be generated using the same or similar process used to generate gains matrix 1106 as previously described. The steps performed to generate the gains matrices 1502 can be repeated multiple times for different sets of historical data to generate a gains matrix for each set of the historical data (e.g., for multiple different episodes of the historical data).

Controller neural network trainer 906 can then use the set of gains matrices 1502 to train controller neural network (untrained) 908. The steps performed to train controller neural network (untrained) 908 may be similar to the embodiment described with reference to FIG. 11. However, instead of using a single gains matrix to predict the values of the CV's or CV moves that will result from each set of MV's or MV moves generated by controller neural network (untrained 908). Each set of MV's or MV moves generated by controller neural network (untrained) 908 may be associated with a particular episode of the training data, specifically the episode of training data used by controller neural network (untrained) 908 to generate that set of MV's or MV moves. The gains matrix generated for that same episode may then be used to predict the values of the CV's or CV moves that will result from the MV's or MV moves associated with that same episode. The entire set of predicted values of the CV's or CV moves (i.e., across all of the episodes) may then be used to evaluate the objective function to determine how well the various sets of MV's or MV moves optimize the objective function across all of the episodes.

In some embodiments, controller neural network trainer 906 receives an objective function to determine optimal values of the MV's or optimal MV moves. In some embodiments, the objective function may consider both an established price of each hydrocarbon product and the flow rate of each hydrocarbon product, as well as the cost of feed and the price of the feed. An exemplary objective function is shown below:

$$Obj.Function\left(\frac{flow}{time}\right) = [\text{unconverted product } (UCO) * UCO \text{ price} +$$
$$\text{diesel flow} * \text{diesel price} + naphtha \text{ flow} * naphtha \text{ price} +$$
$$\text{kerosene flow} * \text{kerosene price} +$$
$$LPG \text{ flow} * LPG \text{ price}] - [\text{feed cost} * \text{feed price}]$$

The prices can be used within the objective function can be updated while the model is running closed-loop and controlling the process. Changes in prices can cause the model to manipulate the operating conditions of HCU 116 to yield the most profitable product mix for that pricing environment. This can allow the same model to be used throughout different economic operating regimes without the need for separate modes (e.g., gasoline mode, diesel mode, etc.) or additional robustness testing. In some embodiments, the prices can be changed with little or no downtime.

In some embodiments, the objective function can be configured to maximize the total volume of one or more of the total hydrocarbon products. For example, the objective function could include:

$$Obj.Function\left(\frac{vol}{time}\right) = [\text{unconverted product } (UCO) + \text{diesel flow} +$$
$$naphtha \text{ flow} + \text{kerosene flow} + LPG \text{ flow}] - [\text{feed flow rate}]$$

Without including the pricing of the one or more hydrocarbon products. In various embodiments, the pricing of the one or more hydrocarbon products can be included in the objective function for some hydrocarbon products and not others.

In some embodiments, the objective function can be configured to maximize the total product quality of one or more of the output oil products. In some embodiments, a product quality considered valuable is the cetane number of diesel fuel. As such, the objective function could apply an upgraded price for the price of diesel fuel based on the cetane number found in the fuel. In some embodiment, the CN of the diesel can be tested via a sample of the diesel external from system 100 (e.g., within a lab, etc.) and provided back to plant controller 702 for processing. In some embodiments, system 100 includes measuring instruments capable of measuring the CN of the diesel stream (e.g., in real-time, at certain intervals, etc.) and providing the CN data back to plant controller 702.

Using the above example, the objective function could include:

$$Obj.Function\left(\frac{flow}{time}\right) = [[\{\text{diesel flow}\} * \{\text{diesel price}\} +$$
$$\{\text{cetane upgrade value}\} *$$
$$\{\text{cetane number in diesel stream} - \text{base cetane number}\}] +$$
$$\text{unconverted product } (UCO) * UCO \text{ price} +$$
$$naphtha \text{ flow} * naphtha \text{ price} + \text{kerosene flow} * \text{kerosene price} +$$
$$LPG \text{ flow} * LPG \text{ price}] - [\text{flow rate} * \text{feed price}]$$

The above objective function provides an upgraded price for the product quality of CN, based on the difference between the actual CN in the diesel stream (e.g., the output oil product, etc.) and the base cetane number. "Cetane Upgrade Value" in the above equation may refer to a constant value that associates the CN quantity with an appropriate price upgrade when accounting for the price of the diesel stream.

In some embodiments, the product qualities (e.g., CN as described above) are CVs with upper and lower bound and a control technique attempts to maintain the CV within the bounds and/or attempt to reach a target value within those bounds. In such embodiments, the price of the output streams may not be affected by the product quality, but the control technique still provides control to maintain a certain level of the product quality. This can allow plant controller 702 to generate the most valuable total product yield while maintaining appropriate levels of product quality. Of course, any variation of this, the most valuable product quality is optimized while the total yield for the output streams is maintained within upper and lower bounds and/or attempts to reach a target value, can also be considered.

In some embodiments, the objective function can include any number of weights in the objective function such that the various hydrocarbon products are weighted differently when attempting to maximize the objective function. For example, if maximizing the volume of naphtha produced by HCU 116 is desired, while maximizing the volume of jet fuel is less desired, than the variable representing naphtha volume may be weighted higher than the variable representing jet fuel volume. Of course, any number of weights and prices, either alone or in combination, can be used to prioritize certain hydrocarbon products over others.

In some embodiments, the objective function may include one or more terms that quantify the error between the current or predicted values of the CV's and target or setpoint values for the CV's. In some embodiments, the objective function may include one or more terms that quantify the amount of input resources (e.g., input oil feeds) consumed by system 100 or a cost of the input resources consumed. Optimizer 718 may be configured to iteratively adjust the values of the MV's and use predictive model 716 to predict the resulting values of the CV's that will result from each set of MV's. Optimizer 718 may continue adjusting the MV's while performing the optimization process until an optimal result is reached (e.g., minimum value of the objective function). Once the optimal result is reached, the values of the MV's that resulted in the optimal result may be designated as optimal values of the MV's or optimal MV moves. The objective function in this embodiment may be the same as or similar to any of the objective functions described with reference to FIG. 5, FIG. 7, and/or FIG. 9.

Advantageously, using all of the gains matrices 1502 to train controller neural network 908, 910 may result in a controller neural network 908, 910 that is not specific to a single gains matrix or linear behavior of the plant, but rather can generate appropriate values of the MV's for any real-time state data or any linear behavior of the plant. In other words, controller neural network 908, 910 can be trained to output values of the MV's or MV moves for any value of the real-time state data corresponding to any of the divergent linear behaviors of the plant, not only values of the real-time state data that correspond to the same linear behavior of the plant as the episode of historical data used to generate a particular gains matrix. Accordingly, this allows a single controller neural network (untrained) 908 to be trained offline and then used as controller neural network (trained) 910 during online control rather than needing to generate a different instance of controller neural network (trained) 910 for each gains matrix and/or each episode of the historical data. In some embodiments, controller neural network (trained) 910 can receive one or more real time gains matrices generated by predictor neural network 904 based on the real time state data. The real-time gains matrix may inform controller neural network (trained) 910 of the current (e.g., real-time, etc.) linearized dynamics. Under this scheme, the real-time gains matrix may also be and input to controller neural network (untrained) 908 during training.

Figure 14:
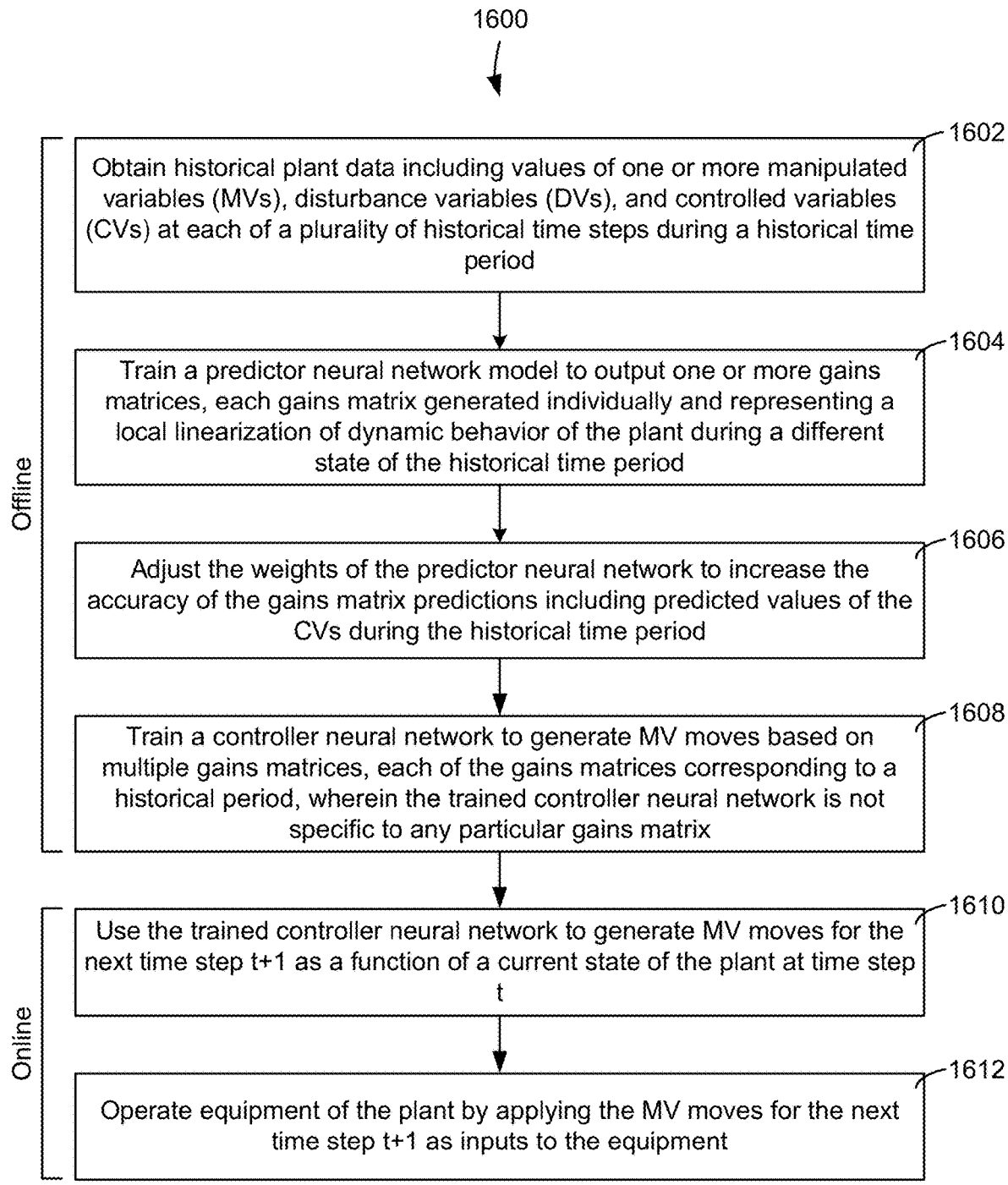
FIG. 14 is a flow diagram of a process for using multiple gains matrices to train a controller neural network to determine MV moves, which can be performed by the plant controller of FIG. 13, according to some embodiments.

Referring now to FIG. 14, a flow diagram of a process 1600 for performing online control based on multiple gain matrices is shown, according to some embodiments. Process 1600 may be performed by any of the processing circuitry described herein, such as plant controller 702. In some embodiments, process 1200 is at least partially performed by plant controller 702 as described above with reference to FIG. 13.

Process 1600 is shown to include obtaining historical plant data including values of one or more manipulated variables (MV's), disturbance variables (DV's), and controlled variables (CV's) (step 1602). Data collector 710 may be configured to receive the historical plant data from database 722. In some embodiments, the data includes MV's, DV's, and/or CV's for one or more historical time periods (e.g., historical states) of the plant (e.g., operation of system 100). Data collector 710 may be configured to receive the historical plant data from database 722. In some embodiments, the data includes MV's, DV's, and/or CV's for one or more historical time periods (e.g., historical states) of the plant (e.g., operation of system 100). For example, at the time step t (e.g., Friday @ 10:15 AM, etc.) the historical data may indicate that the temperature of the feed entering reactor 208 after being pre-heated is 460° C. (MV), the feed prior to entering heat source 202 to be pre-heated is 400° C. (DV), the temperature within reactor 208 (i.e., the temperature relating to the reactor severity, etc.) is 535° C. (MV), and the intended volume gain of HCU 116 is 2,000 m$^3$ (TV) to maximize the value of the one or more hydrocarbon products individually and/or as a whole (CV)—the CV potentially being based on any number of factors, such as a ratio of the total amount of light hydrocarbons per the total incoming feed (e.g., 0.6, 0.7, etc.), the monetary value associated with each light hydrocarbon product, the production efficiency of each hydrocarbon product compared to one another, the production efficiency at a given reactor severity, or any combination thereof.

Process 1600 is shown to include training a predictor neural network model to output one or more gains matrices, each gains matrix generated individually and representing a local linearization of dynamic behavior of the plant during a different state or episode of the historical time period (step 1604). Process 1600 may include adjusting the weights of the predictor neural network to increase the accuracy of the gains matrix predictions including predicted values of the CVs during the historical time period (step 1606). In some embodiments, predictor neural network 904 is configured to generate a gains matrix for one or more sets of historical data. For example, each set of historical data may correspond to a particular episode of the historical data during within which the dynamic behavior of the plant is substantially linear. Each set of historical data may be used to generate a gains matrix that represents the localized linear behavior of the plant during the corresponding time period or episode. The set of gains matrices (e.g., set of gains matrices 1502) may represent a variety of different linear behaviors of the plant, giving the controller neural network (untrained) 908 more training data from a more diverse range of plant behaviors.

Process 1600 is shown to include training a controller neural network to generate MV moves based on multiple gains matrices, each of the gains matrices corresponding to a historical period, wherein the trained controller neural network is not specific to any particular gains matrix (step 1608). In some embodiments, the controller neural network (trained) 910 is trained using some or all of the gains matrices in the set of gains matrices 1502. This may allow controller neural network (trained) 910 to learn multiple types of dynamic behavior that the plant experiences. In other words, controller neural network (trained) 910 is trained using a diverse set of gains matrices, resulting in a controller neural network (trained) 910 that can be used for any state of the plant rather than only states that fall within a particular type of linear behavior.

Process 1600 is shown to include using the trained controller neural network to generate MV moves for the next time step t+1 as a function of a current state of the plant at time step t (step 1610). In some embodiments, controller neural network (trained) 910 can input the real-time state data in the model generated by the neural network of controller neural network (untrained) 908 to determine the MV adjustments required to reach one or more predicted CV values.

Process 1600 is shown to include operate equipment of the plant by applying the MV moves for the next time step t+1 as inputs to the equipment (step 1612). In some embodiments, petroleum refining equipment 726 can include a mechanism (e.g., an actuator/valve assembly, a pump device, etc.) that, when the control signals are received, adjust the flow of catalyst into reactor 208, thus adjusting the reactor severity in HCU 116 (e.g., when reactor severity is an MV, etc.).

In some embodiments, one or more reactor severity control mechanisms (e.g., modules, components, etc.) are located proximate to HCU 116 or upstream/downstream of HCU 116 to adjust the reactor severity within reactor 208. For example, one reactor severity control mechanism that can adjust the reactor severity within HCU 116 at least in part can be a valving system that adjusts the flow of catalyst into riser 204. In some embodiments, another reactor severity control mechanism can include a valving system controlling the amount of feed entering HCU 116. In some embodiments, another reactor severity control mechanism is a heat source 202 that pre-heats the incoming feed. The reactor severity control mechanisms may be part of petroleum refining equipment 726 described below, and may be configured to receive control signals from plant controller 702 to adjust one or more MV's of the plant.

In other embodiments, the control signals may be sent to heat source 202 to preheat the incoming feed prior to the feed entering HCU 116. In some embodiments, the reactor severity is the MV adjusted to reach the predicted CV, and the reactor severity is based at least in part on the incoming feed. In other embodiments, the control signals can be sent to any number of equipment configured to affect the reactor severity, such as the mechanisms described in the example above, a control system for mixing parts of the catalyst (e.g., to affect the quality of the catalyst, thereby affecting the reactor severity, etc.), or a combination thereof.

Predictor Neural Network Training

Figure 15:
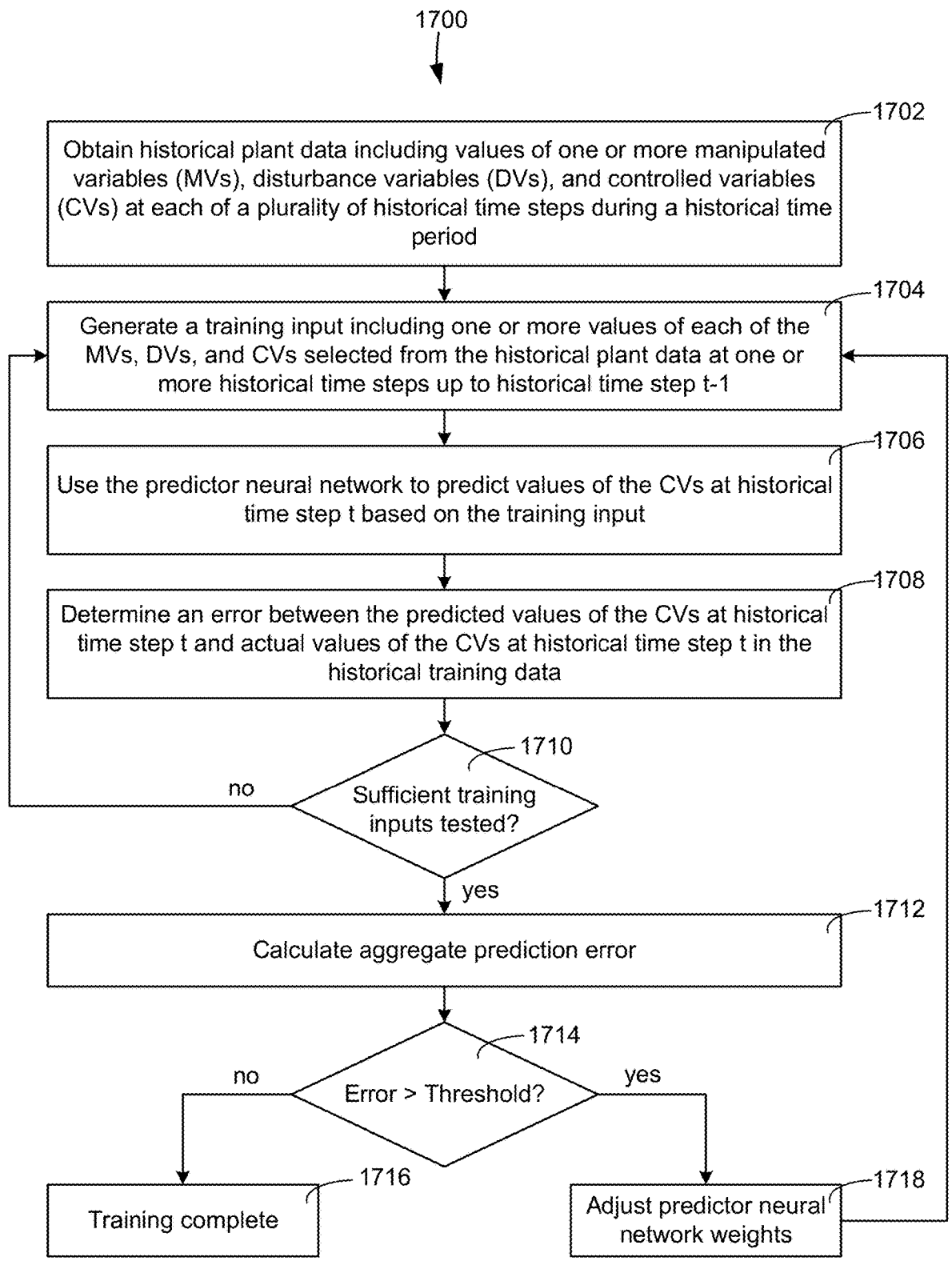
FIG. 15 is a flow diagram of a process for training a predictor neural network, which can be performed by the controllers of FIGS. 7-8, according to some embodiments.

Referring now to FIG. 15, a process 1700 for training a predictor neural network is shown, according to some embodiments. In some embodiments, process 1700 can be performed in place of or in addition to the processes described above to train the various predictor neural networks in FIGS. 9-16. Process 1700 may be performed by plant controller 702, or any of the other processing circuitry disclosed herein. Process 1700 is shown to include obtaining historical plant data including values of one or more manipulated variables (MV's), disturbance variables (DV's), and controlled variables (CV's) at each of a plurality of historical time steps during a historical time period (step 1702).

Process 1700 is shown to include generating a training input including one or more values of each of the MV's, DV's, and CV's selected from the historical plant data at one or more historical time steps up to historical time step t−1 (step 1704). The training input may include a vector of values for each of the MV's, DV's, and CV's (i.e., a time series of each variable including one or more time series values up to time step t−1), which could be provided in the form of a matrix or otherwise.

For example, the weights of predictor neural network 904 and/or bias vectors of predictor neural network 904 are initialized. After initialization, for each of a plurality of time steps, an input vector x is formed of values of CV's, MV's and/or DV's of time points t−T . . . t, and a desired output values vector y' is formed of the values of the controlled variables at time t+1. Predictor neural network 904 is applied to the input vector x and the resultant output vector y is compared to the desired output values vector y'. Based on a difference between the output vector y and the desired output values vector y', the weights of predictor neural network 904 are adjusted in a direction which reduces the difference. The magnitude of the difference is calculated using any suitable difference measure (e.g., absolute value, sum of squares, etc.). The forming of the vectors, applying predictor neural network 904, and adjusting the weights is repeated for many time points, such that predictor neural network 904 reliably models the operation of the system.

Process 1700 is shown to include using the predictor neural network to predict values of the CV's at historical time step t based on the training input (step 1706). In some embodiments, the predictor neural network is substantially similar or identical to predictor neural network 904. Predictor neural network 904 may generate a linear predictor which can include the predicted CV's of the current time step. In some embodiments, offline neural network can analyze the CV's, MV's, and DV's all for a current time step and predict the CV's for a future time step.

Process 1700 is shown to include determining an error between the predicted values of the CV's at historical time step t and actual values of the CV's at historical time step t in the historical training data (step 1708). This may be performed by implementing a certain error threshold (e.g., 5% 20%, etc.) such that if the predicted CV is within that error threshold, the prediction is considered accurate, and if the predicted CV is outside of that error threshold, the prediction is considered inaccurate. Predictor neural network 904 may require a certain subset of CV predictions to be "accurate" prior to determining that the training of predictor neural network 904 is complete. Other methods for determining the error may be considered, such as determining if the answer is within a predetermined range of values or allowing supervised learning from a technician/engineer.

Process 1700 is further shown to include determining if a sufficient number of training inputs have been tested (step 1710) In some embodiments, predictor neural network 904 is instructed to process a certain number of states, generate a certain number of accurate predictions, or a combination thereof. If this threshold has not been met, process 1700 repeats steps 1704-1708 until efficient training inputs have been tested. Once this threshold is met, process 1700 proceeds to step 1712 discussed below.

In the above example, determining the error may be performed in a manner similar to the training of predictor neural network 904, but instead of adjusting the weights of predictor neural network 904 in response to the comparison of the output vector y and the desired output values vector y', an average error equal to the difference between the vectors y, y' is calculated over one or more time points and the average is displayed to a human user and/or is compared to a threshold. If the average difference is smaller than the threshold, the predictor is considered ready for operation. Otherwise, one or more parameters of the neural network may be adjusted, such as the number of layers, the specific controlled, manipulated and/or disturbance variables used, the size of the intermediary vectors h1, h2, h3, . . . hn and/or the duration T of the time period used to form the input vector x. The training of predictor neural network 904 may then be repeated. In some embodiments predictor neural network 904 processes to values up to time t in order to estimate values of the CV's at time t+1. In other embodiments, predictor neural network 904 is applied to a vector including values of MV's at time t+1 in predicting the CV's at time t+1, so as to take into account the most recent values of the MV's.

Instead of the training based on each time point on its own, in some embodiments, the training of predictor neural network 904 is performed on sequences of time points together. For each sequence of time points, t1, t2, . . . tn, the forming of the vectors and applying of predictor neural network 904 in order to receive the values of the controlled variables, are performed for the first time point of the sequence t1. Then, instead of immediately adjusting the weights of predictor neural network 904 according to a comparison to a desired output values vector y', an input vector for the second time point t2 is created using the outputs of the predictor instead of the stored values from database 722, for the values of the controlled variables at time t1. This process is repeated until predicted values are calculated for time tn. Then, the predicted values for times t1, t2, . . . tn are compared to the stored values using a given metric and the neural network is adjusted accordingly.

In some embodiments, rather than predicting explicit values of CV's, predictor neural network 904 is trained, using any suitable method known in the art, to produce a distribution over different possibilities. For example, predictor neural network 904 may output at time point t the mean and covariance of a Gaussian distribution which reflects estimated posterior probabilities of controlled variable values in time point t+1. This allows modelling uncertainty in the behavior of the plant, to optionally be taken into account by plant controller 702.

Process 1700 is shown to include calculating aggregate prediction error (step 1712) and comparing it to a threshold (step 1714). In some embodiments, the aggregate prediction error is an error determination that takes into account several predictions made by predictor neural network 904. The aggregate prediction error could be an average of the errors resulting from each training input, an aggregate error, or any other metric. In some embodiments, the aggregate prediction error weights certain CV predictions over others based on user instruction. For example, it may be more important to accurately predict the most valuable volume gain of one or more hydrocarbon products (a CV in one embodiment) than the flow rate to reactor 208 (another CV in the embodiment) during training of predictor neural network 904.

Other methods for comparing the aggregate prediction error to a threshold may be considered, such as determining if the error is within a predetermined range of value, determining if the error is off by a predetermined percentage or allowing supervised learning from a technician/engineer to make the decision. If the aggregate prediction error is outside of the acceptable threshold, the weights of predictor neural network 904 are adjusted (1718) and steps 1704-1714 are repeated. If the aggregate prediction error is within the acceptable threshold, the training of predictor neural network 904 is completed (1716).

Controller Neural Network Training

Figure 16:
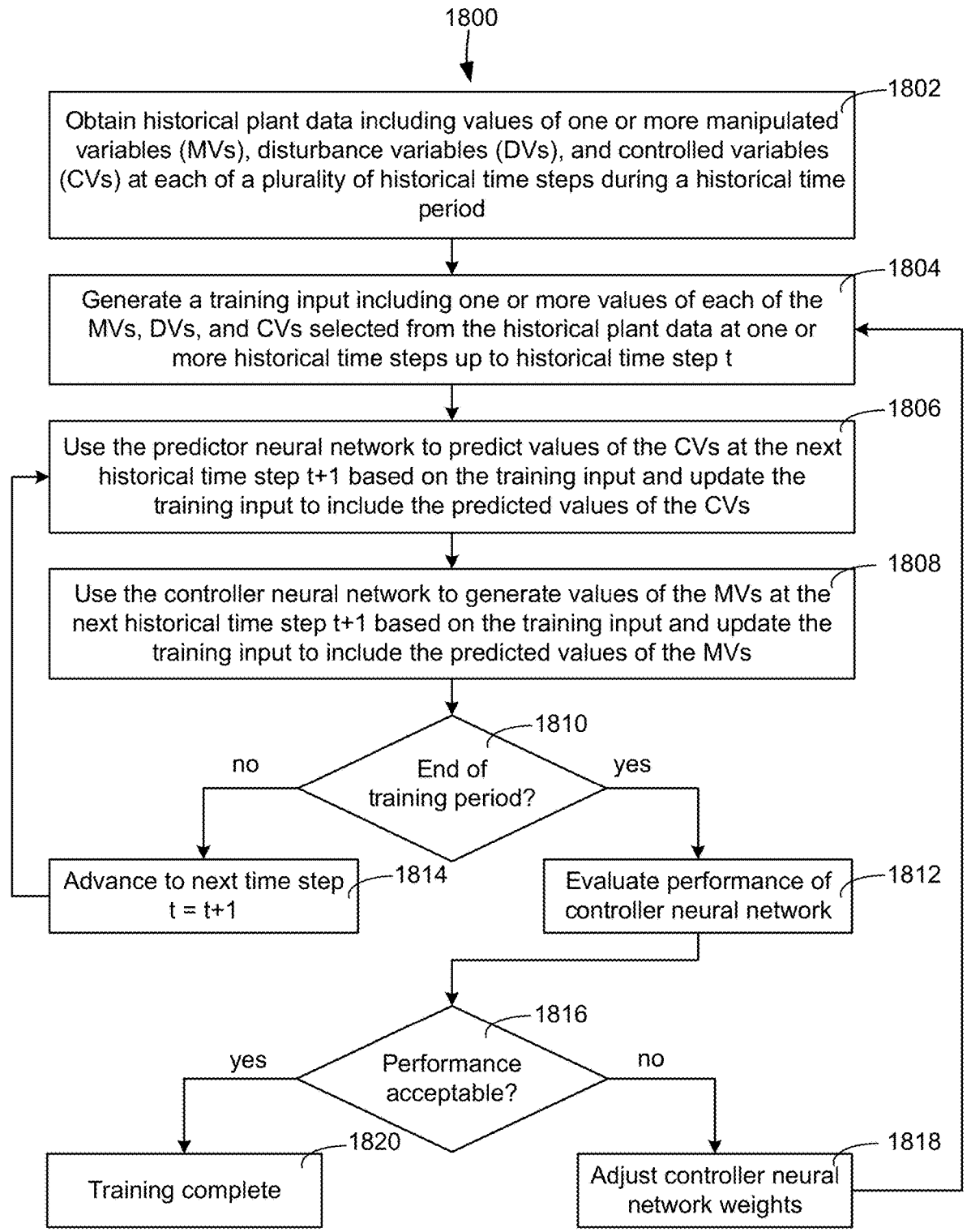
FIG. 16 is a flow diagram of a process for training a controller neural network, which can be performed by the controllers of FIGS. 7-8, according to some embodiments.

Referring now to FIG. 16, a process 1800 for training a controller neural network to generate MV's for given CV's is shown, according to some embodiments. In some embodiments, process 1700 can be performed in place of or in addition to the processes described above to train the various predictor neural networks in FIGS. 9-16. Process 1800 may be performed by plant controller 702, or any of the other processing circuitry disclosed herein. Process 1800 is shown to include obtaining historical plant data including values of one or more manipulated variables (MV's), disturbance variables (DV's), and controlled variables (CV's) at each of a plurality of historical time steps during a historical time period (step 1802).

Process 1800 is shown to include generating a training input including one or more values of each of the MV's, DV's, and CV's selected from the historical plant data at one or more historical time steps up to historical time step t (step 1804). In some embodiments, the training input may be similar to the historical states that can be used to train predictor neural network 904. The training input may also include target values for the CV's (i.e., setpoints or setpoint ranges).

Process 1800 is shown to include using the predictor neural network to predict values of the CV's at the next historical time step t+1 based on the training input and update the training input to include the predicted values of the CV's (step 1806). Predictor neural network 904 may predict the CV's for the next historical time step t+1 based on the training input, and include the predicted CV's for the future time step in the training input, which can subsequently be provided to controller neural network 1302.

Process 1800 is shown to include using the controller neural network to generate values of the MV's at the next historical time step t+1 based on the training input and update the training input to include the predicted values of the MV's (step 1808). Once controller neural network 1302 receives the training input, controller neural network 1302 can make MV predictions based on the predicted CV prediction made by predictor neural network 904. These predicted MV's (and any other relevant data (e.g., TVs)) can be added to the training input, such that all of the predictions for time step t+1 are included within the training input.

Process 1800 is shown to include determining if the training period has ended (step 1810). The training period may be based on a certain amount of predictions being made, a certain number of historical data sets/states/episodes being analyzed, data for a certain number of future time steps being predicted, or any combination thereof. If training has not been completed, process 1800 advances to the next time step t+1 (step 1814) and steps 1806-1808 are repeated until training is complete.

Once training has been completed, the performance of controller neural network 1302 is evaluated (step 1812) to determine whether the performance of controller neural network 1302 is acceptable (step 1816). In some embodiments, this step includes comparing the predicted CV's to the target values of the CV's for the corresponding time steps to calculate an average or aggregate error, or putting the predicted values of the CV's into an objective function and calculating the value of the objective function. In some embodiments, the evaluation also considers values of the MV's and/or includes penalties for the MV's deviating from predetermined ranges. If the performance of controller neural network 1302 is evaluated and considered not acceptable, process 1800 repeats steps 1804-1812 until the performance is acceptable. When the performance of controller neural network 1302 is considered acceptable, the training is complete (step 1820).

Inferentials

In some embodiments, one or more inferentials may be developed to generate, predict, calculate, or otherwise determine the values of variables as a function of other variables or data inputs (e.g., to convert a slow sampled process signal to a fast sampled variable) in oil refinery control systems. Inferentials may use one or more variable types (e.g., MV's, CV's, DV's, etc.) as inputs and may produce one or more of the same or different variable types as outputs. Inferentials may also be used in the objective function.

As described herein, any of the values of CV's, MV's and DV's can be predicted, calculated, inferred, estimated, or interpolated at any point in real-time and/or via querying historical time data. For example, a predictive model (e.g., neural network, etc.) is configured receive multiple data points (e.g., data samples, etc.) of an MV at a rate that is lower than preferred. As such, the predictive model makes an inference as to the value of the MV based on the inferential functionality performed by the predictive model. In some embodiments, the inferential functionality is performed by using linear regression, nonlinear regression weighted interpolation, extrapolation, neural networks, or any combination thereof.

In some embodiments, the sampling of CV values is slow such that inferential functionality is used to infer a value of the CV in between samples. A neural network currently implemented in the system (e.g., controller neural network 910, etc.) or a separate neural network can be configured to use regression analysis to infer the value of the CV in between samples. Of course, this is merely exemplary and any of the values MV's, CV's, and DV's, may be determined based on inferences made by one or more models performing regression analysis.

Typical inferentials for HU's and their inputs include but are not limited to: Debutanizer Bottoms RON-ROT, Btms Temp, Btms Pressure, Main Frac OVHD Pressure Compensated Temp, Cat Circ, Straight Run Naphtha Feed, Main Frac OVHD Temp, Naphtha Product Rate, Debut Tray 1 TempBB C5+ Content—Olefin flow, Main Frac OVHD Pressure, Debut Tray 9 Temp, HCO P/A, ROT, COT. Typical inferentials for HCUs and their inputs may also include Cat Gas RVP—Debut Tray 9 Temp, Main Frac OVHD Temp, Olefin flow, total cat gas flow, COT, Top PA Draw Temp, Riser Top Temperature, Primary Absorber Feed, DeC4 BTMS Temp, DeC4 OH Temp. Typical inferentials for HCUs and their inputs may also include Cat Gas T90—Main Frac OVHD Temp, HCO P/A, Debut OVHD Pressure, Total feed, Debut Tray 9 Temp.

Additionally, typical inferentials for HCUs and their inputs may also include LCO T90—Total LCO flow, slurry to storage flow, LCO Draw Temp, Main Frac OVHD Temp, HCO P/A, Main Frac OVHD Pressure. Typical inferentials for HCUs and their inputs may also include LCO Flash—COT, Total feed, Total LCO flow, LCO Draw Temp. Typical inferentials for HCUs and their inputs may also include Saturated C3s—Feed Preheat Temp, Riser Top Temperature, LPG to Merox, DeC3 BTMS Temp, DeC3 OH Temp. Typical inferentials for HCUs and their inputs may also include Unsaturated C3s—Feed Preheat Temp, Riser Top Temperature, LPG to Merox, DeC3 BTMS Temp, DeC3 OH Temp. Typical inferentials for HCUs and their inputs may also include Saturated C4s—Feed Preheat Temp, Riser Top Temperature, Primary Absorber Feed, DeC4 BTMS Temp, DeC4 OH Temp.

Additionally, typical inferentials for HCUs and their inputs may also include Unsaturated C4s—Feed Preheat Temp, Riser Top Temperature, Primary Absorber Feed, DeC4 BTMS Temp, DeC4 OH Temp. Typical inferentials for HCUs and their inputs may also include Cat Gas FBP—Main Frac OH Pressure, Main Frac OH temperature, Top PA Draw Temp, LCO Stripper Bottoms Temp, Riser Top Temperature, Primary Absorber Feed, DeC4 BTMS Temp, DeC4 OH Temp. Typical inferentials for HCUs and their inputs may also include DeC4 OH Cys—Feed Preheat Temp, Top PA Draw Temp, Riser Top Temperature, Primary Absorber Feed, DeC4 BTMS Temp, DeC4 OH Temp. Typical inferentials for HCUs and their inputs may also include Slurry Gravity—Feed Preheat Temp, Riser Top Temperature, Slurry Product Rate, Feed/Slurry Exchanger Feed Bypass Temp.

Additionally, typical inferentials for HCUs and their inputs may also include iC4s—Feed Preheat Temp, Riser Top Temperature, Primary Absorber Feed, DeC4 BTMS Temp, DeC4 OH Temp. Typical inferentials for HCUs and their inputs may also include nC4s—Feed Preheat Temp, Riser Top Temperature, Primary Absorber Feed, DeC4 BTMS Temp, DeC4 OH Temp. Typical inferentials for HCUs and their inputs may also include Octane—Feed Preheat Temp, Riser Top Temperature, Gasoline Product Rate, Dry Gas Product Rate, DeC4 BTMS Temp. Typical inferentials for HCUs and their inputs may also include LCO 90%—Total LCO flow, LCO stripper bottoms temp, Feed Flow.

In some embodiments, one or control mechanisms (e.g., modules, components, etc.) can be used to change the production of the output oil steams of HCU 116 such that, when they are adjusted by a control system, can affect the total product yield and/or product quality of one or more output streams.

In some embodiments, these control mechanisms can adjust the feed entering into HCU 116 (as described in detail above with reference to FIG. 2). The control device may include any number of valves and/or actuators, for example, than can change the rate of feed entering into HCU 116. In some embodiments, these control mechanisms (e.g., control device, etc.) are located proximate to HCU 116 or upstream/downstream of HCU 116 to adjust the reactor severity within reactor 208. For example, one control device that can adjust the reactor severity within HCU 116 at least in part can be a valving system that adjusts the flow of catalyst into riser 204. In some embodiments, another reactor severity control mechanism can include a valving system controlling the amount of feed entering HCU 116. In some embodiments, another control device mechanism can be a heat source 202 that pre-heats the incoming feed. The control device mechanisms may be part of petroleum refining equipment 726 described below, and may be configured to receive control signals from plant controller 702 to adjust one or more MV's of the plant. While not shown, in some embodiments, one or more feed control mechanisms (e.g., devices, modules, components, etc.) can be used to adjust the flow rate of feed into HCU 116. In some embodiments, a feed control device can increase or decrease the feed rate into HCU 116 using a system of actuators and/or valves. As described herein, a control device may include any number of reactor severity control devices, feed control devices, or a combination thereof.

In some embodiments, the term "constrained variable" refers to at least one of MV's and DV's. A constrained variable may be any variable that is constrained by the system, and may even include CV's. In general a constrained variable refers to a variable that is constrained (e.g., via a penalty in an objective function, etc.).

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A control system for automatic operation of a hydrocracking unit in an oil refining system, the control system comprising:
  a control device operable to affect at least one of a yield or a product quality of one or more output oil products provided as outputs of the hydrocracking unit; and
  a controller comprising a processing circuit configured to:
    obtain an objective function that quantifies a value of operating the hydrocracking unit as a function of at least one of the yield or the product quality of the one or more output oil products;
    use a neural network model to generate a target control device setpoint predicted to optimize the objective function when the hydrocracking unit operates at the target control device setpoint; and
    operate the control device using the target control device setpoint to modulate at least one of the yield or the product quality of the one or more output oil products.

2. The control system of claim 1, wherein:
  the control device is a feed control assembly configured to adjust a feed rate of an input oil feed entering the hydrocracking unit, and the target control device setpoint is a feed rate setpoint for the feed control assembly; or
  the control device is a reactor severity control device configured to modulate a temperature within the hydrocracking unit, and the target control device setpoint is a reactor severity setpoint for the reactor severity control device; or
  the control device is a combination of the feed control assembly and the reactor severity control device, and the target control device setpoint is a combination of the feed rate setpoint and the reactor severity setpoint.

3. The control system of claim 2, wherein:
  the hydrocracking unit comprises a reactor within which the input oil feed is converted into the one or more output oil products;

the reactor severity control device is configured to modulate the temperature affecting the at least one the yield or the product quality of the one or more output oil products by controlling a catalyst reaction within the reactor; and the temperature affecting the at least one of the yield or the product quality of the one or more output oil products within the hydrocracking unit is a reactor temperature within the reactor.

4. The control system of claim 2, wherein:
the hydrocracking unit is configured to use hydrogen introduced into the hydrocracking unit to hydrogenate the input oil feed provided to the hydrocracking unit; and the control device is configured to modulate a rate at which the hydrogen is introduced into the hydrocracking unit.

5. The control system of claim 1, wherein the processing circuit is configured to:
use the neural network model to predict at least one of the yield or the product quality of each output oil product of the one or more output oil products predicted to result from the target control device setpoint; and calculate a value of the objective function based on the at least one of the yield or the product quality of each output oil product predicted to result from the target control device setpoint.

6. The control system of claim 1, wherein the processing circuit is configured to:
obtain a price corresponding to each output oil product of the one or more output oil products;

calculate a value of each output oil product predicted to result from the target control device setpoint using the neural network model and the price corresponding to each output oil product; and calculate a value of the objective function based on the value of each output oil product.

7. The control system of claim 1, wherein:
the objective function further comprises a penalty separate from the function of at least one of the yield or the product quality of the one or more output oil products, the penalty defined as a function of a constrained variable affected by the control system relative to a threshold value of a constraint that applies to the constrained variable; and the processing circuit is configured to use the neural network model to predict a value of the constrained variable predicted to result from the target control device setpoint and calculate a value of the penalty as a function of the value of the constrained variable.

8. The control system of claim 1, wherein the processing circuit is configured to train the neural network model during an offline training period using historical plant data comprising at least one of:
one or more manipulated variables provided as inputs to controllable equipment of the hydrocracking unit;

one or more controlled variables affected by operating the controllable equipment of the hydrocracking unit; or one or more disturbance variables that affect the one or more controlled variables but are not directly controlled.

9. The control system of claim 1, wherein the neural network model comprises a predictor neural network model and the processing circuit is configured to train the predictor neural network model by:
initializing the predictor neural network model with an initial set of weights;

using the predictor neural network model to predict the yield of the one or more output oil products at a historical time step based on historical plant data for one or more previous time steps occurring prior to the historical time step;

determining an error between predicted values of the yield of the one or more output oil products predicted by the predictor neural network model and actual values of an amount of the one or more output oil products defined by the historical plant data; and adjusting the weights of the predictor neural network model to reduce the error.

10. The control system of claim 1, wherein the neural network model comprises a predictor neural network model and a controller neural network model, and the processing circuit is configured to train the controller neural network model by:
initializing the controller neural network model with an initial set of weights;

generating a time series of predicted values of an amount of the one or more output oil products using the predictor neural network model and the controller neural network model;

calculating a value of the objective function based on the time series of predicted values of the amount of the one or more output oil products; and adjusting the weights of the controller neural network model to optimize the objective function.

11. A method for operating a hydrocracking unit in an oil refining system, the method comprising:
obtaining an objective function that quantifies a value of operating the hydrocracking unit as a function of at least one of a yield or a product quality of one or more output oil products provided as outputs of the hydrocracking unit;

using a neural network model to generate a target control device setpoint predicted to optimize the objective function when the hydrocracking unit operates at the target control device setpoint; and operating a control device using the target control device setpoint to modulate at least one of the yield or the product quality of the one or more output oil products.

12. The method of claim 11, wherein:
the control device is a feed control assembly configured to adjust a feed rate of an input oil feed entering the hydrocracking unit, and the target control device setpoint is a feed rate setpoint for the feed control assembly; or the control device is a reactor severity control device configured to modulate a temperature within the hydrocracking unit, and the target control device setpoint is a reactor severity setpoint for the reactor severity control device; or the control device is a combination of the feed control assembly and the reactor severity control device, and the target control device setpoint is a combination of the feed rate setpoint and the reactor severity setpoint.

13. The method of claim 11, wherein the method further comprises:
using the neural network model to predict a yield or a product quality of each output oil product of the one or more output oil products predicted to result from the target control device setpoint; and calculating a value of the objective function based on the yield of each output oil product predicted to result from the target control device setpoint.

14. The method of claim 11, wherein the method further comprises:
- obtaining a price corresponding to each output oil product of the one or more output oil products;
- calculating a value of each output oil product predicted to result from the target control device setpoint using the neural network model and the price corresponding to each output oil product; and
- calculating a value of the objective function based on the value of each output oil product.

15. The method of claim 11, wherein obtaining the objective function comprises obtaining the objective function comprising a penalty separate from the function of at least one of the yield or the product quality of the one or more output oil products, the penalty defined as a function of a constrained variable affected by a control system relative to a threshold value of a constraint that applies to the constrained variable; and
- using the neural network model to predict a value of the constrained variable predicted to result from the target control device setpoint and calculate a value of the penalty as a function of the value of the constrained variable.

16. The method of claim 11, wherein the method further comprises training a predictor neural network model by:
- initializing the predictor neural network model with an initial set of weights;
- using the predictor neural network model to predict the yield of the one or more output oil products at a historical time step based on historical plant data for one or more previous time steps occurring prior to the historical time step;
- determining an error between predicted values of at least one of the yield or the product quality of the one or more output oil products predicted by the predictor neural network model and actual values of an amount of the one or more output oil products defined by the historical plant data; and
- adjusting the weights of the predictor neural network model to reduce the error.

17. The method of claim 11, wherein the method further comprises training a controller neural network model by:
- initializing the controller neural network model with an initial set of weights;
- generating a time series of predicted values of an amount of the one or more output oil products using a predictor neural network model and the controller neural network model;
- calculating a value of the objective function based on the time series of predicted values of the amount of the one or more output oil products; and
- adjusting the weights of the controller neural network model to optimize the objective function.

18. A control system for automatic operation of a hydrocracking unit in an oil refining system, the control system comprising:
- a control device operable to affect at least one of a yield or a product quality of one or more output oil products provided as outputs of the hydrocracking unit; and
- a controller comprising a processing circuit configured to:
  - obtain an objective function that quantifies a value of operating the hydrocracking unit as a function of at least one of the yield or the product quality of the one or more output oil products;
  - use a predictive model to generate a target control device setpoint predicted to optimize the objective function when the hydrocracking unit operates at the target control device setpoint; and
  - operate the control device using the target control device setpoint to modulate at least one of the yield or the product quality of the one or more output oil products.

19. The control system of claim 18, wherein:
the control device is a feed control assembly configured to adjust a feed rate of an input oil feed entering the hydrocracking unit, and the target control device setpoint is a feed rate setpoint for the feed control assembly; or
the control device is a reactor severity control device configured to module a temperature within the hydrocracking unit, and the target control device setpoint is a reactor severity setpoint for the reactor severity control device; or
the control device is a combination of the feed control assembly and the reactor severity control device, and the target control device setpoint is a combination of the feed rate setpoint and the reactor severity setpoint.

20. The control system of claim 19, wherein:
the hydrocracking unit comprises a reactor within which the input oil feed is converted into the one or more output oil products;
the reactor severity control device is configured to modulate the temperature affecting the yield of the one or more output oil products by controlling a catalyst reaction within the reactor; and
the temperature affecting the yield of the one or more output oil products within the hydrocracking unit is a reactor temperature within the reactor.

21. The control system of claim 20, wherein:
the hydrocracking unit is configured to use hydrogen introduced into the hydrocracking unit to hydrogenate the input oil feed provided to the hydrocracking unit; and
the reactor severity control device is configured to modulate a rate at which the hydrogen is introduced into the hydrocracking unit.

22. The control system of claim 18, wherein the processing circuit is configured to:
- use the predictive model to predict a yield or a product quality of each output oil product of the one or more output oil products predicted to result from the target control device setpoint; and
- calculate a value of the objective function based on the yield of each output oil product predicted to result from the target control device setpoint.

23. The control system of claim 18, wherein the processing circuit is configured to:
- obtain a price corresponding to each output oil product of the one or more output oil products;
- calculate a value of each output oil product predicted to result from the target control device setpoint using the predictive model and the price corresponding to each output oil product; and
- calculate a value of the objective function based on the value of each output oil product.

24. The control system of claim 18, wherein using the predictive model to generate the target control device setpoint comprises using an inferential to determine a value of a variable affecting at least one of the yield or the product quality of the one or more output oil products, the inferential comprising an inference that infers the value of the variable affecting at least one of the yield or the product quality based on an inferential functionality performed by the predictive model.

25. The control system of claim 18, wherein the one or more output oil products comprises at least one of liquefied petroleum gas (LPG), gasoline, diesel, kerosene, butane, propane, or jet fuel.

* * * * *